US011315288B2

(12) United States Patent
Farmer et al.

(10) Patent No.: US 11,315,288 B2
(45) Date of Patent: Apr. 26, 2022

(54) SYSTEMS AND TECHNIQUES FOR ESTIMATING EYE POSE

(71) Applicant: Magic Leap, Inc., Plantation, FL (US)

(72) Inventors: Daniel Farmer, Verdi, NV (US); David Cohen, Nesher (IL); Bradley Vincent Stuart, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 133 days.

(21) Appl. No.: 16/878,366

(22) Filed: May 19, 2020

(65) Prior Publication Data
US 2020/0372678 A1 Nov. 26, 2020

Related U.S. Application Data

(60) Provisional application No. 62/850,539, filed on May 20, 2019.

(51) Int. Cl.
*G09G 5/00* (2006.01)
*G06T 7/77* (2017.01)
*G06F 3/01* (2006.01)

(52) U.S. Cl.
CPC .............. *G06T 7/77* (2017.01); *G06F 3/013* (2013.01); *G06T 2207/10152* (2013.01); *G06T 2207/30201* (2013.01)

(58) Field of Classification Search
CPC ....... G06F 3/0482; G06F 3/013; G06F 3/0488
See application file for complete search history.

(56) References Cited

U.S. PATENT DOCUMENTS

| | | |
|---|---|---|
| 6,850,221 B1 | 2/2005 | Tickle |
| 9,354,445 B1 * | 5/2016 | Weaver ................. G06F 3/013 |
| 2006/0028436 A1 | 2/2006 | Armstrong |
| 2007/0081123 A1 | 4/2007 | Lewis |
| | (Continued) | |

FOREIGN PATENT DOCUMENTS

WO  WO 2020/236827  11/2020

OTHER PUBLICATIONS

International Search Report and Written Opinion for PCT Application No. PCT/US 20/33620, dated Aug. 28, 2020.
(Continued)

*Primary Examiner* — Nan-Ying Yang
(74) *Attorney, Agent, or Firm* — Knobbe, Martens, Olson & Bear, LLP

(57) ABSTRACT

An eye tracking system can include an eye-tracking camera configured to obtain images of the eye at different exposure times or different frame rates. For example, longer exposure images of the eye taken at a longer exposure time can show iris or pupil features, and shorter exposure, glint images can show peaks of glints reflected from the cornea. The shorter exposure glint images may be taken at a higher frame rate (than the longer exposure images) for accurate gaze prediction. The shorter exposure glint images can be analyzed to provide glint locations to subpixel accuracy. The longer exposure images can be analyzed for pupil center or center of rotation. The eye tracking system can predict future gaze direction, which can be used for foveated rendering by a wearable display system. In some instances, the eye-tracking system may estimate the location of a partially or totally occluded glint.

12 Claims, 28 Drawing Sheets

(56) References Cited

U.S. PATENT DOCUMENTS

| | | |
|---|---|---|
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0309263 A2 | 10/2015 | Abovitz et al. |
| 2015/0326570 A1 | 11/2015 | Publicover et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0270656 A1 | 9/2016 | Samec et al. |
| 2016/0344957 A1 | 11/2016 | Kaehler |
| 2017/0053165 A1 | 2/2017 | Kaehler |
| 2017/0053166 A1 | 2/2017 | Amayeh et al. |
| 2017/0091996 A1 | 3/2017 | Wei et al. |
| 2017/0109936 A1 | 4/2017 | Powderly et al. |
| 2018/0018515 A1 | 1/2018 | Spizhevoy et al. |
| 2018/0096503 A1 | 4/2018 | Kaehler et al. |
| 2018/0131853 A1 | 5/2018 | Pellman et al. |
| 2018/0183986 A1 | 6/2018 | Smith et al. |
| 2018/0246320 A1* | 8/2018 | Rana .................. A61B 5/6803 |
| 2018/0275410 A1 | 9/2018 | Yeoh et al. |
| 2018/0276467 A1 | 9/2018 | Kaehler |
| 2018/0278843 A1 | 9/2018 | Smith et al. |
| 2019/0042842 A1 | 2/2019 | Cavin et al. |
| 2019/0181169 A1 | 6/2019 | Tadmor |
| 2019/0181171 A1 | 6/2019 | Tadmor et al. |
| 2019/0222830 A1 | 7/2019 | Edwin |
| 2019/0243448 A1 | 8/2019 | Miller |
| 2019/0324276 A1 | 10/2019 | Edwin |
| 2020/0241635 A1 | 7/2020 | Cohen |

OTHER PUBLICATIONS

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

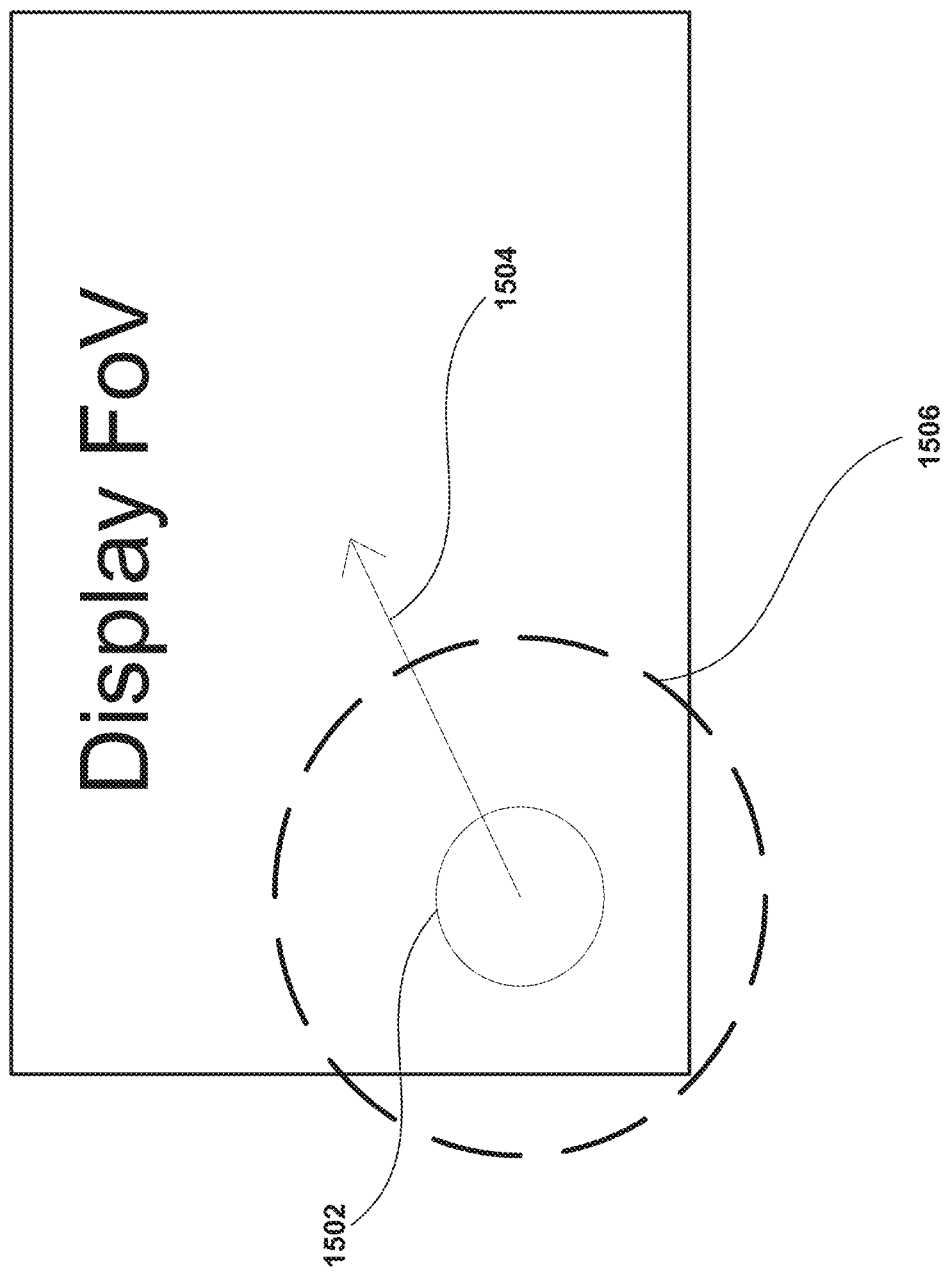

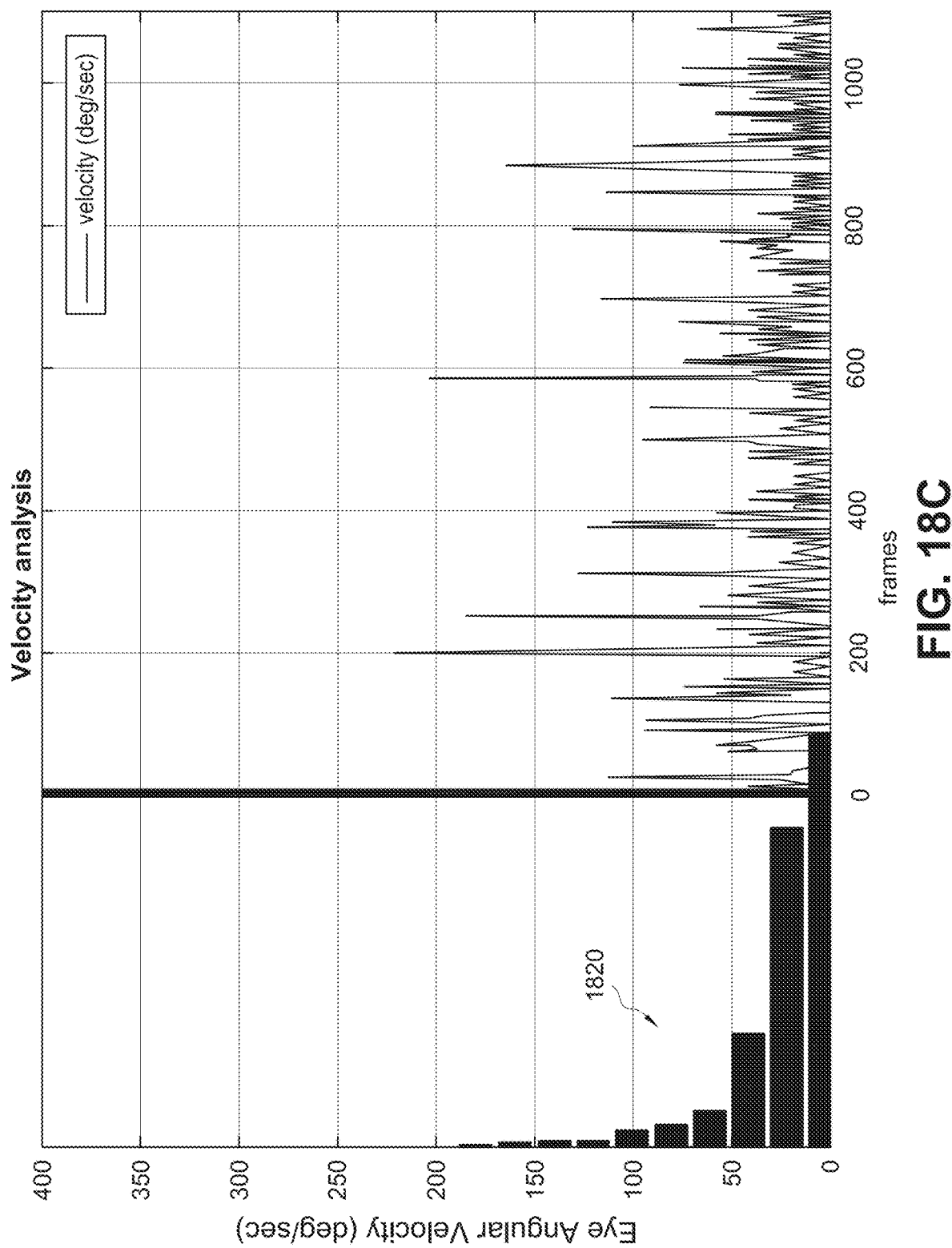

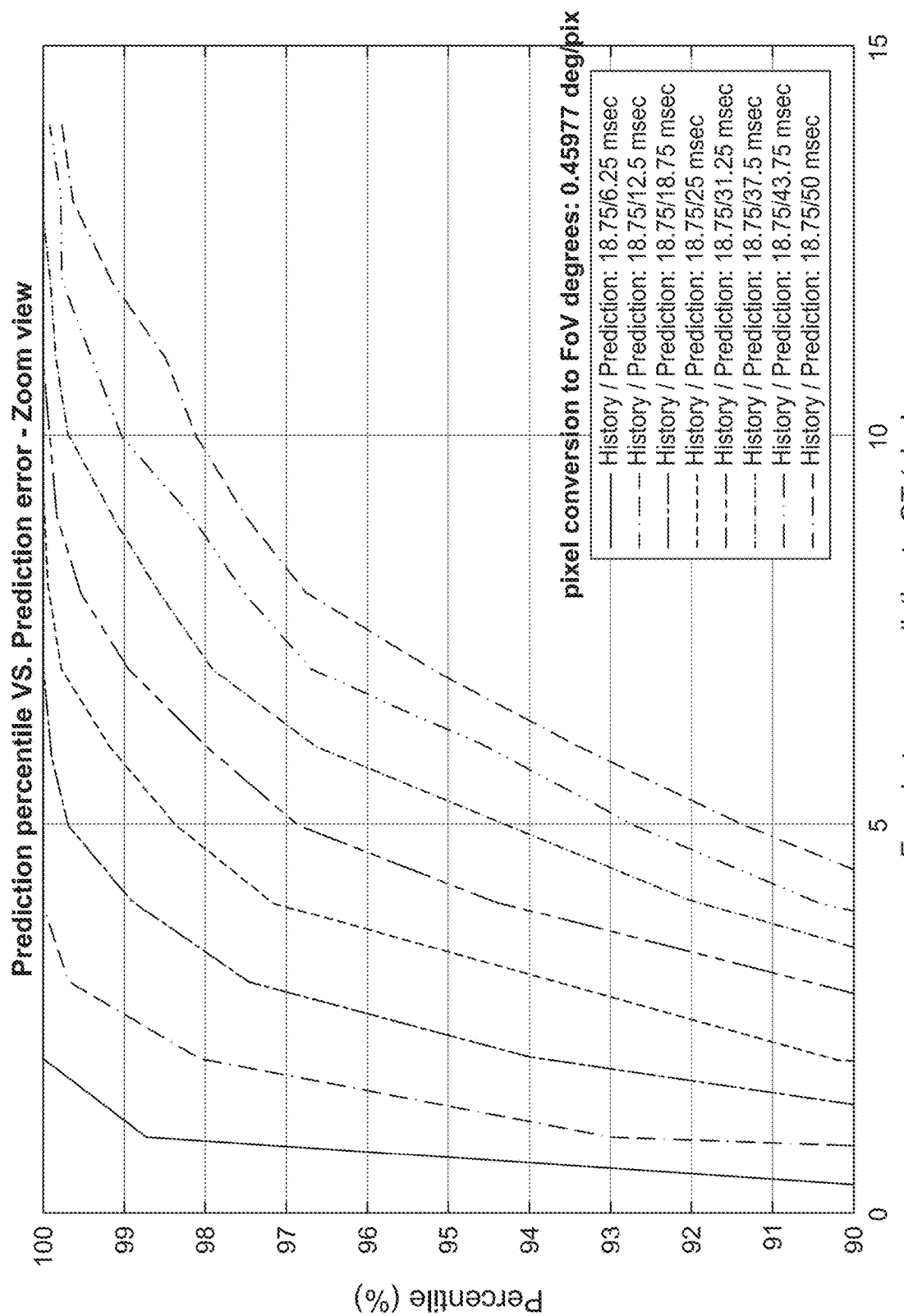

SYSTEMS AND TECHNIQUES FOR ESTIMATING EYE POSE

CROSS-REFERENCE TO RELATED APPLICATIONS

This application claims the benefit of priority to U.S. Patent Application No. 62/850,539, filed May 20, 2019, entitled SYSTEMS AND TECHNIQUES FOR ESTIMATING EYE POSE, which is hereby incorporated by reference herein in its entirety.

This application also incorporates by reference the entirety of each of the following patent applications and publications: U.S. patent application Ser. No. 15/159,491 filed on May 19, 2016, published on Nov. 24, 2016 as U.S. Patent Application Publication No. 2016/0344957; U.S. patent application Ser. No. 15/717,747 filed on Sep. 27, 2017, published on Apr. 5, 2018 as U.S. Patent Application Publication No. 2018/0096503; U.S. patent application Ser. No. 15/803,351 filed on Nov. 3, 2017, published on May 10, 2018 as U.S. Patent Application Publication No. 2018/0131853; U.S. patent application Ser. No. 15/841,043 filed on Dec. 13, 2017, published on Jun. 28, 2018 as U.S. Patent Application Publication No. 2018/0183986; U.S. patent application Ser. No. 15/925,577 filed on Mar. 19, 2018, published on Sep. 27, 2018 as U.S. Patent Application Publication No. 2018/0278843; U.S. Provisional Patent Application No. 62/660,180, filed on Apr. 19, 2018; U.S. patent application Ser. No. 16/219,829 filed on Dec. 13, 2018, published on Jun. 13, 2019 as U.S. Patent Application Publication No. 2019/0181171; U.S. patent application Ser. No. 16/219,847 filed on Dec. 13, 2018, published on Jun. 13, 2019 as U.S. Patent Application Publication No. 2019/0181169; U.S. patent application Ser. No. 16/250,931 filed on Jan. 17, 2019, published on Aug. 8, 2019 as U.S. Patent Application Publication No. 2019/0243448; U.S. patent application Ser. No. 16/251,017, filed Jan. 17, 2019, published on Jul. 18, 2019 as U.S. Patent Application Publication No. 2019/0222830; U.S. Provisional Patent Application No. 62/797,072, filed on Jan. 25, 2019; and U.S. patent application Ser. No. 16/751,076, filed on Jan. 23, 2020.

FIELD

The present disclosure relates to display systems, virtual reality, and augmented reality imaging and visualization systems and, more particularly, to techniques for tracking a user's eyes in such systems.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY

An eye tracking system can include an eye-tracking camera configured to obtain images of the eye at different exposure times or different frame rates. For example, images of the eye taken at a longer exposure time can show iris or pupil features, and images of the eye taken at shorter exposure times (sometimes referred to as glint images) can show peaks of glints reflected from the cornea. The shorter exposure glint images may be taken at a higher frame rate (HFR) than the longer exposure images to provide for accurate gaze prediction. The shorter exposure glint images can be analyzed to provide glint locations to subpixel accuracy. The longer exposure images can be analyzed for pupil center or center of rotation. The eye tracking system can predict future gaze direction, which can be used for foveated rendering by a wearable display system, for example, an AR, VR, or MR wearable display system.

In various embodiments, the exposure time of the longer exposure image may be in a range from 200 µs to 1200 µs, for example, about 700 µs. The longer exposure images can be taken at a frame rate in a range from 10 frames per second (fps) to 60 fps (e.g., 30 fps), 30 fps to 60 fps, or some other range. The exposure time of the shorter exposure, glint images may be in a range from 5 µs to 100 µs, for example, less than about 40 µs. The ratio of the exposure time for the longer exposure image relative to the exposure time for the glint image can be in a range from 5 to 50, 10 to 20, or some other range. The glint images can be taken at a frame rate in a range from 50 fps to 1000 fps (e.g., 120 fps), 200 fps to 400 fps, or some other range in various embodiments. The ratio of the frame rate for the glint images relative to the frame rate for the longer exposure images can be in a range from 1 to 100, 1 to 50, 2 to 20, 3 to 10, or some other ratio.

In some embodiments, the shorter exposure images are analyzed by a first processor (which may be disposed in or on a head-mounted component of the wearable display system), and the longer exposure images are analyzed by a second processor (which may be disposed in or on a non-head mounted component of the wearable display system, such as, e.g., a beltpack). In some embodiments, the first processor comprises a buffer in which portions of the shorter exposure images are temporarily stored for determining glint location(s).

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 15 schematically illustrates an example of foveated rendering.

FIGS. 18A, 18B, 18C, and 18D illustrate results of an experiment to predict future gaze using an embodiment of the gaze prediction system shown in FIG. 17.

Figure 1:
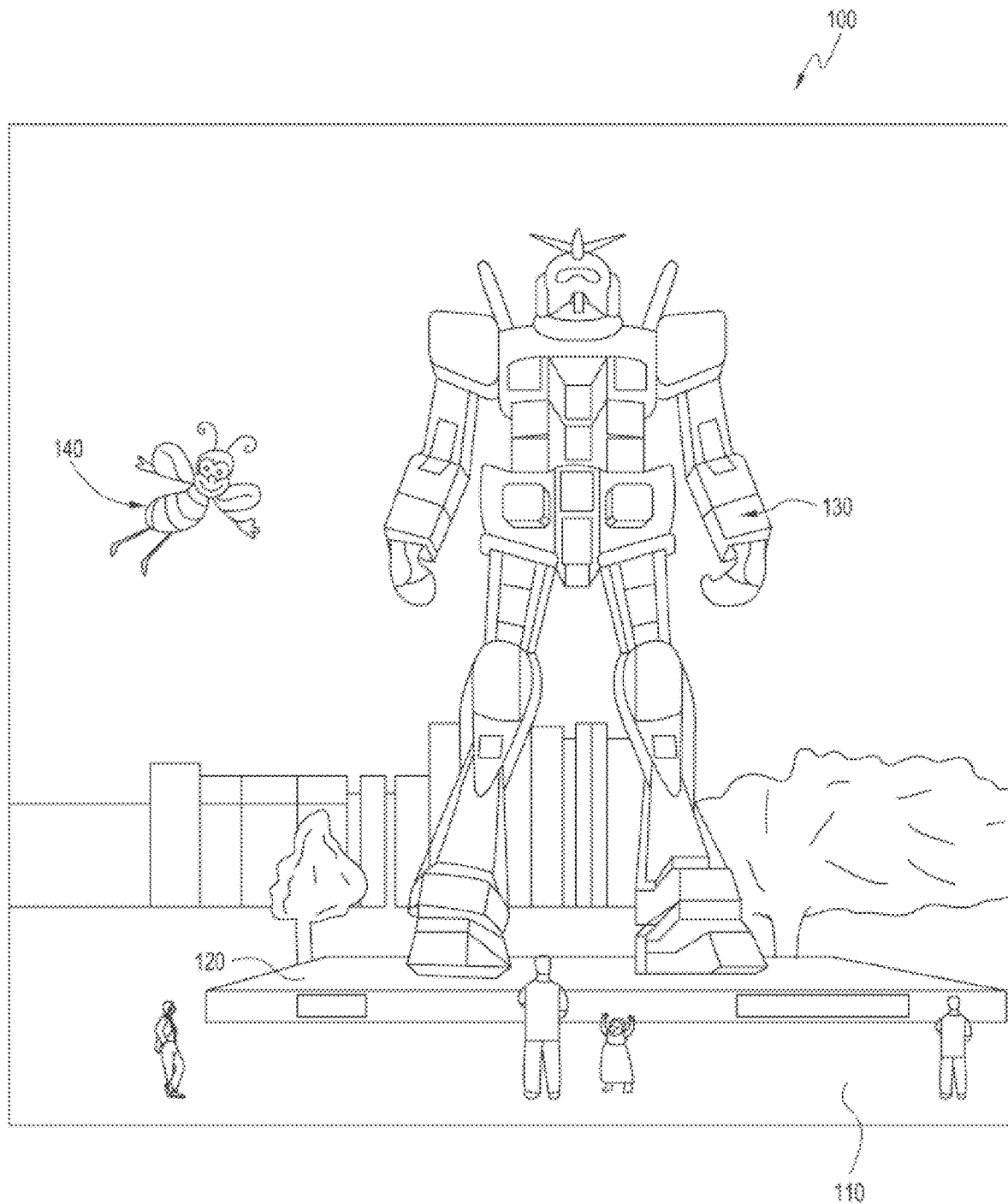
FIG. 1 depicts an illustration of a mixed reality scenario with certain virtual reality objects, and certain physical objects viewed by a person.

Throughout the drawings, reference numbers may be re-used to indicate correspondence between referenced elements. Unless indicated otherwise, the drawings are schematic and not necessarily drawn to scale. The drawings are provided to illustrate example embodiments described herein and are not intended to limit the scope of the disclosure.

DETAILED DESCRIPTION

Overview

A wearable display system such as, e.g., an AR, MR, or VR display system can track the user's eyes in order to project virtual content toward where the user is looking. An eye tracking system can include an inward-facing, eye-tracking camera, and light sources (e.g., infrared light emitting diodes) that provide reflections (called glints) from the user's corneas. A processor can analyze images of the user's eyes taken by the eye-tracking camera to obtain positions of the glints and other eye features (e.g., the pupil or iris) and determine eye gaze from the glints and eye features.

Eye images that are sufficient to show not only the glints but also the eye features may be taken with relatively long exposure times (e.g., several hundred to a thousand µs). However, the glints may be saturated in such longer exposure images, which can make it challenging to accurately identify the position of the glint center. For example, an uncertainty in the glint position may be 10 to 20 pixels, which can introduce a corresponding error in the gaze direction of about 20 to 50 arcminutes.

Accordingly, various embodiments of the eye tracking systems described herein obtain images of the eye at different exposure times or at different frame rates. For example, longer exposure images of the eye taken at a longer exposure time can show iris or pupil features, and shorter exposure images can show peaks of glints reflected from the cornea. The shorter exposure images are sometimes referred to herein as glint images, because they may be used to identify coordinate positions of glints in the images. The shorter exposure glint images may, in some implementations, be taken at a high frame rate (HFR) for accurate gaze prediction (e.g., a frame rate that is higher than the frame rate for the longer exposure images). The shorter exposure glint images can be analyzed to provide glint locations to subpixel accuracy leading to accurate predictions of gaze direction (e.g., to within a few arcminutes or better). The longer exposure images can be analyzed for pupil center or center of rotation.

In some implementations, at least a portion of a glint image is temporarily stored in a buffer and that portion of the glint image is analyzed to identify positions of one or more glints that may be located in that portion. For example, the portion may comprise a relatively small number of pixels, rows, or columns of the glint image. In some cases, the portion may comprise an n×m portion of the glint image, where n and m are integers that can be in a range from about 1 to 20. After the positions of the glint(s) are identified, the buffer may be cleared. An additional portion of the glint image may then be stored in the buffer for analysis, until either the entire glint image has been processed or all the glints (commonly, four) have been identified. The glint positions (e.g., Cartesian coordinates) may be used for subsequent actions in the eye-tracking process, and after the glint positions have been stored or communicated to a suitable processor, the glint image may be deleted from memory (buffer memory or other volatile or non-volatile storage). Such buffering may advantageously permit rapid processing of the glint image to identify glint positions or reduce storage needs of the eye-tracking process since the glint image may be deleted after use.

Accordingly, in certain embodiments, the shorter exposure images are not combined with the longer exposure images to obtain a high dynamic range (HDR) image that is used for eye tracking. Rather, in some such embodiments, the shorter exposure images and the longer exposure images are processed separately and are used to determine different information. For example, the shorter exposure image may be used for identifying glint positions (e.g., coordinates of the glint centers) or eye gaze direction. The shorter exposure image may be deleted from memory (e.g., a buffer) after the glint positions are determined. The longer exposure images may be used for determining pupil center or center of rotation, extract iris features for biometric security applications, determine eyelid shape or occlusion of the iris or pupil by the eyelid, measure pupil size, determine render camera parameters, and so forth. In some implementations, different processors perform the processing of the shorter and longer exposure images. For example, a processor in the head-mounted display may process the shorter exposure images, and a processor in a non-head mounted unit (e.g., a beltpack) may process the longer exposure images.

Thus, various embodiments of the multiple exposure time techniques described herein can reap the benefits of HDR luminosity that is collectively provided by both the shorter and longer exposure images, without combining, compositing, merging, or otherwise processing such short and long exposure images together (e.g., as an HDR image). As such, various embodiments of the multiple exposure eye tracking system do not use such short and long exposure images to generate or otherwise obtain HDR images.

In various embodiments, the exposure time of the longer exposure image may be in a range from 200 µs to 1200 µs, for example, about 700 µs. The longer exposure images can be taken at a frame rate in a range from 10 frames per second (fps) to 60 fps (e.g., 30 fps), 30 fps to 60 fps, or some other range. The exposure time of the glint images may be in a range from 5 µs to 100 µs, for example, less than about 40 µs. The ratio of the exposure time for the longer exposure image relative to the exposure time for the shorter exposure glint image can be in a range from 5 to 50, 10 to 20, or some other range. The glint images can be taken at a frame rate in a range from 50 fps to 1000 fps (e.g., 120 fps), 200 fps to 400 fps, or some other range in various embodiments. The ratio of the frame rate for the glint images relative to the frame rate for the longer exposure images can be in a range from 1 to 100, 1 to 50, 2 to 20, 3 to 10, or some other ratio.

Some wearable systems may utilize foveated rendering techniques in which virtual content may be rendered primarily in the direction the user is looking. Embodiments of the eye tracking system can accurately estimate future gaze direction (e.g., out to about 50 ms in the future), which can be used by the rendering system to prepare virtual content for future rendering, and which may advantageously reduce rendering latency and improve user experience.

Examples of 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
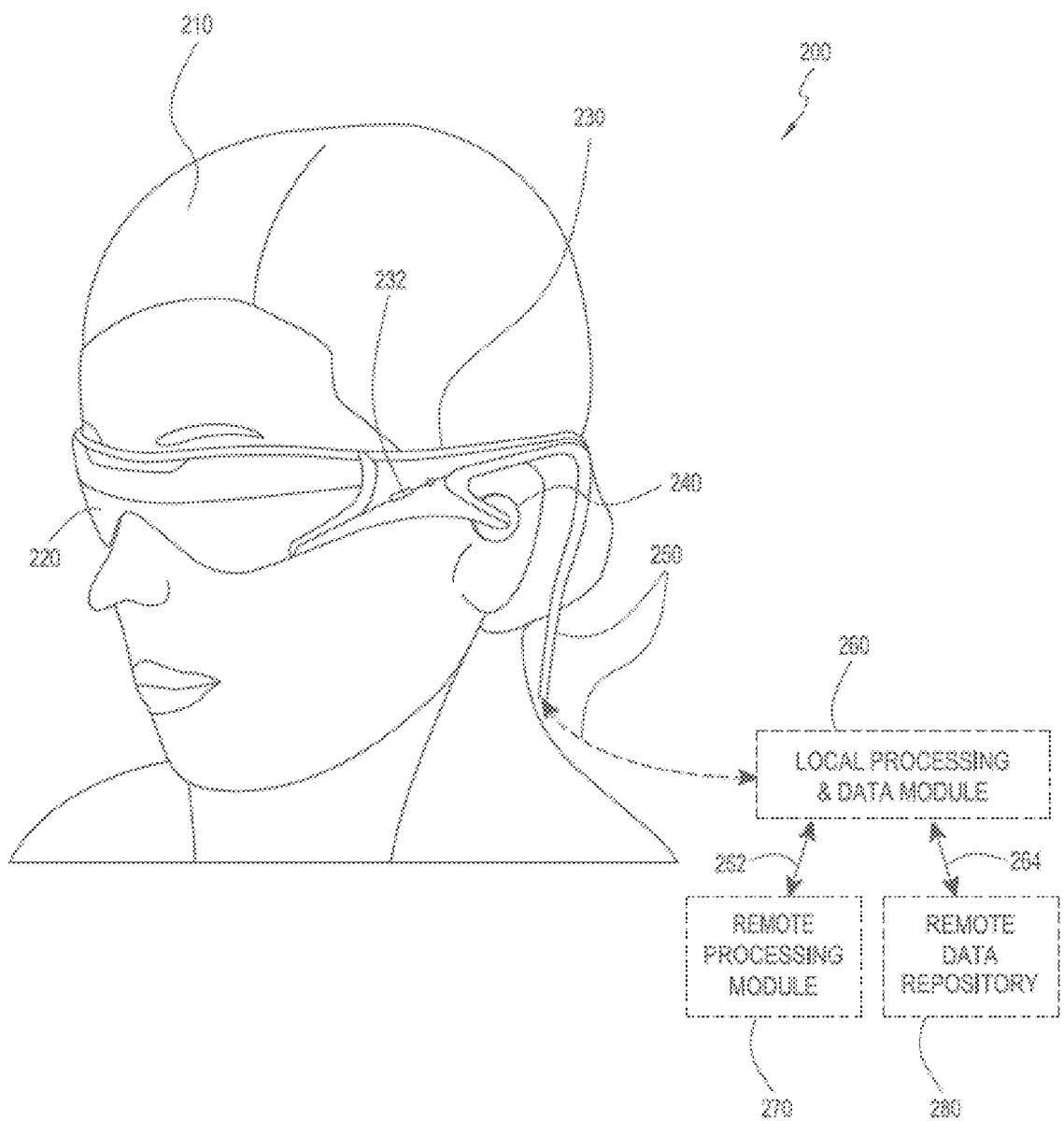
FIG. 2 schematically illustrates an example of a wearable system.

FIG. 2 illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210. The inward-facing imaging system 462 may include one or more cameras. For example, at least one camera may be used to image each eye. The images acquired by the cameras may be used to determine pupil size or eye pose for each eye separately, thereby allowing presentation of image information to each eye to be dynamically tailored to that eye.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; orb) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

Example Components of a Wearable System

Figure 3:
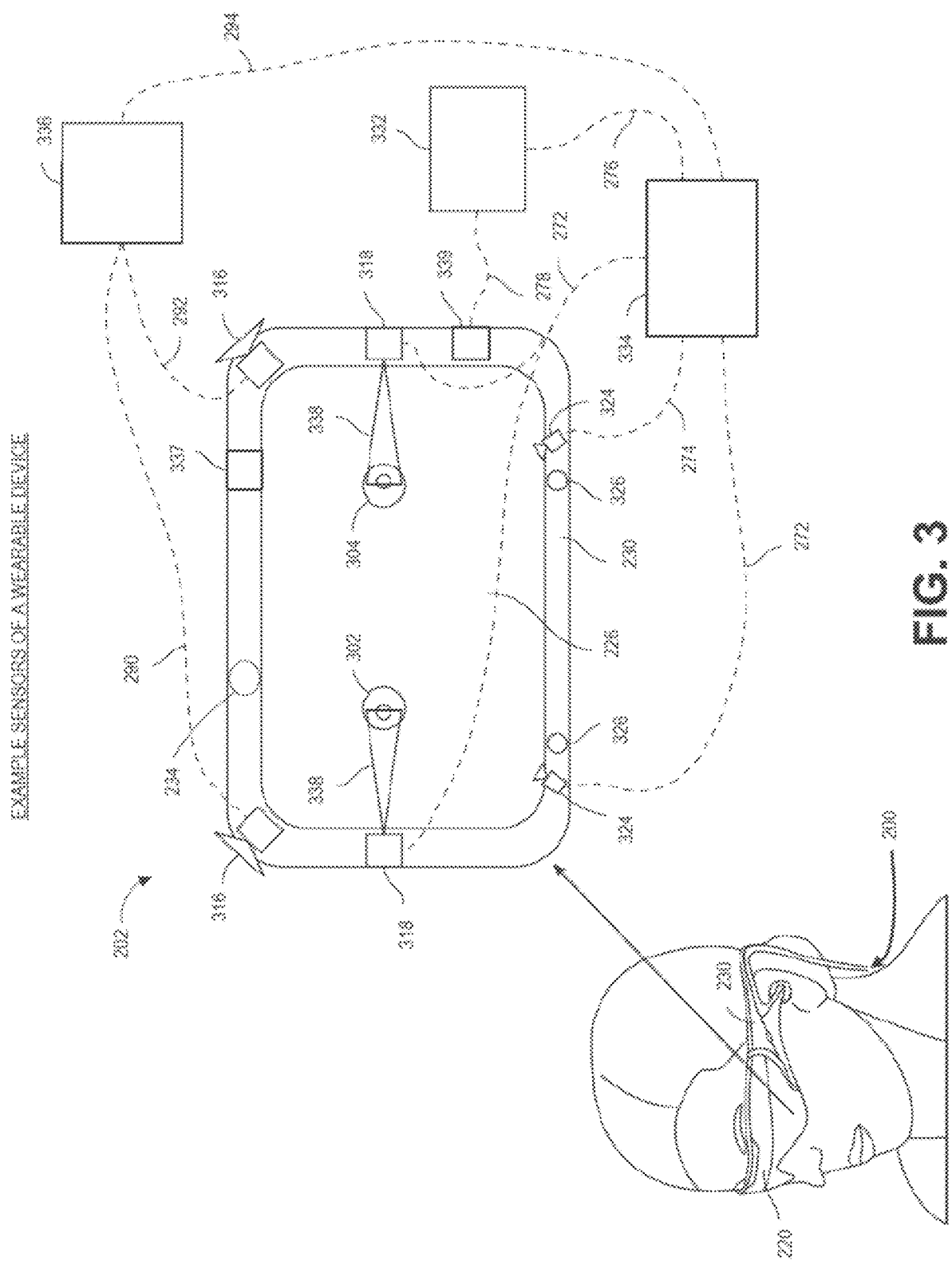
FIG. 3 schematically illustrates example components of a wearable system.

FIG. 3 schematically illustrates example components of a wearable system. FIG. 3 shows a wearable system 200 which can include a display 220 and a frame 230. A blown-up view 202 schematically illustrates various components of the wearable system 200. In certain implements, one or more of the components illustrated in FIG. 3 can be part of the display 220. The various components alone or in combination can collect a variety of data (such as e.g., audio or visual data) associated with the user of the wearable system 200 or the user's environment. It should be appreciated that other embodiments may have additional or fewer components depending on the application for which the wearable system is used. Nevertheless, FIG. 3 provides a basic idea of some of the various components and types of data that may be collected, analyzed, and stored through the wearable system.

FIG. 3 shows an example wearable system 200 which can include the display 220. The display 220 can comprise a display lens 226 that may be mounted to a user's head or a housing or frame 230, which corresponds to the frame 230. The display lens 226 may comprise one or more transparent mirrors positioned by the housing 230 in front of the user's eyes 302, 304 and may be configured to bounce projected light 338 into the eyes 302, 304 and facilitate beam shaping, while also allowing for transmission of at least some light from the local environment. The wavefront of the projected light beam 338 may be bent or focused to coincide with a desired focal distance of the projected light. As illustrated, two wide-field-of-view machine vision cameras 316 (also referred to as world cameras) can be coupled to the housing 230 to image the environment around the user. These cameras 316 can be dual capture visible light/non-visible (e.g., infrared) light cameras. The cameras 316 may be part of the outward-facing imaging system 464 shown in FIG. 4. Image acquired by the world cameras 316 can be processed by the pose processor 336. For example, the pose processor 336 can implement one or more object recognizers 708 (e.g., shown in FIG. 7) to identify a pose of a user or another person in the user's environment or to identify a physical object in the user's environment.

With continued reference to FIG. 3, a pair of scanned-laser shaped-wavefront (e.g., for depth) light projector modules with display mirrors and optics configured to project light 338 into the eyes 302, 304 are shown. The depicted view also shows two miniature infrared cameras 324 paired with light sources 326 (such as light emitting diodes "LED"s), which are configured to be able to track the eyes 302, 304 of the user to support rendering and user input. The light sources 326 may emit light in the infrared (IR) portion of the optical spectrum, because the eyes 302, 304 are not sensitive to IR light and will not perceive the light sources as shining into the user's eyes, which would be uncomfortable. The cameras 324 may be part of the inward-facing imaging system 462 shown in FIG. 4. The wearable system 200 can further feature a sensor assembly 339, which may comprise X, Y, and Z axis accelerometer capability as well as a magnetic compass and X, Y, and Z axis gyro capability, preferably providing data at a relatively high frequency, such as 200 Hz. The sensor assembly 339 may be part of the IMU described with reference to FIG. 2A The depicted system 200 can also comprise a head pose processor 336, such as an ASIC (application specific integrated circuit), FPGA (field programmable gate array), or ARM processor (advanced reduced-instruction-set machine), which may be configured to calculate real or near-real time user head pose from wide field of view image information output from the capture devices 316. The head pose processor 336 can be a hardware processor and can be implemented as part of the local processing and data module 260 shown in FIG. 2.

The wearable system can also include one or more depth sensors 234. The depth sensor 234 can be configured to measure the distance between an object in an environment to a wearable device. The depth sensor 234 may include a laser scanner (e.g., a lidar), an ultrasonic depth sensor, or a depth sensing camera. In certain implementations, where the cameras 316 have depth sensing ability, the cameras 316 may also be considered as depth sensors 234.

Also shown is a processor 332 configured to execute digital or analog processing to derive pose from the gyro, compass, or accelerometer data from the sensor assembly 339. The processor 332 may be part of the local processing and data module 260 shown in FIG. 2. The wearable system 200 as shown in FIG. 3 can also include a position system such as, e.g., a GPS 337 (global positioning system) to assist with pose and positioning analyses. In addition, the GPS may further provide remotely-based (e.g., cloud-based) information about the user's environment. This information may be used for recognizing objects or information in user's environment.

The wearable system may combine data acquired by the GPS 337 and a remote computing system (such as, e.g., the remote processing module 270, another user's ARD, etc.) which can provide more information about the user's environment. As one example, the wearable system can determine the user's location based on GPS data and retrieve a world map (e.g., by communicating with a remote processing module 270) including virtual objects associated with the user's location. As another example, the wearable system 200 can monitor the environment using the world cameras 316 (which may be part of the outward-facing imaging system 464 shown in FIG. 4). Based on the images acquired by the world cameras 316, the wearable system 200 can detect objects in the environment. The wearable system can further use data acquired by the GPS 337 to interpret the characters.

The wearable system 200 may also comprise a rendering engine 334 which can be configured to provide rendering information that is local to the user to facilitate operation of the scanners and imaging into the eyes of the user, for the user's view of the world. The rendering engine 334 may be implemented by a hardware processor (such as, e.g., a central processing unit or a graphics processing unit). In some embodiments, the rendering engine is part of the local processing and data module 260. The rendering engine 334 may comprise the light-field render controller 618 described with reference to FIGS. 6 and 7. The rendering engine 334 can be communicatively coupled (e.g., via wired or wireless links) to other components of the wearable system 200. For example, the rendering engine 334, can be coupled to the eye cameras 324 via communication link 274, and be coupled to a projecting subsystem 318 (which can project light into user's eyes 302, 304 via a scanned laser arrangement in a manner similar to a retinal scanning display) via the communication link 272. The rendering engine 334 can also be in communication with other processing units such as, e.g., the sensor pose processor 332 and the image pose processor 336 via links 276 and 294 respectively.

The cameras 324 (e.g., mini infrared cameras) may be utilized to track the eye pose to support rendering and user input. Some example eye poses may include where the user is looking or at what depth he or she is focusing (which may be estimated with eye vergence). The cameras 324 and the infrared light sources 326 can be used to provide data to for the multiple exposure time eye-tracking techniques described herein. The GPS 337, gyros, compass, and accelerometers 339 may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 3 are for illustration purposes only. Multiple sensors and other functional modules are shown together for ease of illustration and description. Some embodiments may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the image pose processor 336, sensor pose processor 332, and rendering engine 334 may be positioned in a beltpack and configured to communicate with other components of the wearable system via wireless communication, such as ultra-wideband, Wi-Fi, Bluetooth, etc., or via wired communication. The depicted housing 230 preferably is head-mountable and wearable by the user. However, some components of the wearable system 200 may be worn to other portions of the user's body. For example, the speaker 240 may be inserted into the ears of a user to provide sound to the user.

Regarding the projection of light 338 into the eyes 302, 304 of the user, in some embodiment, the cameras 324 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred. Examples of wearable devices and other display systems of the present disclosure are also described in U.S. Patent Publication No. 2016/0270656, which is incorporated by reference herein in its entirety.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Further spatially coherent light with a beam diameter of less than about 0.7 millimeters can be correctly resolved by the human eye regardless of where the eye focuses. Thus, to create an illusion of proper focal depth, the eye vergence may be tracked with the cameras 324, and the rendering engine 334 and projection subsystem 318 may be utilized to render all objects on or close to the horopter in focus, and all other objects at varying degrees of defocus (e.g., using intentionally-created blurring). Preferably, the system 220 renders to the user at a frame rate of about 60 frames per second or greater. As described above, preferably, the cameras 324 may be utilized for eye tracking, and software may be configured to pick up not only vergence geometry but also focus location cues to serve as user inputs. Preferably, such a display system is configured with brightness and contrast suitable for day or night use.

In some embodiments, the display system preferably has latency of less than about 20 milliseconds for visual object alignment, less than about 0.1 degree of angular alignment, and about 1 arc minute of resolution, which, without being limited by theory, is believed to be approximately the limit of the human eye. The display system 220 may be integrated with a localization system, which may involve GPS elements, optical tracking, compass, accelerometers, or other data sources, to assist with position and pose determination; localization information may be utilized to facilitate accurate rendering in the user's view of the pertinent world (e.g., such information would facilitate the glasses to know where they are with respect to the real world).

In some embodiments, the wearable system 200 is configured to display one or more virtual images based on the accommodation of the user's eyes. Unlike prior 3D display approaches that force the user to focus where the images are being projected, in some embodiments, the wearable system is configured to automatically vary the focus of projected virtual content to allow for a more comfortable viewing of one or more images presented to the user. For example, if the user's eyes have a current focus of 1 m, the image may be projected to coincide with the user's focus. If the user shifts focus to 3 m, the image is projected to coincide with the new focus. Thus, rather than forcing the user to a predetermined focus, the wearable system 200 of some embodiments allows the user's eye to a function in a more natural manner.

Such a wearable system 200 may eliminate or reduce the incidences of eye strain, headaches, and other physiological symptoms typically observed with respect to virtual reality devices. To achieve this, various embodiments of the wearable system 200 are configured to project virtual images at varying focal distances, through one or more variable focus elements (VFEs). In one or more embodiments, 3D perception may be achieved through a multi-plane focus system that projects images at fixed focal planes away from the user. Other embodiments employ variable plane focus, wherein the focal plane is moved back and forth in the z-direction to coincide with the user's present state of focus.

In both the multi-plane focus systems and variable plane focus systems, wearable system 200 may employ eye tracking to determine a vergence of the user's eyes, determine the user's current focus, and project the virtual image at the determined focus. In other embodiments, wearable system 200 comprises a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some other embodiments, a spatial light modulator may project the images to the user through various optical components. For example, as described further below, the spatial light modulator may project the images onto one or more waveguides, which then transmit the images to the user.

Waveguide Stack Assembly

Figure 4:
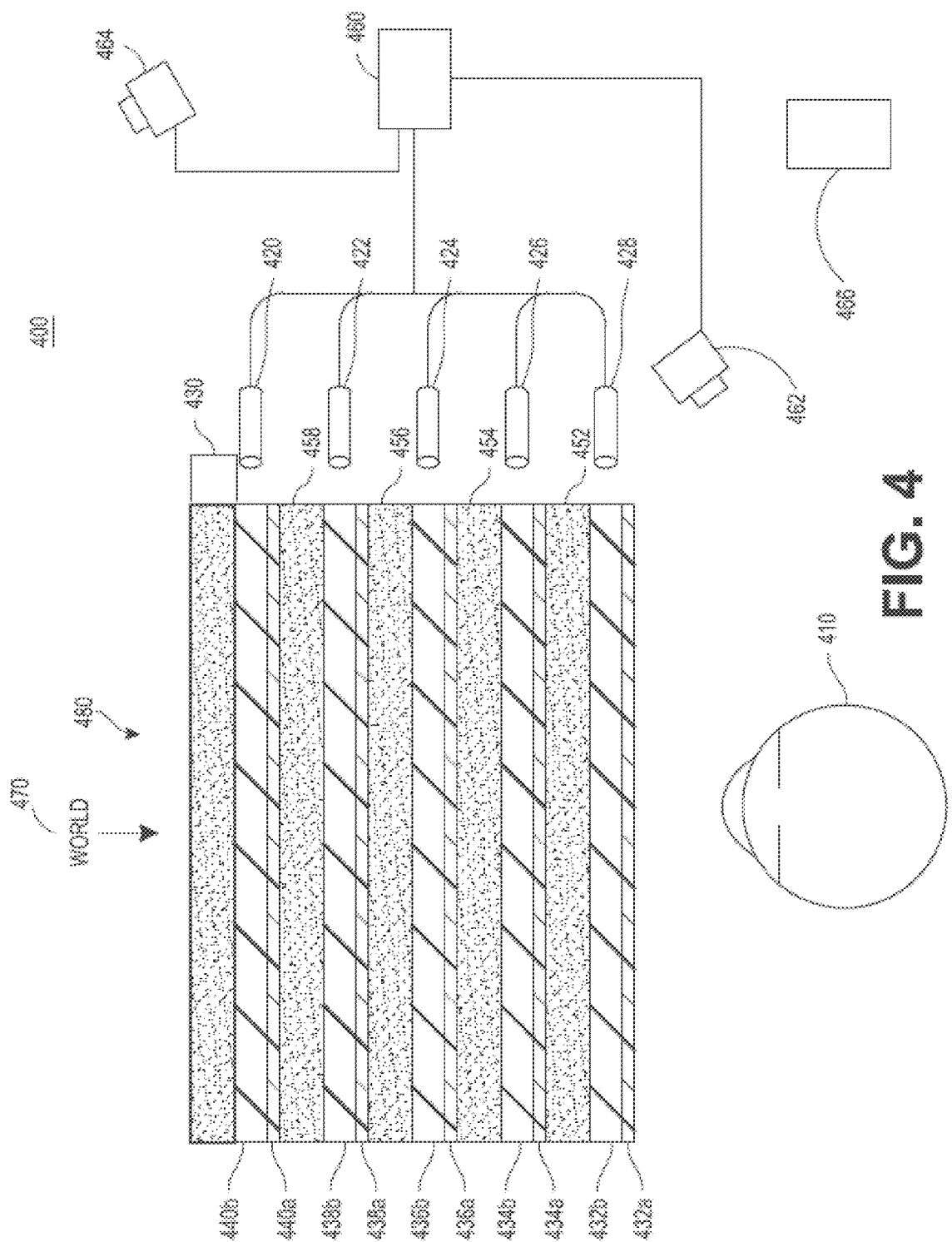
FIG. 4 schematically illustrates an example of a waveguide stack of a wearable device for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432*b*, 434*b*, 436*b*, 438*b*, 440*b*. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432*b*, 434*b*, 436*b*, 438*b*, 440*b* or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440*b*, 438*b*, 436*b*, 434*b*, 432*b*, each of which may be configured to distribute incoming light across each respective waveguide, for output toward the eye 410. Light exits an output surface of the image injection devices 420, 422, 424, 426, 428 and is injected into a corresponding input edge of the waveguides 440*b*, 438*b*, 436*b*, 434*b*, 432*b*. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440*b*, 438*b*, 436*b*, 434*b*, 432*b*, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440*b*, 438*b*, 436*b*, 434*b*, 432*b*. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440*b*, 438*b*, 436*b*, 434*b*, 432*b* may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. (Compensating lens layer 430 and the stacked waveguide assembly 480 as a whole may be configured such that light coming from the world 470 is conveyed to the eye 410 at substantially the same level of divergence (or collimation) as the light had when it was initially received by the stacked waveguide assembly 480.) Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include 4π steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 230 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (comprising, e.g., a digital camera), which observes the movements of the user, such as the eye movements (e.g., for eye-tracking) and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). The inward-facing imaging system 426 can be used to provide input images and information for the multiple exposure time eye-tracking techniques described herein. In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc. The inward-facing imaging system 426 can comprise the cameras 324 and light sources 326 (e.g., IR LEDs) described with reference to FIG. 3.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Example of an Eye Image

Figures 5, 5A:
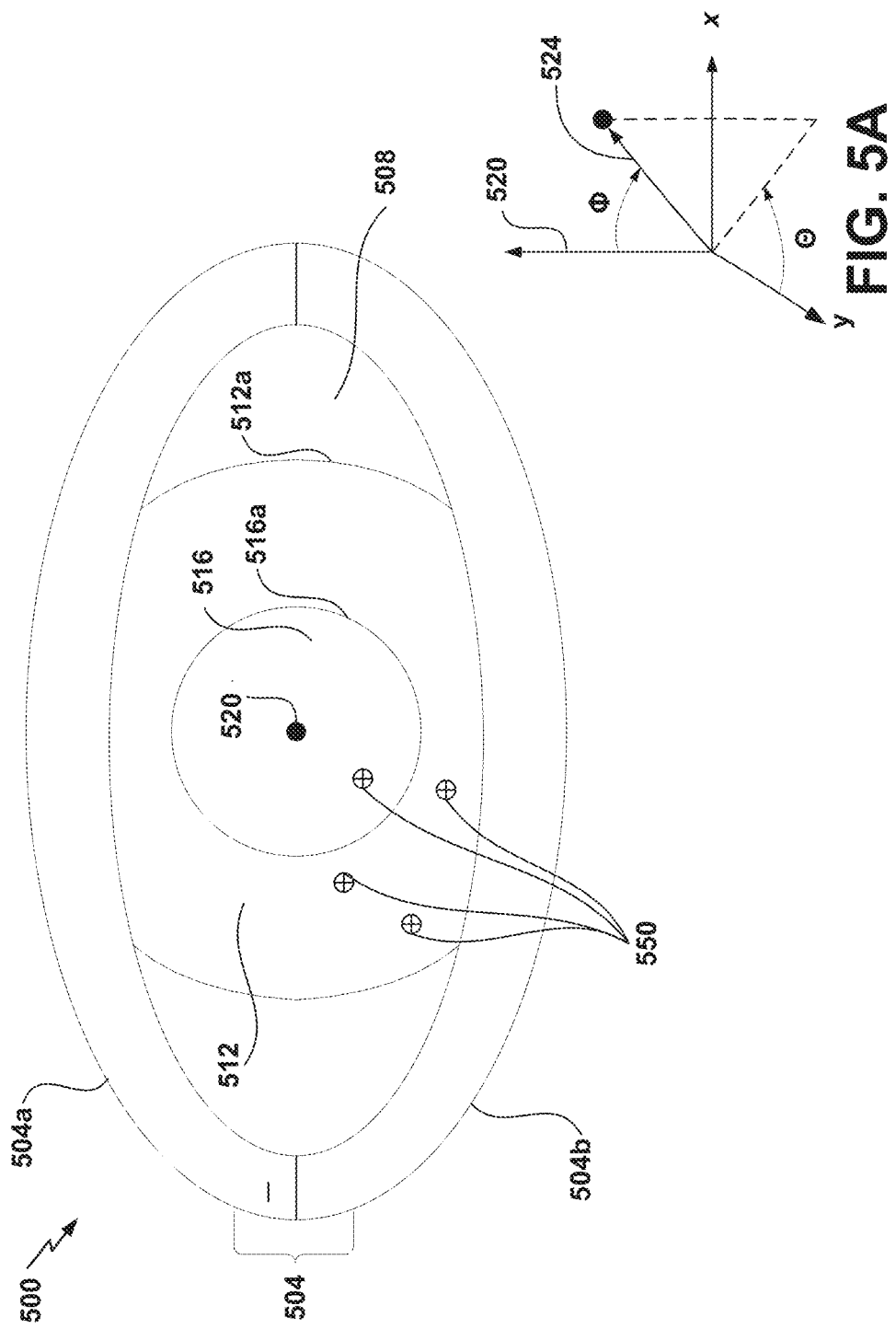
FIG. 5 schematically illustrates an example of an eye.
FIG. 5A schematically illustrates an example coordinate system for determining an eye pose of an eye.

FIG. 5 illustrates an image of an eye 500 with eyelids 504, sclera 508 (the "white" of the eye), iris 512, and pupil 516. Curve 516a shows the pupillary boundary between the pupil 516 and the iris 512, and curve 512a shows the limbic boundary between the iris 512 and the sclera 508. The eyelids 504 include an upper eyelid 504a and a lower eyelid 504b. The eye 500 is illustrated in a natural resting pose (e.g., in which the user's face and gaze are both oriented as they would be toward a distant object directly ahead of the user). The natural resting pose of the eye 500 can be indicated by a natural resting direction 520, which is a direction orthogonal to the surface of the eye 500 when in the natural resting pose (e.g., directly out of the plane for the eye 500 shown in FIG. 5) and in this example, centered within the pupil 516.

As the eye 500 moves to look toward different objects, the eye pose will change relative to the natural resting direction 520. The current eye pose can be determined with reference to an eye pose direction 524, which is a direction orthogonal to the surface of the eye (and centered in within the pupil 516) but oriented toward the object at which the eye is currently directed. With reference to an example coordinate system shown in FIG. 5A, the pose of the eye 500 can be expressed as two angular parameters indicating an azimuthal deflection and a zenithal deflection of the eye pose direction 524 of the eye, both relative to the natural resting direction 520 of the eye. For purposes of illustration, these angular parameters can be represented as θ (azimuthal deflection, determined from a fiducial azimuth) and φ (zenithal deflection, sometimes also referred to as a polar deflection). In some implementations, angular roll of the eye around the eye pose direction 524 can be included in the determination of eye pose, and angular roll can be included in the eye-tracking. In other implementations, other techniques for determining the eye pose can be used, for example, a pitch, yaw, and optionally roll system. Thus, the eye pose can be provided as a 2DOF or a 3DOF orientation.

The light sources 326 can illuminate the eye 500 (e.g., in the IR), and reflections of the light sources from the eye (typically off of the cornea) are referred to as glints. FIG. 5 schematically shows an example where there are four glints 550. The positions, number, brightnesses, etc. of the glints 550 can depend on the position and number of the light sources 326, the pose of the eye, and so forth. As will be further described below, an eye-tracking camera 324 can obtain eye images, and a processor can analyze the eye images to determine positions and movements of the glints for eye-tracking. In some embodiments, multiple eye images with different exposure times or different frame rates can be used to provide high accuracy eye tracking.

An eye image can be obtained from a video using any appropriate process, for example, using a video processing algorithm that can extract an image from one or more sequential frames (or non-sequential frames). The inward-facing imaging system 426 of FIG. 4 or the camera 324 and light source 326 of FIG. 3 can be utilized to provide the video or image(s) of one or both of the eyes. The pose of the eye can be determined from the eye image using a variety of eye-tracking techniques, for example, the multiple exposure time techniques for accurate corneal glint detection that are described herein. For example, an eye pose can be determined by considering the lensing effects of the cornea on light sources that are provided. Any suitable eye tracking technique can be used for determining eye pose in the eyelid shape estimation techniques described herein.

Example of an Eye Tracking System

Figure 6:
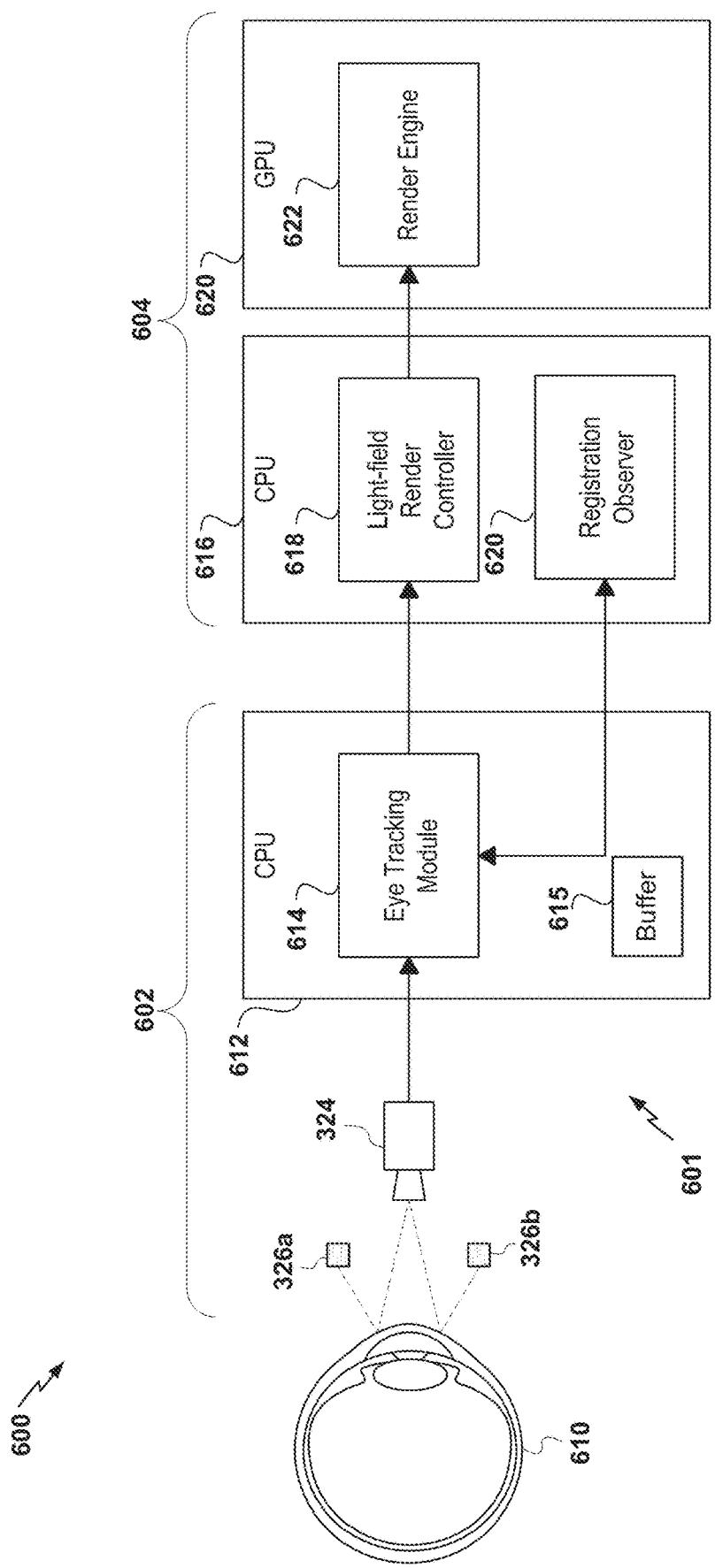
FIG. 6 is a schematic diagram of an example of a wearable system that includes an eye tracking system, which can implement embodiments of the multiple exposure time eye tracking techniques described herein.

FIG. 6 illustrates a schematic diagram of a wearable system 600 that includes an eye tracking system 601. The wearable system 600 may be an embodiment of the wearable systems 200 and 400 described with reference to FIGS. 2 to 4. The wearable system 600 may, in at least some embodiments, include components located in a head-mounted unit 602 and components located in a non-head-mounted unit 604. Non-head mounted unit 604 may be, as examples, a belt-mounted component, a hand-held component, a component in a backpack, a remote component, etc. Incorporating some of the components of the wearable system 600 in non-head-mounted unit 604 may help to reduce the size, weight, complexity, and cost of the head-mounted unit 602. In some implementations, some or all of the functionality described as being performed by one or more components of head-mounted unit 602 and/or non-head mounted unit 604 may be provided by way of one or more components included elsewhere in the wearable system 600. For example, some or all of the functionality described below in association with a CPU 612 of head-mounted unit 602 may be provided by way of a CPU 616 of non-head mounted unit 604, and vice versa. In some examples, some or all of such functionality may be provided by way of peripheral devices of wearable system 600. Furthermore, in some implementations, some or all of such functionality may be provided by way of one or more cloud computing devices or other remotely-located computing devices in a manner similar to that which has been described above with reference to FIG. 2.

As shown in FIG. 6, wearable system 600 can include an eye tracking system 601 including a camera 324 that captures images of a user's eye 610. If desired, the eye tracking system may also include light sources 326a and 326b (such as light emitting diodes "LED"s). The light sources 326a and 326b may generate glints (e.g., reflections off of the user's eyes that appear in images of the eye captured by camera 324). Schematic examples of glints 550 are shown in FIG. 5. The positions of the light sources 326a and 326b relative to the camera 324 may be known and, as a consequence, the positions of the glints within images captured by camera 324 can be used in tracking the user's eyes (as will be described in more detail below). In at least one embodiment, there may be one light source 326 and one camera 324 associated with a single one of the user's eyes 610. In another embodiment, there may be one light source 326 and one camera 324 associated with each of a user's eyes. 610. In yet other embodiments, there may be one or more cameras 324 and one or more light sources 326 associated with one or each of a user's eyes 610. As a specific example, there may be two light sources 326a and 326b and one or more cameras 324 associated with each of a user's eyes 610. As another example, there may be three or more light sources such as light sources 326a and 326b and one or more cameras 324 associated with each of a user's eyes 610.

Eye tracking module 614 may receive images from eye tracking camera(s) 324 and may analyze the images to extract various pieces of information. As described herein, the images from the eye tracking camera(s) may include shorter exposure (glint) images and longer exposure images. As examples, the eye tracking module 614 may detect the user's eye poses, a three-dimensional position of the user's eye relative to the eye tracking camera 324 (and to the head-mounted unit 602), the direction one or both of the user's eyes 610 are focused on, the user's vergence depth (e.g., the depth from the user at which the user is focusing on), the positions of the user's pupils, the positions of the user's cornea and corneal sphere, the center of rotation of each of the user's eyes, or the center of perspective of each of the user's eyes. As shown in FIG. 6, the eye tracking module 614 may be a software module implemented using a CPU 612 in a head-mounted unit 602.

Data from eye tracking module 614 may be provided to other components in the wearable system. As example, such data may be transmitted to components in a non-head-mounted unit 604 such as CPU 616 including software modules for a light-field render controller 618 and a registration observer 620.

As described further herein, in some implementations of the multiple exposure time eye tracking technology, the functionality may be performed differently than shown in FIG. 6 (or FIG. 7), which are intended to be illustrative and not limiting. For example, in some implementations, the shorter exposure glint images can be processed by the CPU 612 in the head-mounted unit 602 (which may be disposed in the camera 324) and the longer exposure images can be processed by the CPU 616 (or GPU 621) in the non-head mounted unit 604 (e.g., in a beltpack). In some such implementations, some of the eye tracking functionality performed by the eye tracking module 614 may be performed by a processor (e.g., the CPU 616 or GPU 621) in the non-head mounted unit 604 (e.g., the beltpack). This may be advantageous because some of the eye tracking functionality may be CPU-intensive and may, in some cases, be performed more efficiently or rapidly by a more powerful processor disposed in the non-head mounted unit 604.

Render controller 618 may use information from eye tracking module 614 to adjust images displayed to the user by render engine 622 (e.g., a render engine that may be a software module in GPU 620 and that may provide images to the display 220). As an example, the render controller 618 may adjust images displayed to the user based on the user's center of rotation or center of perspective. In particular, the render controller 618 may use information on the user's center of perspective to simulate a render camera (e.g., to simulate collecting images from the user's perspective) and may adjust images displayed to the user based on the simulated render camera. Further details discussing the creation, adjustment, and use of render cameras in rendering processes are provided in U.S. patent application Ser. No. 15/274,823, published as U.S. Patent Application Publication No. 2017/0091996, entitled "METHODS AND SYSTEMS FOR DETECTING AND COMBINING STRUCTURAL FEATURES IN 3D RECONSTRUCTION," which is expressly incorporated by reference herein in its entirety.

In some examples, one or more modules (or components) of the system 600 (e.g., light-field render controller 618, render engine 620, etc.) may determine the position and orientation of the render camera within render space based on the position and orientation of the user's head and eyes (e.g., as determined based on head pose and eye tracking data, respectively). For example, the system 600 may effectively map the position and orientation of the user's head and eyes to particular locations and angular positions within a 3D virtual environment, place and orient render cameras at the particular locations and angular positions within the 3D virtual environment, and render virtual content for the user as it would be captured by the render camera. Further details discussing real world to virtual world mapping processes are provided in U.S. patent application Ser. No. 15/296,869, published as U.S. Patent Application Publication No. 2017/0109936, entitled "SELECTING VIRTUAL OBJECTS IN A THREE-DIMENSIONAL SPACE," which is expressly incorporated by reference herein in its entirety. As an example, the render controller 618 may adjust the depths at which images are displayed by selecting which depth plane (or depth planes) are utilized at any given time to display the images. In some implementations, such a depth plane switch may be carried out through an adjustment of one or more intrinsic render camera parameters.

Registration observer 620 may use information from the eye tracking module 614 to identify whether the head-mounted unit 602 is properly positioned on a user's head. As an example, the eye tracking module 614 may provide eye location information, such as the positions of the centers of rotation of the user's eyes, indicative of the three-dimensional position of the user's eyes relative to camera 324 and head-mounted unit 602 and the eye tracking module 614 may use the location information to determine if display 220 is properly aligned in the user's field of view, or if the head-mounted unit 602 (or headset) has slipped or is otherwise misaligned with the user's eyes. As examples, the registration observer 620 may be able to determine if the head-mounted unit 602 has slipped down the user's nose bridge, thus moving display 220 away and down from the user's eyes (which may be undesirable), if the head-mounted unit 602 has been moved up the user's nose bridge, thus moving display 220 closer and up from the user's eyes, if the head-mounted unit 602 has been shifted left or right relative the user's nose bridge, if the head-mounted unit 602 has been lifted above the user's nose bridge, or if the head-mounted unit 602 has been moved in these or other ways away from a desired position or range of positions. In general, registration observer 620 may be able to determine if head-mounted unit 602, in general, and displays 220, in particular, are properly positioned in front of the user's eyes. In other words, the registration observer 620 may determine if a left display in display system 220 is appropriately aligned with the user's left eye and a right display in display system 220 is appropriately aligned with the user's right eye. The registration observer 620 may determine if the head-mounted unit 602 is properly positioned by determining if the head-mounted unit 602 is positioned and oriented within a desired range of positions and/or orientations relative to the user's eyes. Example registration observation and feedback techniques, which may be utilized by the registration observer 620, are described in U.S. patent application Ser. No. 15/717,747, filed Sep. 27, 2017, published as U.S. Patent Application Publication No. 2018/0096503, entitled "PERIOCULAR TEST FOR MIXED REALITY CALIBRATION" and U.S. patent application Ser. No. 16/251,017, filed Jan. 17, 2019, published as U.S. Patent Application Publication No. 2019/0222830, entitled "DISPLAY SYSTEMS AND METHODS FOR DETERMINING REGISTRATION BETWEEN A DISPLAY AND A USER'S EYES," both of which are incorporated by reference herein in their entireties.

The render controller 618 can receive eye tracking information from the eye tracking module 614 and may provide outputs to the render engine 622, which can generate images to be displayed for viewing by a user of the wearable system 600. As examples, the render controller 618 may receive a vergence depth, left and right eye centers of rotation (and/or centers of perspective), and other eye data such as blink data, saccade data, etc. Vergence depth information and other eye data and, based on such data, can cause the render engine 622 to convey content to a user with a particular depth plane (e.g., at a particular accommodation or focal distance). As discussed in connection with FIG. 4, the wearable system may include a plurality of discrete depth planes formed by a plurality of waveguides, each conveying image information with a varying level of wavefront curvature. In some embodiments, a wearable system may include one or more variable depth planes, such as an optical element that conveys image information with a level of wavefront curvature that varies over time. The render engine 622 can convey content to a user at a selected depth (e.g., cause the render engine 622 to direct the display 220 to switch depth planes), based in part of the user's vergence depth.

The render engine 622 can generate content by simulating cameras at the positions of the user's left and right eyes and generating content based on the perspectives of the simulated cameras. As discussed above, the render camera is a simulated camera for use in rendering virtual image content possibly from a database of objects in a virtual world. The objects may have locations and orientations relative to the user or wearer and possibly relative to real objects in the environment surrounding the user or wearer. The render camera may be included in a render engine to render virtual images based on the database of virtual objects to be presented to the eye. The virtual images may be rendered as if taken from the perspective the user or wearer. For example, the virtual images may be rendered as if captured by a camera (corresponding to the "render camera") having an aperture, lens, and detector viewing the objects in the virtual world. The virtual images are taken from the perspective of such a camera having a position of the "render camera." For example, the virtual images may be rendered as if captured from the perspective of a camera having a specific location with respect to the user's or wearer's eye so as to provide images that appear to be from the perspective of the user or wearer. In some implementations, the images are rendered as if captured from the perspective of a camera having an aperture at a specific location with respect to the user's or wearer's eye (such as the center of perspective or center of rotation as discussed herein, or elsewhere).

Example of an Eye Tracking Module

Figure 7:
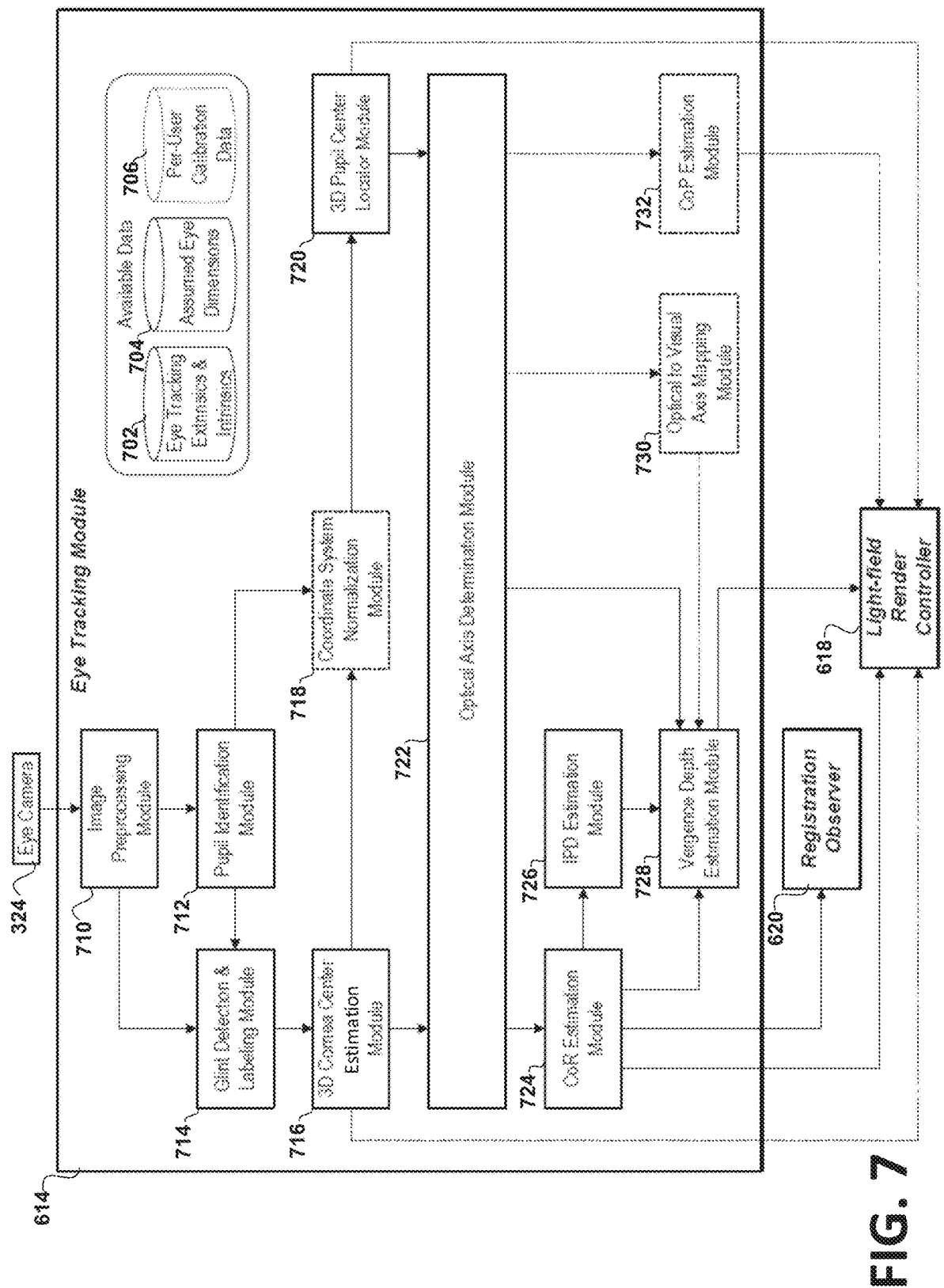
FIG. 7 is a block diagram of an example of a wearable system that includes an eye tracking system, which can implement embodiments of the multiple exposure time eye tracking techniques described herein.

A block diagram of an example eye tracking module 614 is shown in FIG. 7. As shown in FIG. 7, the eye tracking module 614 may include a variety of different submodules, may provide a variety of different outputs, and may utilize a variety of available data in tracking the user's eyes. As examples, eye tracking module 614 may utilize available data including eye tracking extrinsics and intrinsics, such as the geometric arrangements of the eye tracking camera 324 relative to the light sources 326 and the head-mounted-unit 602; assumed eye dimensions 704 such as a typical distance of approximately 4.7 mm between a user's center of cornea curvature and the average center of rotation of the user's eye or typical distances between a user's center of rotation and center of perspective; and per-user calibration data 706 such as a particular user's interpupillary distance. Additional examples of extrinsics, intrinsics, and other information that may be employed by the eye tracking module 614 are described in U.S. patent application Ser. No. 15/497,726, filed Apr. 26, 2017, published as U.S. Patent Application Publication No. 2018/0018515, entitled "IRIS BOUNDARY ESTIMATION USING CORNEA CURVATURE," which is incorporated by reference herein in its entirety. Example eye tracking modules and techniques, which may be implemented as the eye tracking module 614 or otherwise utilized by the eye tracking module 614, are described in U.S. patent application Ser. No. 16/250,931, filed Jan. 17, 2019, published as U.S. Patent Application Publication No. 2019/0243448, entitled "EYE CENTER OF ROTATION DETERMINATION, DEPTH PLANE SELECTION, AND RENDER CAMERA POSITIONING IN DISPLAY SYSTEMS," which is incorporated by reference herein in its entirety.

Image preprocessing module 710 may receive images from an eye camera such as eye camera 324 and may perform one or more preprocessing (e.g., conditioning) operations on the received images. As examples, image preprocessing module 710 may apply a Gaussian blur to the images, may down sample the images to a lower resolution, may applying an unsharp mask, may apply an edge sharpening algorithm, or may apply other suitable filters that assist with the later detection, localization, and labelling of glints, a pupil, or other features in the images from eye camera 324. The image preprocessing module 710 may apply a low-pass filter or a morphological filter such as an open filter, which can remove high-frequency noise such as from the pupillary boundary 516a (see FIG. 5), thereby removing noise that can hinder pupil and glint determination. The image preprocessing module 710 may output preprocessed images to the pupil identification module 712 and to the glint detection and labeling module 714.

Pupil identification module 712 may receive preprocessed images from the image preprocessing module 710 and may identify regions of those images that include the user's pupil. The pupil identification module 712 may, in some embodiments, determine the coordinates of the position, or coordinates, of the center, or centroid, of the user's pupil in the eye tracking images from camera 324. In at least some embodiments, pupil identification module 712 may identify contours in eye tracking images (e.g., contours of pupil iris boundary), identify contour moments (e.g., centers of mass), apply a starburst pupil detection and/or a canny edge detection algorithm, reject outliers based on intensity values, identify sub-pixel boundary points, correct for eye-camera distortion (e.g., distortion in images captured by eye camera 324), apply a random sample consensus (RANSAC) iterative algorithm to fit an ellipse to boundaries in the eye tracking images, apply a tracking filter to the images, and identify sub-pixel image coordinates of the user's pupil centroid. The pupil identification module 712 may output pupil identification data, which may indicate which regions of the preprocessing images module 712 identified as showing the user's pupil, to glint detection and labeling module 714. The pupil identification module 712 may provide the 2D coordinates of the user's pupil (e.g., the 2D coordinates of the centroid of the user's pupil) within each eye tracking image to glint detection module 714. In at least some embodiments, pupil identification module 712 may also provide pupil identification data of the same sort to coordinate system normalization module 718.

Pupil detection techniques, which may be utilized by pupil identification module 712, are described in U.S. Patent Publication No. 2017/0053165, published Feb. 23, 2017 and in U.S. Patent Publication No. 2017/0053166, published Feb. 23, 2017, each of which is incorporated by reference herein in its entirety.

Glint detection and labeling module 714 may receive preprocessed images from module 710 and pupil identification data from module 712. Glint detection module 714 may use this data to detect and/or identify glints (e.g., reflections off of the user's eye of the light from light sources 326) within regions of the preprocessed images that show the user's pupil. As an example, the glint detection module 714 may search for bright regions within the eye tracking image, sometimes referred to herein as "blobs" or local intensity maxima that are in the vicinity of the user's pupil or iris. In at least some embodiments, the glint detection module 714 may rescale (e.g., enlarge) the pupil ellipse to encompass additional glints. The glint detection module 714 may filter glints by size or by intensity. The glint detection module 714 may also determine the 2D positions of each of the glints within the eye tracking image. In at least some examples, the glint detection module 714 may determine the 2D positions of the glints relative to the user's pupil, which may also be referred to as the pupil-glint vectors. Glint detection and labeling module 714 may label the glints and output the preprocessing images with labeled glints to the 3D cornea center estimation module 716. Glint detection and labeling module 714 may also pass along data such as preprocessed images from module 710 and pupil identification data from module 712. In some implementations, the glint detection and labeling module 714 may determine which light source (e.g., from among a plurality of light sources of the system including infrared light sources 326a and 326b) produced each identified glint. In these examples, the glint detection and labeling module 714 may label the glints with information identifying the associated light source and output the preprocessing images with labeled glints to the 3D cornea center estimation module 716.

Pupil and glint detection, as performed by modules such as modules 712 and 714, can use any suitable techniques. As examples, edge detection can be applied to the eye image to identify glints, pupils, or irises. Edge detection can be applied by various edge detectors, edge detection algorithms, or filters. For example, a Canny Edge detector can be applied to the image to detect edges such as in lines of the image. Edges may include points located along a line that correspond to the local maximum derivative. For example, the pupillary boundary 516a or the iris (limbic) boundary 512a (see FIG. 5) can be located using a Canny edge detector. With the location of the pupil or iris determined, various image processing techniques can be used to detect the "pose" of the pupil 116. The pose can also be referred to as the gaze, pointing direction, or the orientation of the eye. For example, the pupil may be looking leftwards towards an object, and the pose of the pupil could be classified as a leftwards pose. Other methods can be used to detect the location of the pupil or glints. For example, a concentric ring can be located in an eye image using a Canny Edge detector. As another example, an integro-differential operator can be used to find the pupillary or limbus boundaries of the iris. For example, the Daugman integro-differential operator, the Hough transform, or other iris segmentation techniques can be used to return a curve that estimates the boundary of the pupil or the iris. The modules 712, 714 can apply the glint detection techniques described herein, which may use multiple eye images captured with different exposure times or different frame rates.

3D cornea center estimation module 716 may receive preprocessed images including detected glint data and pupil (or iris) identification data from modules 710, 712, 714. 3D cornea center estimation module 716 may use these data to estimate the 3D position of the user's cornea. In some embodiments, the 3D cornea center estimation module 716 may estimate the 3D position of an eye's center of cornea curvature or a user's corneal sphere, e.g., the center of an imaginary sphere having a surface portion generally coextensive with the user's cornea. The 3D cornea center estimation module 716 may provide data indicating the estimated 3D coordinates of the corneal sphere and/or user's cornea to the coordinate system normalization module 718, the optical axis determination module 722, and/or the light-field render controller 618. Techniques for estimating the positions of eye features such as a cornea or corneal sphere, which may be utilized by 3D cornea center estimation module 716 and other modules in the wearable systems of the present disclosure are discussed in U.S. patent application Ser. No. 15/497,726, filed Apr. 26, 2017, published as U.S. Patent Application Publication No. 2018/0018515, which is incorporated by reference herein in its entirety.

Coordinate system normalization module 718 may optionally (as indicated by its dashed outline) be included in eye tracking module 614. Coordinate system normalization module 718 may receive data indicating the estimated 3D coordinates of the center of the user's cornea (and/or the center of the user's corneal sphere) from the 3D cornea center estimation module 716 and may also receive data from other modules. Coordinate system normalization module 718 may normalize the eye camera coordinate system, which may help to compensate for slippages of the wearable device (e.g., slippages of the head-mounted component from its normal resting position on the user's head, which may be identified by registration observer 620). Coordinate system normalization module 718 may rotate the coordinate system to align the z-axis (e.g., the vergence depth axis) of the coordinate system with the cornea center (e.g., as indicated by the 3D cornea center estimation module 716) and may translate the camera center (e.g., the origin of the coordinate system) to a predetermined distance away from the cornea center such as 30 mm (e.g., module 718 may enlarge or shrink the eye tracking image depending on whether the eye camera 324 was determined to be nearer or further than the predetermined distance). With this normalization process, the eye tracking module 614 may be able to establish a consistent orientation and distance in the eye tracking data, relatively independent of variations of headset positioning on the user's head. Coordinate system normalization module 718 may provide 3D coordinates of the center of the cornea (and/or corneal sphere), pupil identification data, and preprocessed eye tracking images to the 3D pupil center locator module 720.

3D pupil center locator module 720 may receive data, in the normalized or the unnormalized coordinate system, including the 3D coordinates of the center of the user's cornea (and/or corneal sphere), pupil location data, and preprocessed eye tracking images. 3D pupil center locator module 720 may analyze such data to determine the 3D coordinates of the center of the user's pupil in the normalized or unnormalized eye camera coordinate system. The 3D pupil center locator module 720 may determine the location of the user's pupil in three-dimensions based on the 2D position of the pupil centroid (as determined by module 712), the 3D position of the cornea center (as determined by module 716), assumed eye dimensions 704 such as the size of the a typical user's corneal sphere and the typical distance from the cornea center to the pupil center, and optical properties of eyes such as the index of refraction of the cornea (relative to the index of refraction of air) or any combination of these. Techniques for estimating the positions of eye features such as a pupil, which may be utilized by 3D pupil center locator module 720 and other modules in the wearable systems of the present disclosure are discussed in U.S. patent application Ser. No. 15/497,726, filed Apr. 26, 2017, published as U.S. Patent Application Publication No. 2018/0018515, which is incorporated by reference herein in its entirety.

Optical axis determination module 722 may receive data from modules 716 and 720 indicating the 3D coordinates of the center of the user's cornea and the user's pupil. Based on such data, the optical axis determination module 722 may identify a vector from the position of the cornea center (e.g., from the center of the corneal sphere) to the center of the user's pupil, which may define the optical axis of the user's eye. Optical axis determination module 722 may provide outputs specifying the user's optical axis to modules 724, 728, 730, and 732, as examples.

Center of rotation (CoR) estimation module 724 may receive data from module 722 including parameters of the optical axis of the user's eye (e.g., data indicating the direction of the optical axis in a coordinate system with a known relation to the head-mounted unit 602). CoR estimation module 724 may estimate the center of rotation of a user's eye (e.g., the point around which the user's eye rotates when the user eye rotates left, right, up, and/or down). While eyes may not rotate perfectly around a singular point, assuming a singular point may be sufficient. In at least some embodiments, CoR estimation module 724 may estimate an eye's center of rotation by moving from the center of the pupil (identified by module 720) or the center of curvature of the cornea (as identified by module 716) toward the retina along the optical axis (identified by module 722) a particular distance. This particular distance may be an assumed eye dimension 704. As one example, the particular distance between the center of curvature of the cornea and the CoR may be approximately 4.7 mm. This distance may be varied for a particular user based on any relevant data including the user's age, gender, vision prescription, other relevant characteristics, etc.

In at least some embodiments, the CoR estimation module 724 may refine its estimate of the center of rotation of each of the user's eyes over time. As an example, as time passes, the user will eventually rotate their eyes (to look somewhere else, at something closer, further, or sometime left, right, up, or down) causing a shift in the optical axis of each of their eyes. CoR estimation module 724 may then analyze two (or more) optical axes identified by module 722 and locate the 3D point of intersection of those optical axes. The CoR estimation module 724 may then determine the center of rotation lies at that 3D point of intersection. Such a technique may provide for an estimate of the center of rotation, with an accuracy that improves over time. Various techniques may be employed to increase the accuracy of the CoR estimation module 724 and the determined CoR positions of the left and right eyes. As an example, the CoR estimation module 724 may estimate the CoR by finding the average point of intersection of optical axes determined for various different eye poses over time. As additional examples, module 724 may filter or average estimated CoR positions over time, may calculate a moving average of estimated CoR positions over time, and/or may apply a Kalman filter and known dynamics of the eyes and eye tracking system to estimate the CoR positions over time. As a specific example, module 724 may calculate a weighted average of determined points of optical axes intersection and assumed CoR positions (such as 4.7 mm from an eye's center of cornea curvature), such that the determined CoR may slowly drift from an assumed CoR position (e.g., 4.7 mm behind an eye's center of cornea curvature) to a slightly different location within the user's eye over time as eye tracking data for the user is obtain and thereby enables per-user refinement of the CoR position.

Interpupillary distance (IPD) estimation module 726 may receive data from CoR estimation module 724 indicating the estimated 3D positions of the centers of rotation of the user's left and right eyes. IPD estimation module 726 may then estimate a user's IPD by measuring the 3D distance between the centers of rotation of the user's left and right eyes. In general, the distance between the estimated CoR of the user's left eye and the estimated CoR of the user's right eye may be roughly equal to the distance between the centers of a user's pupils, when the user is looking at optical infinity (e.g., the optical axes of the user's eyes are substantially parallel to one another), which is the typical definition of interpupillary distance (IPD). A user's IPD may be used by various components and modules in the wearable system. As example, a user's IPD may be provided to registration observer 620 and used in assessing how well the wearable device is aligned with the user's eyes (e.g., whether the left and right display lenses are properly spaced in accordance with the user's IPD). As another example, a user's IPD may be provided to vergence depth estimation module 728 and be used in determining a user's vergence depth. Module 726 may employ various techniques, such as those discussed in connection with CoR estimation module 724, to increase the accuracy of the estimated IPD. As examples, IPD estimation module 724 may apply filtering, averaging over time, weighted averaging including assumed IPD distances, Kalman filters, etc. as part of estimating a user's IPD in an accurate manner.

In some embodiments, IPD estimation module 726 may receive data from 3D pupil center locator module and/or 3D cornea center estimation modulation 716 indicating the estimated 3D positions of the user's pupils and/or corneas. IPD estimation module 726 may then estimate a user's IPD by reference to the distances between the pupils and corneas. In general, these distances will vary over time as a user rotates their eyes and changes the depth of their vergence. In some cases, the IPD estimation module 726 may look for the largest measured distance between the pupils and/or corneas, which can occur while the user is looking near optical infinity and generally corresponds to the user's interpupillary distance. In other cases, the IPD estimation module 726 may fit the measured distances between the user's pupils (and/or corneas) to a mathematical relationship of how a person's interpupillary distance changes as a function of their vergence depth. In some embodiments, using these or other similar techniques, the IPD estimation module 726 may be able to estimate the user's IPD even without an observation of the user looking at optical infinity (e.g., by extrapolating out from one or more observations in which the user was verging at distances closer than optical infinity).

Vergence depth estimation module 728 may receive data from various modules and submodules in the eye tracking module 614 (as shown in connection with FIG. 7). In particular, vergence depth estimation module 728 may employ data indicating estimated 3D positions of pupil centers (e.g., as provided by module 720 described above), one or more determined parameters of optical axes (e.g., as provided by module 722 described above), estimated 3D positions of centers of rotation (e.g., as provided by module 724 described above), estimated IPD (e.g., Euclidean distance(s) between estimated 3D positions of centers of rotations) (e.g., as provided by module 726 described above), and/or one or more determined parameters of optical and/or visual axes (e.g., as provided by module 722 and/or module 730 described below). Vergence depth estimation module 728 may detect or otherwise obtain a measure of a user's vergence depth, which may be the distance from the user at which the user's eyes are focused. As examples, when the user is looking at an object three feet in front of them, the user's left and right eyes have a vergence depth of three feet; and, while when the user is looking at a distant landscape (e.g., the optical axes of the user's eyes are substantially parallel to one another such that the distance between the centers of the user's pupils may be roughly equal to the distance between the centers of rotation of the user's left and right eyes), the user's left and right eyes have a vergence depth of infinity. In some implementations, the vergence depth estimation module 728 may utilize data indicating the estimated centers of the user's pupils (e.g., as provided by module 720) to determine the 3D distance between the estimated centers of the user's pupils. The vergence depth estimation module 728 may obtain a measure of vergence depth by comparing such a determined 3D distance between pupil centers to estimated IPD (e.g., Euclidean distance(s) between estimated 3D positions of centers of rotations) (e.g., as indicated by module 726 described above). In addition to the 3D distance between pupil centers and estimated IPD, the vergence depth estimation module 728 may utilize known, assumed, estimated, and/or determined geometries to calculate vergence depth. As an example, module 728 may combine 3D distance between pupil centers, estimated IPD, and 3D CoR positions in a trigonometric calculation to estimate (e.g., determine) a user's vergence depth. Indeed, an evaluation of such a determined 3D distance between pupil centers against estimated IPD may serve to indicate a measure of the user's current vergence depth relative to optical infinity. In some examples, the vergence depth estimation module 728 may simply receive or access data indicating an estimated 3D distance between the estimated centers of the user's pupils for purposes of obtaining such a measure of vergence depth. In some embodiments, the vergence depth estimation module 728 may estimate vergence depth by comparing a user's left and right optical axis. In particular, vergence depth estimation module 728 may estimate vergence depth by locating the distance from a user at which the user's left and right optical axes intersect (or where projections of the user's left and right optical axes on a plane such as a horizontal plane intersect). Module 728 may utilize a user's IPD in this calculation, by setting the zero depth to be the depth at which the user's left and right optical axes are separated by the user's IPD. In at least some embodiments, vergence depth estimation module 728 may determine vergence depth by triangulating eye tracking data together with known or derived spatial relationships.

In some embodiments, vergence depth estimation module 728 may estimate a user's vergence depth based on the intersection of the user's visual axes (instead of their optical axes), which may provide a more accurate indication of the distance at which the user is focused on. In at least some embodiments, eye tracking module 614 may include optical to visual axis mapping module 730. As discussed in further detail in connection with FIG. 10, a user's optical and visual axis are generally not aligned. A visual axis is the axis along which a person is looking, while an optical axis is defined by the center of that person's lens and pupil, and may go through the center of the person's retina. In particular, a user's visual axis is generally defined by the location of the user's fovea, which may be offset from the center of a user's retina, thereby resulting in different optical and visual axis. In at least some of these embodiments, eye tracking module 614 may include optical to visual axis mapping module 730. Optical to visual axis mapping module 730 may correct for the differences between a user's optical and visual axis and provide information on the user's visual axis to other components in the wearable system, such as vergence depth estimation module 728 and light-field render controller 618. In some examples, module 730 may use assumed eye dimensions 704 including a typical offset of approximately 5.2° inwards (nasally, towards a user's nose) between an optical axis and a visual axis. In other words, module 730 may shift a user's left optical axis (nasally) rightwards by 5.2° towards the nose and a user's right optical axis (nasally) leftwards by 5.2° towards the nose in order to estimate the directions of the user's left and right optical axes. In other examples, module 730 may utilize per-user calibration data 706 in mapping optical axes (e.g., as indicated by module 722 described above) to visual axes. As additional examples, module 730 may shift a user's optical axes nasally by between 4.0° and 6.5°, by between 4.5° and 6.0°, by between 5.0° and 5.4°, etc., or any ranges formed by any of these values. In some arrangements, the module 730 may apply a shift based at least in part upon characteristics of a particular user such as their age, sex, vision prescription, or other relevant characteristics and/or may apply a shift based at least in part upon a calibration process for a particular user (e.g., to determine a particular user's optical-visual axis offset). In at least some embodiments, module 730 may also shift the origins of the left and right optical axes to correspond with the user's CoP (as determined by module 732) instead of the user's CoR.

Optional center of perspective (CoP) estimation module 732, when provided, may estimate the location of the user's left and right centers of perspective (CoP). A CoP may be a useful location for the wearable system and, in at least some embodiments, is a position just in front of a pupil. In at least some embodiments, CoP estimation module 732 may estimate the locations of a user's left and right centers of perspective based on the 3D location of a user's pupil center, the 3D location of a user's center of cornea curvature, or such suitable data or any combination thereof. As an example, a user's CoP may be approximately 5.01 mm in front of the center of cornea curvature (e.g., 5.01 mm from the corneal sphere center in a direction that is towards the eye's cornea and that is along the optical axis) and may be approximately 2.97 mm behind the outer surface of a user's cornea, along the optical or visual axis. A user's center of perspective may be just in front of the center of their pupil. As examples, a user's CoP may be less than approximately 2.0 mm from the user's pupil, less than approximately 1.0 mm from the user's pupil, or less than approximately 0.5 mm from the user's pupil or any ranges between any of these values. As another example, the center of perspective may correspond to a location within the anterior chamber of the eye. As other examples, the CoP may be between 1.0 mm and 2.0 mm, about 1.0 mm, between 0.25 mm and 1.0 mm, between 0.5 mm and 1.0 mm, or between 0.25 mm and 0.5 mm.

The center of perspective described herein (as a potentially desirable position for a pinhole of a render camera and an anatomical position in a user's eye) may be a position that serves to reduce and/or eliminate undesired parallax shifts. In particular, the optical system of a user's eye is very roughly equivalent to theoretical system formed by a pinhole in front of a lens, projecting onto a screen, with the pinhole, lens, and screen roughly corresponding to a user's pupil/iris, lens, and retina, respectively. Moreover, it may be desirable for there to be little or no parallax shift when two point light sources (or objects) at different distances from the user's eye are rigidly rotated about the opening of the pinhole (e.g., rotated along radii of curvature equal to their respective distance from the opening of the pinhole). Thus, it would seem that the CoP should be located at the center of the pupil of an eye (and such a CoP may be used in some embodiments). However, the human eye includes, in addition to the lens and pinhole of the pupil, a cornea that imparts additional optical power to light propagating toward the retina). Thus, the anatomical equivalent of the pinhole in the theoretical system described in this paragraph may be a region of the user's eye positioned between the outer surface of the cornea of the user's eye and the center of the pupil or iris of the user's eye. For instance, the anatomical equivalent of the pinhole may correspond to a region within the anterior chamber of a user's eye. For various reasons discussed herein, it may be desired to set the CoP to such a position within the anterior chamber of the user's eye.

As discussed above, eye tracking module 614 may provide data, such as estimated 3D positions of left and right eye centers of rotation (CoR), vergence depth, left and right eye optical axis, 3D positions of a user's eye, 3D positions of a user's left and right centers of cornea curvature, 3D positions of a user's left and right pupil centers, 3D positions of a user's left and right center of perspective, a user's IPD, etc., to other components, such as light-field render controller 618 and registration observer 620, in the wearable system. Eye tracking module 614 may also include other submodules that detect and generate data associated with other aspects of a user's eye. As examples, eye tracking module 614 may include a blink detection module that provides a flag or other alert whenever a user blinks and a saccade detection module that provides a flag or other alert whenever a user's eye saccades (e.g., quickly shifts focus to another point).

Examples of Locating Glints with an Eye Tracking System

Figure 8B:
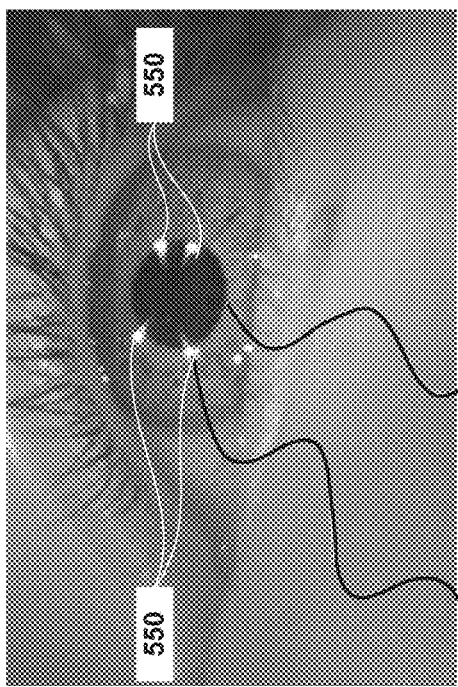
FIG. 8B is a photograph of an eye showing an example of four glints.
Figure 8A:
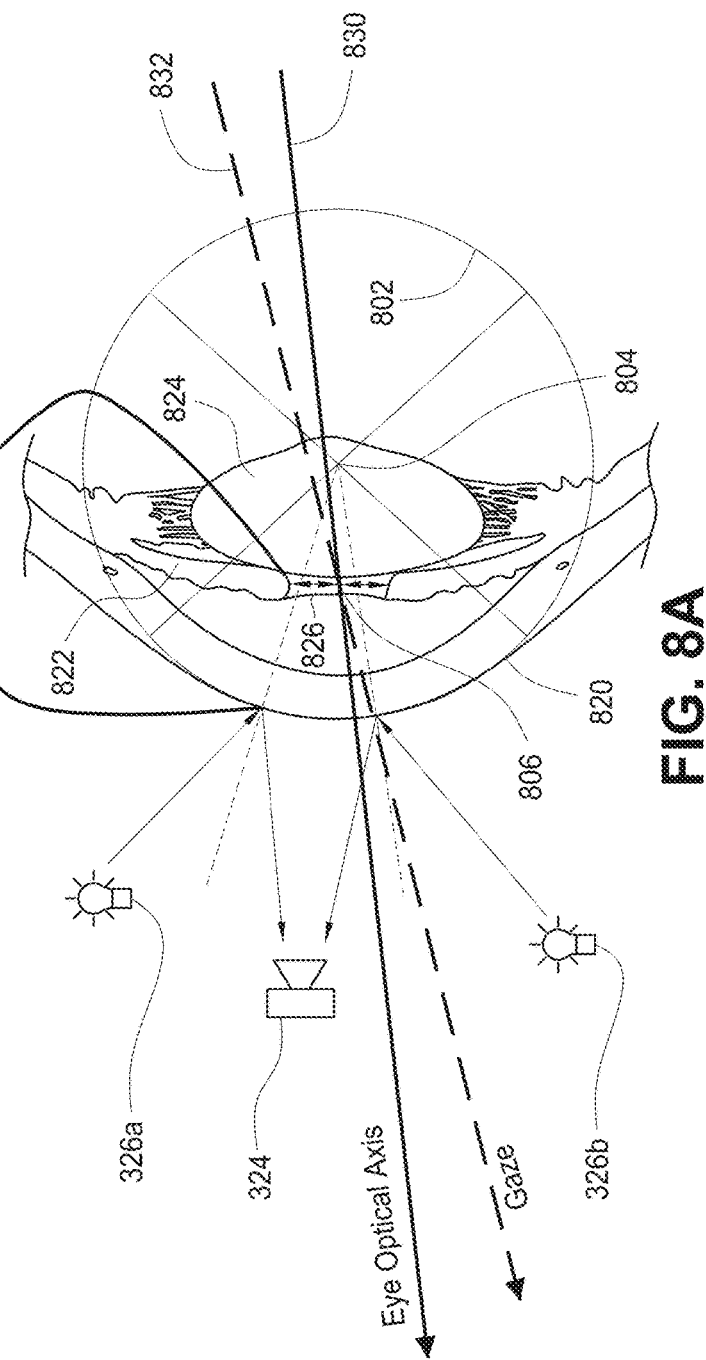
FIG. 8A is a schematic diagram of a cross-section of an eye showing the eye's corneal sphere, optical axis, and gaze. Optical sources illuminate the eye, and reflections of the optical sources from the cornea (glints) can be imaged by a camera for eye tracking.

FIG. 8A is a schematic diagram of a cross-section of an eye showing the eye's cornea 820, iris 822, lens 824, and pupil 826. The sclera (the white of the eye) surrounds the iris 822. The cornea can have an approximately spherical shape, shown by corneal sphere 802, which has a center 804. The eye optical axis is a line (shown by a solid line 830) passing through the center 806 of the pupil and the cornea center 804. The user's gaze direction (shown by a dashed line 832; sometimes also referred to as a gaze vector) is the vision axis of the user and generally is at a small offset angle from the eye optical axis. The offset, which is specific to each particular eye, can be determined by user calibration from eye images. The user-measured offset can be stored by a wearable display system and used to determine the gaze direction from measurements of the eye optical axis.

Light sources 326a and 326b (such as light emitting diodes, LEDs) can illuminate the eye and generate glints (e.g., specular reflections off of the user's eye) that are imaged by a camera 324a. Schematic examples of glints 550 are shown in FIG. 5. The positions of the light sources 326a and 326b relative to the camera 324 is known and, as a consequence, the positions of the glints within images captured by camera 324 can be used in tracking the user's eye as well as modeling the corneal sphere 802 and determining its center 804. FIG. 8B is a photograph of an eye showing an example of four glints 550, which are produced by four light sources (for this example photograph). Generally, the light sources 326a, 326b produce infrared (IR) light, so that the user does not see the light sources, which can be distracting.

In some eye tracking systems, a single image of the eye is used to determine information about the pupil (e.g., to determine its center) and the glints (e.g., their positions in the eye image). As will be further described below, measurements of both the pupil information and the glint information from a single exposure can lead to errors in determination of the eye optical axis or gaze, because, for example, images of the glints may be saturated in an image that also shows sufficient detail to extract pupil information.

Figure 9A:
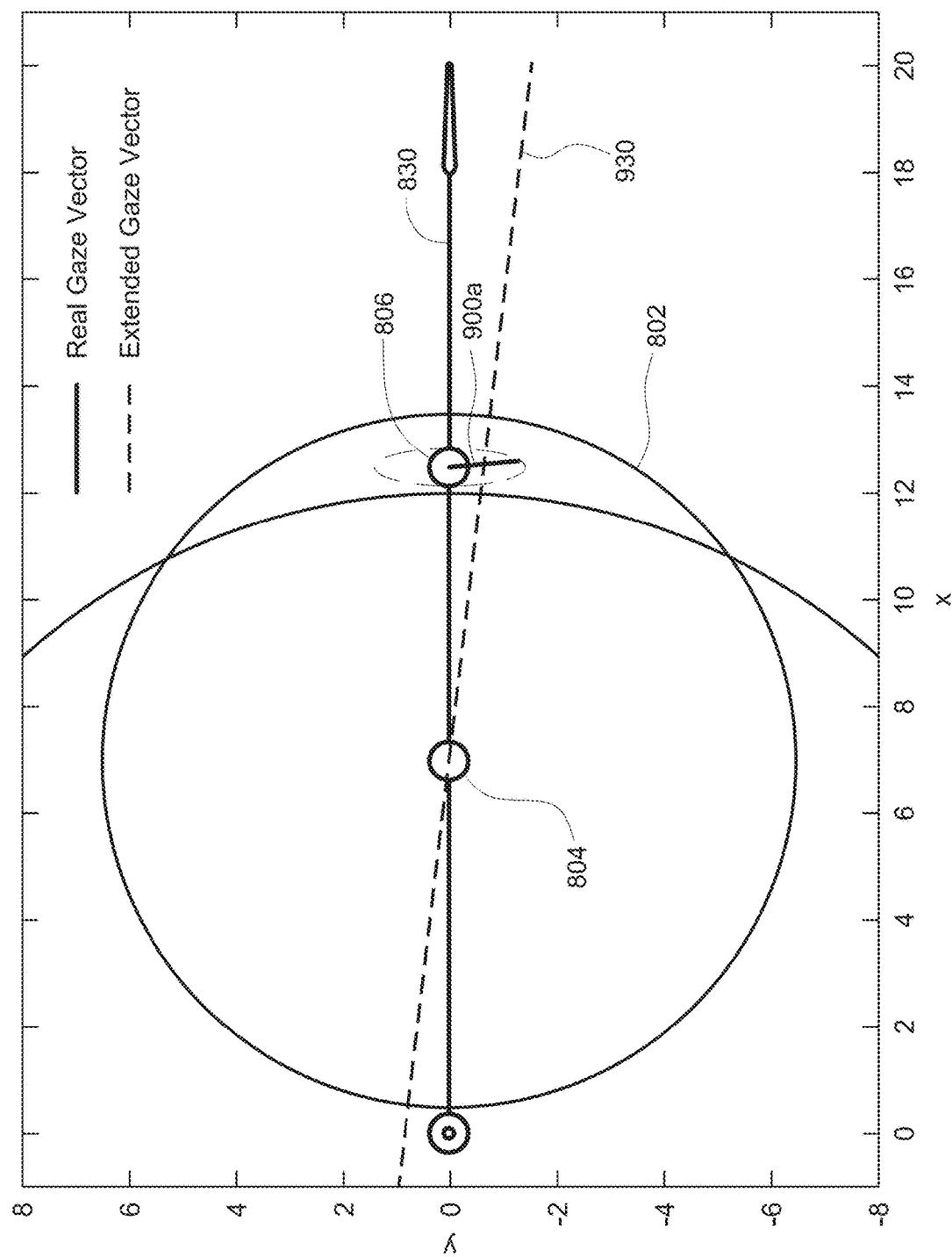
FIGS. 9A, 9B, and 9C schematically illustrate examples of types of errors that can occur in measurement of the eye optical axis or gaze.
Figure 9B:
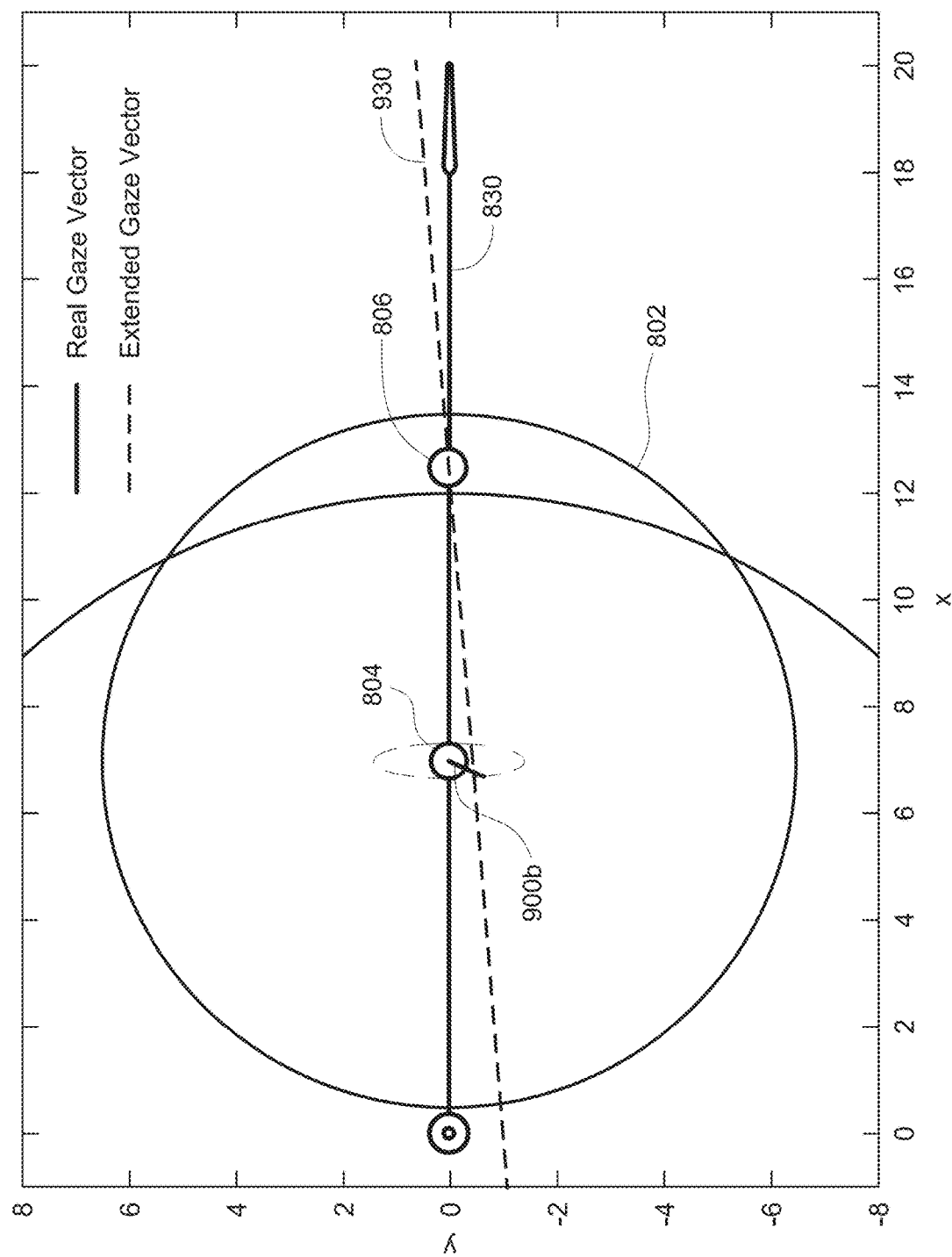
Figure 9C:
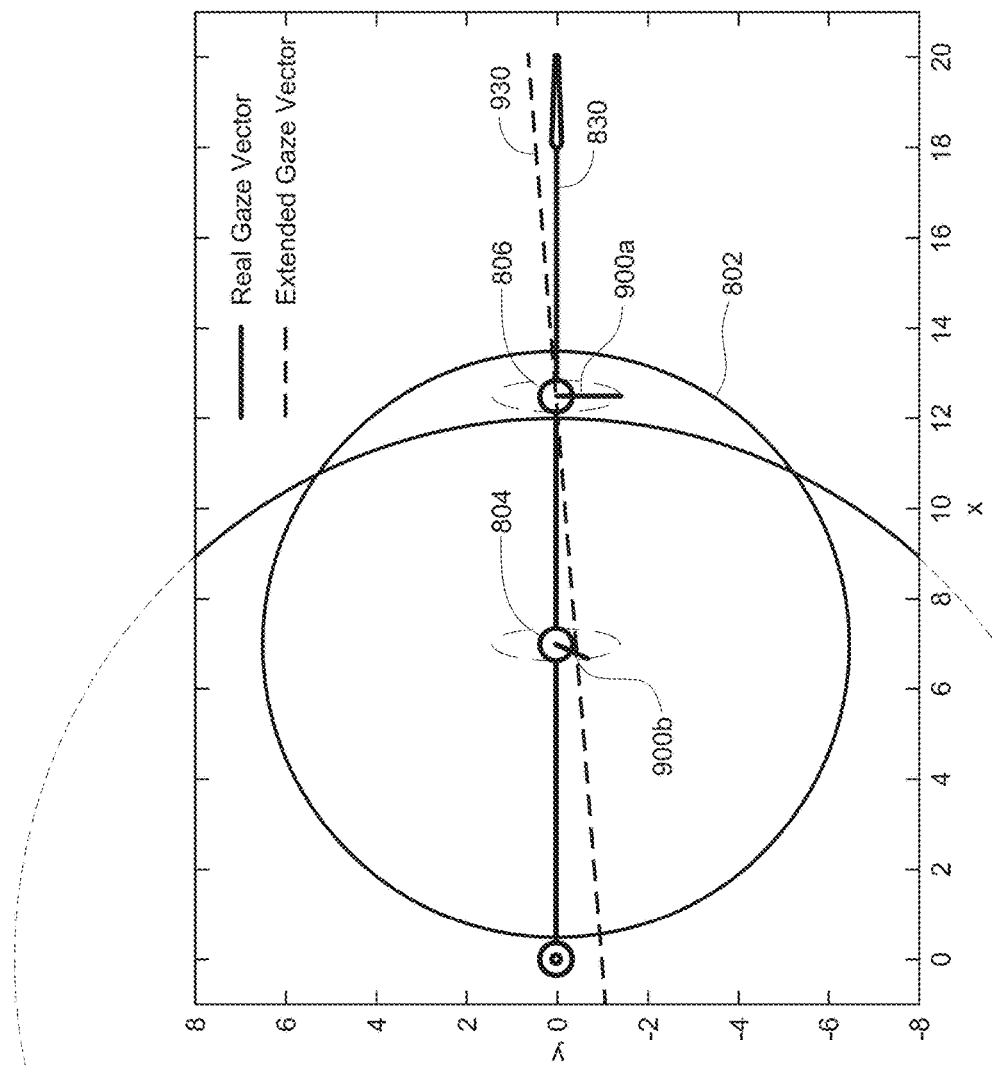

Examples of such errors are schematically illustrated in FIGS. 9A-9C. In FIGS. 9A-9C, the real gaze vector is shown as a solid line 830 passing through the pupil center 806 and the center 804 of the corneal sphere 802, and the gaze vector extracted from an eye image is shown as a dashed line 930. FIG. 9A shows an example of the error in the extracted gaze vector when there is a small error 900a in the measured position of only the pupil center. FIG. 9B shows an example of the error in the extracted gaze vector when there is a small error 900b in the measured position of only the corneal center. FIG. 9C shows an example of the error in the extracted gaze vector when there is a small error 900a in the measured position of the pupil center and a small error 900b in the measured position of the corneal center. In some embodiments of the wearable system 200, the error in gaze determination may be about 20 arcminutes for each pixel of error in determination of a glint in the eye image, whereas with some embodiments of the multiple exposure time eye tracking techniques described herein, the error can be reduced to less than about 3 arcminutes per pixel.

Eye Imaging Using Multiple Images with Different Exposure Times

Figure 10A:
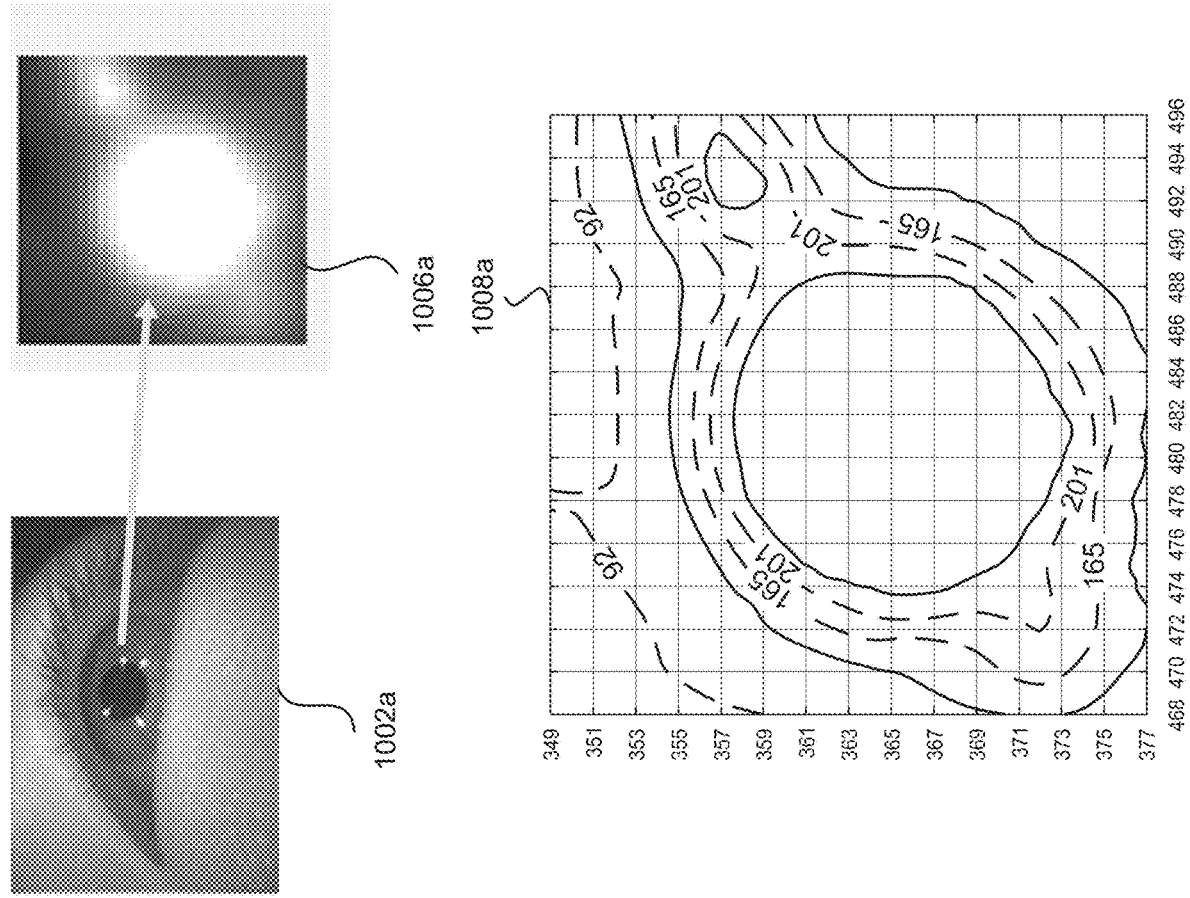
FIG. 10A shows an example of glints and determination of glint position using a longer exposure image.

FIG. 10A shows an example of uncertainty in a glint position when glints are obtained from a single, long exposure eye image 1002a. In this example, the exposure time for the eye image 1002a was about 700 µs. One of the glints in the image 1002a is shown in a zoomed-in image 1006a, and contour plot 1008a shows intensity contours of the glint. The zoomed-in image 1006a shows that the glint is saturated, and the peak of the glint intensity is clipped. The dynamic range of the intensity in the image 1006a may be relatively high to capture both the lower intensity pupil and iris features as well as the higher intensity glints. The glint covers many pixels in the image 1006a, which may make it challenging to accurately determine a center of the glint, particularly when the peak intensities of the glint are clipped. The full width half maximum (FWHM) of the glint 1006a is about 15 pixels. For some embodiments of the wearable system 200, each pixel of error in determining the center (or centroid) of the glint corresponds to about 20 arcminutes of error in determining gaze direction or direction of the eye optical axis. Embodiments of eye imaging using multiple eye images captured with different exposure times advantageously can identify glint positions more accurately and advantageously can reduce the error in gaze direction or optical axis direction to a few arcminutes or less.

Figure 10B:
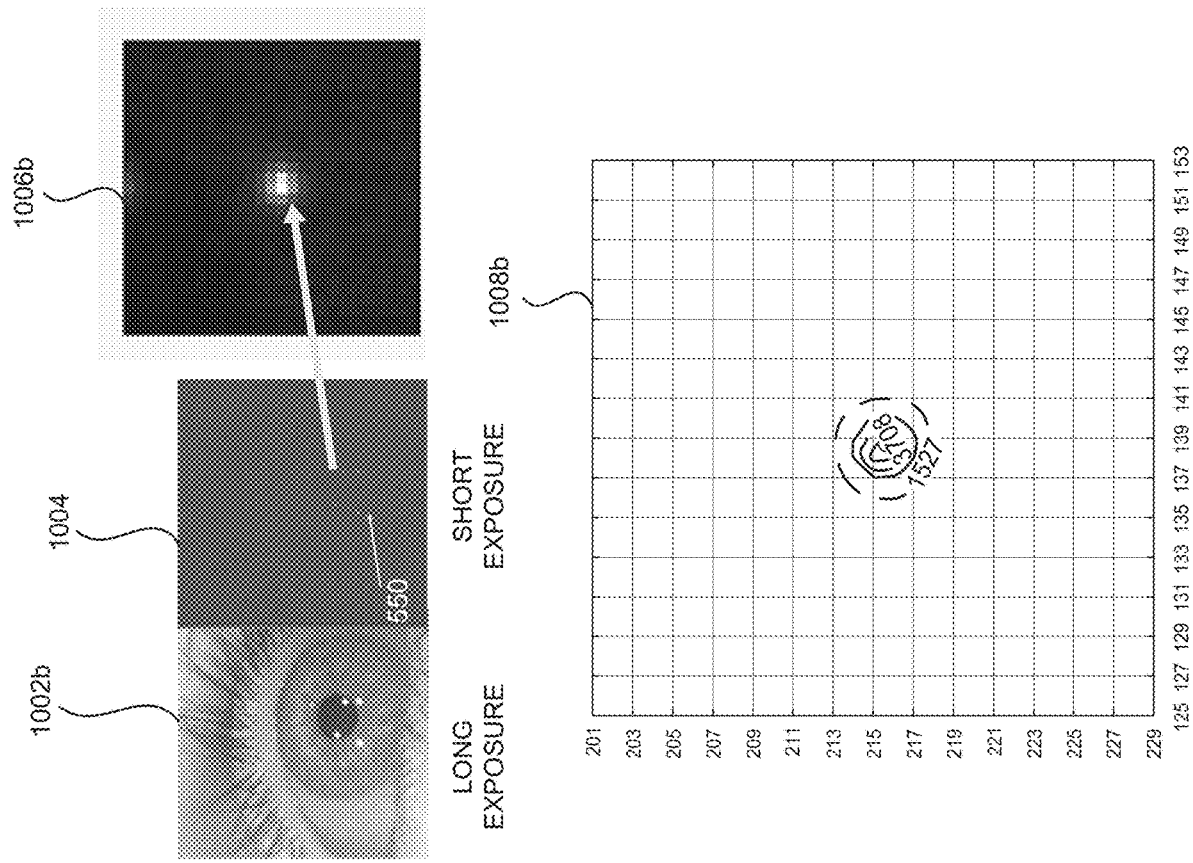
FIG. 10B shows an example of glints in a longer exposure image and a shorter exposure, glint image. The glint position may be determined more accurately from the glint image than from the longer exposure image.

FIG. 10B shows an example of uncertainty in a glint position when techniques using multiple images taken at different exposure times are used. In this example, two sequential images are captured by the eye-tracking camera: a first, longer exposure image 1002b and a second, shorter exposure image 1004. The total capture time for the two images 1002b, 1004 is about 1.5 ms. The labels first and second as applied to the images 1002b and 1004 are not intended to indicate a temporal order of when the images are taken but simply as a convenient way to refer to each of the two images. Accordingly, the first image 1002b can be taken before the second image 1004, after the second image 1004, or the two exposures may at least partially overlap.

The longer exposure image 1002b may have an exposure time similar to the image 1002a shown in FIG. 10A, which in this example is about 700 µs. The first, longer exposure image 1002b can be used to determine pupil (or iris) features. For example, the longer exposure image 1002b can be analyzed to determine the pupil center or center of rotation (CoR), extract iris features for biometric security applications, determine eyelid shape or occlusion of the iris or pupil by the eyelid, measure pupil size, determine render camera parameters, and so forth. However, as described with reference to FIG. 10A, the glints may be saturated in such a longer exposure image, which may lead to relatively large errors in glint positions.

In some implementations, pupil contrast in the longer exposure image can be increased by using eye-tracking cameras that have a better modulation transfer function (MTF), e.g., an MTF closer to a diffraction-limited MTF. For example, a better MTF for the imaging sensor or a better MTF for the imaging lens of the camera can be selected to improve pixel contrast. Example imaging sensing devices and techniques, which may be implemented as eye-tracking cameras having such an MTF or otherwise employed in one or more of the eye-tracking systems described herein, are described in U.S. patent application Ser. No. 16/219,829, filed Dec. 13, 2018, published as U.S. Patent Application Publication No. 2019/0181171, entitled "GLOBAL SHUTTER PIXEL CIRCUIT AND METHOD FOR COMPUTER VISION APPLICATIONS," and U.S. patent application Ser. No. 16/219,847, filed Dec. 13, 2018, published as U.S. Patent Application Publication No. 2019/0181169, entitled "DIFFERENTIAL PIXEL CIRCUIT AND METHOD OF COMPUTER VISION APPLICATIONS," both of which are incorporated by reference herein in their entirety. In various embodiments, the eye-tracking camera 324 can produce images with pupil contrast (e.g., measured at the transition between the pupil and the iris) of 5 to 6 pixels, 1 to 4 pixels, etc. Additional example imaging sensing devices and techniques, which may be implemented as the eye-tracking camera 324 or otherwise employed in one or more of the eye-tracking systems described herein in some embodiments, are described in U.S. patent application Ser. No. 15/159,491, filed May 19, 2016, published as U.S. Patent Application Publication No. 2016/0344957, entitled "SEMI-GLOBAL SHUTTER IMAGER," which is incorporated by reference herein in its entirety.

The exposure time for the second, shorter exposure image 1004 can be substantially less than the exposure time of the first image 1002b to reduce the likelihood of saturating the glints 550 (e.g., clipping the glint peaks in the image). As noted above, the second, shorter exposure image 1004 is sometimes referred to herein as a glint image as it can be used to identify glint positions accurately. In this example, the exposure time of the second image 1004 was less than 40 μs. Notice that although the glints are perceptible in the second image 1004, the pupil (or iris) features are not readily perceptible, which is why the longer exposure first image 1002b can be used for pupil center extraction or CoR determination. Image 1006b is a zoomed-in view of one of the glints in the second image 1004. The smaller size of the glint in the image 1006b (compared to the size in the image 1006a) is readily apparent, which demonstrates that the glint is not saturated in the image 1006b. Contour plot 1008b shows a much smaller contour pattern for the glint (compared to the contours shown in the contour plot 1008a). In this example, the location of the center of the glint can be determined to subpixel accuracy, e.g., about 1/10 of a pixel (corresponding to only about 2 arcminutes of error in gaze or optical axis direction in this example). In some implementations, the location of the pixel center can be determined very accurately from the second, shorter exposure image 1004, e.g., by fitting a two-dimensional (2D) Gaussian (or other bell-shaped curve) to the glint pixel values. In some embodiments, the location of the center of mass of the glint can be determined and relied upon in a capacity similar to that of the location of the center of the glint. The exposure times of the glint images used to determine glint locations can be selected to be just long enough to image peaks of the glints.

Eye-imaging techniques thus may utilize capture of a longer exposure image (which may be used for extraction of pupil properties) and a shorter exposure glint image (which may be used for extraction of glint position). As noted above, the longer and shorter images can be taken in any order, or the exposure times can at least partially overlap. The exposure time for the first image may be in a range from 200 μs to 1200 μs, while the exposure time for the second image may be in a range from 5 μs to 100 μs. The ratio of the exposure time for the first image relative to the exposure time for the second image can be in a range from 5 to 50, 10 to 20, or some other range. The frame rates at which the longer and shorter exposure images can be captured are described with reference to FIG. 11.

A potential advantage to determining glint positions from the second, shorter exposure image is that the glints cover a relatively small number of pixels (e.g., compare the image 1006b with the image 1006a) and finding the glint center can be performed computationally quickly and efficiently. For example, the search area for glints may have a diameter of only about 2 to 10 pixels, in some embodiments. Further, since the glints cover a smaller number of pixels, only a relatively small portion of the image may be analyzed or stored (e.g., in a buffer), which can provide substantial memory savings. Additionally, the dynamic range of the glint images may be sufficiently low that images of ambient, environmental light sources (e.g., room lights, the sky, etc.) are not perceptible due to the short exposure time, which advantageously means that such ambient light sources will not interfere with or be mistaken for a glint.

Furthermore, using a relatively short exposure time may also serve to reduce the presence of motion blur in images of eyes engaged in saccadic or otherwise rapid movement. Example eye-tracking and saccade-detecting systems and techniques, as well as exposure time switching and adjustment schemes associated therewith, are described in U.S. Provisional Patent Application No. 62/660,180, filed Apr. 19, 2018, entitled "SYSTEMS AND METHODS FOR ADJUSTING OPERATIONAL PARAMETERS OF A HEAD-MOUNTED DISPLAY SYSTEM BASED ON USER SACCADES," and U.S. patent application Ser. No. 16/389,529, filed Apr. 19, 2019, published as U.S. Patent Application Publication No. 2019/0324276, entitled "SYSTEMS AND METHODS FOR OPERATING A DISPLAY SYSTEM BASED ON USER PERCEPTIBILITY," which are incorporated by reference herein in their entireties. In some implementations, one or more of such example systems, techniques, and schemes may be implemented as or otherwise leveraged in one or more of the systems and techniques described herein (e.g., by the eye tracking module 614). Additional details of switching between shorter time and longer time exposures are described below with reference to FIG. 11.

As described above, in some implementations, at least a portion of a glint image is temporarily stored in a buffer and that portion of the glint image is analyzed to identify positions of one or more glints that may be located in that portion. For example, the portion may comprise a relatively small number of pixels, rows, or columns of the glint image. In some cases, the portion may comprise an n×m portion of the glint image, where n and m are in a range from about 1 to 20. For example, a 5×5 portion of the glint image may be stored in the buffer.

After the positions of the glint(s) are identified, the buffer may be cleared. An additional portion of the glint image may then be stored in the buffer for analysis, until either the entire glint image has been processed or all the glints (commonly, four) have been identified. In some cases, more than one of the glints of the image are in the buffer at the same time for processing. In some cases, the majority of the glints of the image are in the buffer at the same time for processing. In some cases, all the glints of the image are in the buffer at the same time for processing. The glint positions (e.g., Cartesian coordinates) may be used for subsequent actions in the eye-tracking process, and after the glint positions have been stored or communicated to a suitable processor, the glint image may be deleted from memory (buffer memory or other volatile or non-volatile storage). Such buffering may advantageously permit rapid processing of the glint image to identify glint positions or reduce storage needs of the eye-tracking process since the glint image may be deleted after use.

In some implementations, the shorter exposure, glint images are processed by a hardware processor in the wearable system 200, 400, or 600. For example, the glint images may be processed by the CPU 612 of the head-mounted unit 602 described with reference to FIG. 6. The CPU 612 may include or be in communication with a buffer 615, which can be used to temporarily store at least a portion of the glint image for processing (e.g., identifying glint positions). The CPU 612 may, in some implementations, output the positions of the identified glints to another processor that analyzes the longer exposure image (e.g., the CPU 616 or the GPU 620 described with reference to FIG. 6). This other processor may, in some implementations, be remote from the head-mounted display unit. The other processor may, for example, be in the belt pack. Accordingly, in some implementations, a hardware processor such as the CPU 612 may output the positions of the identified glints (e.g., Cartesian coordinates of the glint peaks) possibly along with data indicative of the intensities of the identified glints (e.g., peak intensities of the glints) to another processor (e.g., the CPU 616 or the GPU 620 described with reference to FIG. 6). In some embodiments, the CPU 612 and the buffer 615 are in a hardware processor that is in or associated with the eye-tracking camera 324. Such an arrangement can provide for increased efficiency, because the shorter exposure glint images can be processed by the camera circuitry and do not need to be communicated to another processing unit (either on or off of the head-mounted unit 602). The camera 324 may simply output glint positions (e.g., Cartesian coordinates of the glint peaks) to another processing unit (e.g., a hardware processor that analyzes the longer exposure images such as the CPU 612, 616 or the GPU 620). Accordingly, in some embodiments, a hardware processor that is in or associated with the camera 324 may output the positions of the identified glints (e.g., Cartesian coordinates of the glint peaks) possibly along with data indicative of the intensities of each of the identified glints (e.g., peak intensities of the glints) to another processor (e.g., the CPU 612, 616, or the GPU 620 described with reference to FIG. 6). In some implementations, the shorter exposure, glint images are processed by a hardware processor (e.g., CPU 612), and this hardware processor may output the positions of identified glint candidates (e.g., Cartesian coordinates of the glint peaks), which may potentially be glint images, possibly along with data indicative of the intensities of the identified glint candidates (e.g., peak intensities of the glints) to another processor. This other processor may identify a subset of the identified glint candidates as glints. This other processor may also perform one or more operations (e.g., one or more operations to determine gaze direction) on the basis of the subset of the identified glint candidates (e.g., the subset of the identified glint candidates deemed to be glints by the other processor). Accordingly, in some implementations, the shorter exposure, glint images are processed by a hardware processor (e.g., CPU 612, a hardware processor that is in or associated with the camera 324, etc.), and this hardware processor may output the positions of the identified glint candidates (e.g., Cartesian coordinates of the glint peaks) possibly along with data indicative of the intensities of the identified glint candidates (e.g., peak intensities of the glints) to another processor (e.g., the CPU 616 or the GPU 620 described with reference to FIG. 6), and this other processor (e.g., the CPU 616 or the GPU 620 described with reference to FIG. 6) may perform one or more operations (e.g., one or more operations to determine gaze direction) on the basis of a subset of the identified glint candidates (e.g., a subset of the identified glint candidates deemed to be glints by the other processor). In some implementations, the hardware processor that processes the shorter exposure, glint images may further output data indicative of the intensities of the different identified glint candidates (e.g., peak intensities of the glints) to the other processor (e.g., the CPU 616 or the GPU 620 described with reference to FIG. 6) and, in some examples, this other processor may select a subset of the identified glint candidates based on one or both of the positions of the identified glint candidates and the intensities of the identified glint candidates and may possibly further perform one or more operations (e.g., one or more operations to determine gaze direction) on the basis of the selected subset of identified glint candidates. For instance, in at least some of these implementations, the other processor (e.g., the CPU 616 or the GPU 620 described with reference to FIG. 6) may determine a gaze direction of an eye based at least in part on the selected subset of identified glint candidates and the center of the pupil of said eye (e.g., as determined by the other processor based on one or more longer exposure images). In some implementations, the subset of identified glint candidates selected by the other processor may only include one glint candidate for each infrared light source employed by the system, while the quantity of glint candidates identified and communicated to the other processor may exceed the quantity of infrared light sources that are employed by the system. Other configurations and approaches are possible.

In various implementations, the longer exposure image may be processed by the CPU 612 or may be communicated to the non-head mounted unit 604, e.g., for processing by the CPU 616 or the GPU 621. As noted, in some implementations, the CPU 616 or the GPU 621 may obtain the glint positions identified from the shorter exposure image from another processor (e.g., the CPU 612) programmed to analyze the glint images stored by the buffer 615.

Frame Rates for Multiple Exposure Time Eye Imaging

As described above, capturing multiple eye images with different exposure times advantageously can provide accurate determination of glint centers (e.g., from the shorter exposure image) and accurate determination of pupil center (e.g., from the longer exposure image). The positions of the glint centers can be used to determine the pose of the cornea.

As the user's eye moves, the glints will correspondingly move. To track eye movement, multiple short glint exposures can be taken to capture the motion of the glints. Accordingly, embodiments of the eye-tracking system can capture glint exposures at a relatively high frame rate (e.g., compared to the frame rate of the longer exposure images), for example, in a range from about 100 frames per second (fps) to 500 fps. Thus, a time period between successive short glint exposures may be in a range from about 1 to 2 ms up to about 5 to 10 ms, in various embodiments.

The longer exposure images for pupil center determination may be captured at a lower frame rate than the frame rate for the glint images. For example, the frame rate for the longer exposure images can be in a range from about 10 fps to 60 fps, in various embodiments. This is not a requirement, and in some embodiments, the frame rates of both the shorter and longer exposure images are the same.

Figure 11:
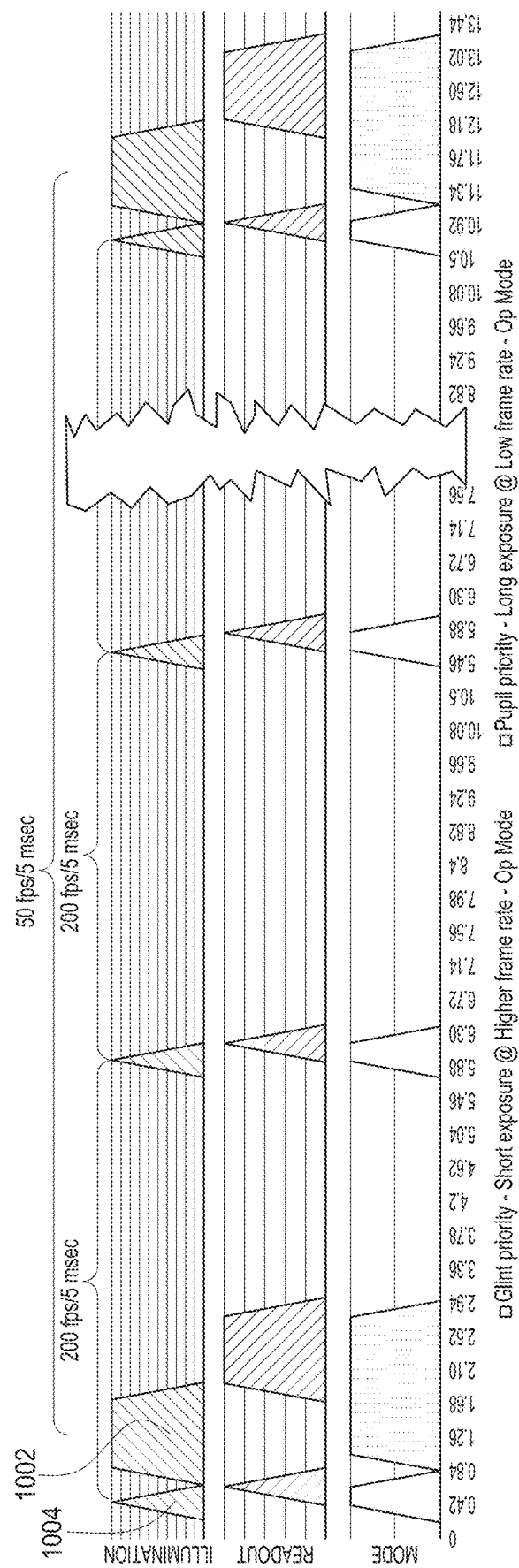
FIG. 11 shows an example of a combined operational mode of an eye-tracking system in which longer exposure images are taken at a first frame rate, and shorter exposure glint images are taken at a second frame, which may, in some embodiments, be higher than the first frame rate.

FIG. 11 shows an example of a combined operational mode in which the longer exposure images are taken at a frame rate of 50 fps (e.g., 20 ms between successive images), and the glint images are taken at a frame rate of 200 fps (e.g., 5 ms between successive glint images). The combined operational mode may be performed by the eye tracking modules 614 described with reference to FIGS. 6 and 7. The horizontal axis in FIG. 11 is time (in ms). The top row of FIG. 11 schematically illustrates illumination of the eye (e.g., by an IR light source) and capture of the corresponding image, e.g., by the eye-tracking camera 324. Glint images 1004 are illustrated as pointed triangles, whereas the longer exposure images are illustrated as wider, flat topped trapezoids. In this example, the glint image is capture before a subsequent long exposure image, although the order can be reversed in other implementations. Because, in this example, the frame rate for the glint images 1004 is higher than the frame rate for the longer exposure images 1002 (e.g., four times higher in this example), FIG. 11 shows four glint images being captured (separated by about 5 ms) before the next longer exposure image is taken (e.g., 20 ms after the first longer exposure image was captured).

In other implementations, the glint image frame rate or the longer exposure image frame rate could be different than illustrated in FIG. 11. For example, the glint image frame rate can be in a range from about 100 fps to about 1000 fps, and the longer exposure image frame rate can be in a range from about 10 fps to about 100 fps. In various embodiments, the ratio of the glint image frame rate to the longer exposure frame rate can in a range from about 1 to 20, 4 to 10, or some other range.

The middle row of FIG. 11 schematically illustrates readout of the glint and longer exposure image data (with readout occurring after the image is captured), and the bottom row of FIG. 11 shows an operational mode of the eye-tracking system (e.g., glint priority using glint images or pupil priority using longer exposure images). Thus, in this example, glint positions are determined every 5 ms from the short exposure glint images, and pupil center (or CoR) is determined every 20 ms from the longer exposure images. The exposure time of the longer exposure images may be long enough and have sufficient dynamic range to capture the pupil and iris features but short enough so that the eye has not moved substantially during the exposure (e.g., to reduce the likelihood of blurring in the image). As noted above, the exposure time of the longer exposure images can be about 700 µs and the exposure time of the glint images can be less than about 40 µs, in some embodiments.

In some embodiments, the eye tracking module 614 may dynamically adjust the exposure time, for example, between the shorter exposure time and the longer exposure time. For example, an exposure time may be selected by the display system (e.g., from a range of exposure times) based on a type of information being determined. As an example, the eye tracking module 614 may be determining occurrence of a saccade. In other examples however, the wearable display system 200 may obtain one or more images to determine a gaze associated with the user's eye. For example, the display system may utilize a geometry of the user's eye to determine a vector extending from the user's fovea or the eye optical axis described with reference to FIG. 8A. The display system may therefore select a shorter exposure time to reduce existence of motion blur. Additionally, the display system may perform a biometric authentication process based on an image of the user's eye. For example, the display system may compare known eye features of the user's user to eye features identified in the image. Thus, the display system may similarly select a shorter exposure time to reduce existence of motion blur.

When dynamically adjusting the exposure time, the eye tracking module 614 may alternate between obtaining images at a first exposure time (e.g., a long exposure) and obtaining images at a second exposure time (e.g., a short exposure). For example, the eye tracking module may obtain an image at the first exposure time to determine whether the user is performing a saccade, and then subsequently obtain an image at the second exposure time. Additionally, particular operating conditions of the wearable display system 200 may inform whether images are to be obtained at the first or second exposure time.

In some embodiments, the eye tracking module 614 may dynamically adjust one or more of the exposure times. For example, the eye tracking module may increase or decrease the exposure time used for saccade detection or glint positions. In this example, the eye tracking module may determine that measures associated with motion blur are too high or too low. That is, the measures may not be accurately detecting, or over detecting, saccades due to the exposure time. For example, the eye tracking module may be configured to perform saccade detection using both motion blur detection and comparisons between successively-captured image frames. Assuming that the comparisons between image frames provide more accurate determination of the occurrence of saccades, the results provided by comparing multiple images may be used as a reference, and the motion blur detection may be adjusted until a desired (e.g., high) level of agreement is reached between the results of the two schemes for saccade detection. If the image frame comparison indicates that saccades are being under detected, the eye tracking module may be configured to increase the exposure time. Conversely, if saccades are being falsely detected, then the exposure time may be decreased.

The eye tracking module may additionally or alternatively dynamically adjust the exposure time for the longer exposure images used for determining pupil or iris properties (e.g., pupil center, CoR, etc.). For example, if the longer exposure image has such a high dynamic range that iris details are saturated, the eye tracking module may decrease the exposure time.

In some embodiments, when performing a biometric authentication process, or when determining a gaze of the user, the eye tracking module may also adjust the exposure time. For example, the display system may dynamically reduce the exposure time to reduce motion blur, or the eye tracking module may increase the exposure time if the obtained images are not properly exposed (e.g., if the images are too dark).

In some embodiments, the eye tracking module may utilize the same camera for each image obtained of the user's eye (e.g., the camera 324). That is, the eye tracking module may utilize a camera pointing at a particular eye of the user. When a user performs a saccade, both eyes may move in a corresponding manner (e.g., at a similar velocity and amplitude). Thus, the eye tracking module may utilize images of the same eye to reliably determine whether a saccade is being performed. Optionally, the eye tracking module may utilize cameras pointing at each eye of the user. In such embodiments, the eye tracking module may optionally utilize the same camera to obtain images of the same eye or may select a camera to utilize. For example, the eye tracking module may select a camera that is not being currently utilized. The eye tracking module may obtain images of the user's eyes for purpose other than determining the occurrence of saccades. As an example, the eye tracking module may perform gaze detection (e.g., the eye tracking module may determine a three-dimensional point at which the user is fixating), prediction of future gaze direction (e.g., for foveated rendering), biometric authentication (e.g., the eye tracking module may determine whether a user's eye matches with a known eye), and so on. In some embodiments, when the eye tracking module provides a command that an image is to be taken, one of the cameras may be in use. Therefore, the eye tracking module may select a camera not in use to obtain the image to be used for saccade detection, gaze direction determination, glint identification, biometric authentication, etc.

Optionally, the eye tracking module may trigger both cameras to obtain images at the same time. For example, each camera may obtain an image at a respective exposure time. In this way, the eye tracking module may obtain a first image of a first eye to determine measures of motion blur, glint positions, etc., while obtaining a second image of a second eye to determine other information (e.g., information to be used for gaze detection, pupil center determination, authentication, and so on). Optionally, both images may be utilized to determine whether the user is performing a saccade. For example, the eye tracking module may determine deformation of features (e.g., an eye of the user, a glint, and so on) shown in a first image as compared to the same features as shown in a second image. Optionally, the eye tracking module may cause each camera to alternate between two exposure values, for example out of phase from each other. For example, a first camera may obtain an image at a first exposure value (e.g., a shorter exposure time), and at the same time a second camera may obtain an image at a second exposure value (e.g., a longer exposure time). Subsequently, the first camera may obtain an image at the second exposure value, and the second camera may obtain an image at the first exposure value.

Glint Motion Detector

Figure 12:
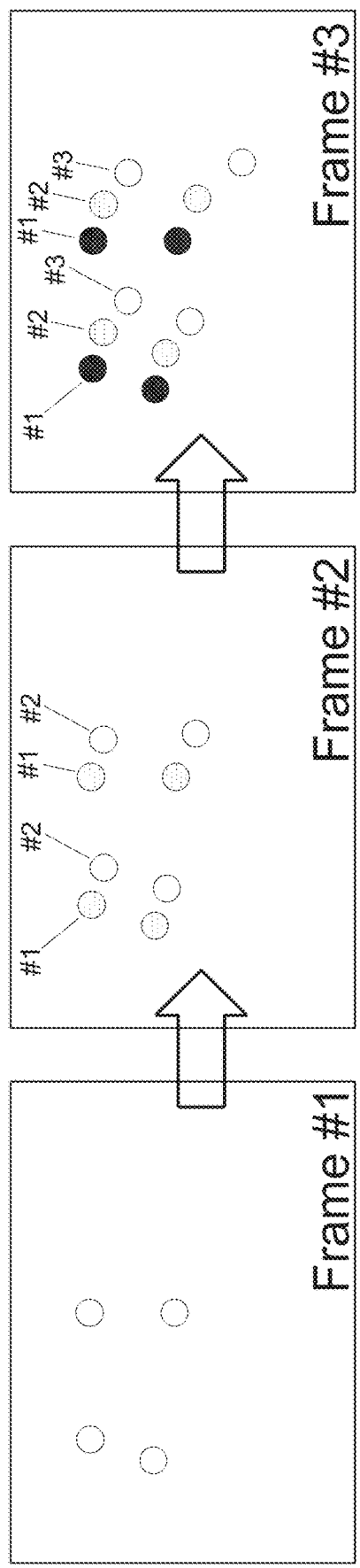
FIG. 12 schematically illustrates an example of how the use of short exposure glint images, which may be captured at high frame rates, can provide robust glint detection and tracking as the eye moves.

FIG. 12 schematically illustrates an example of how the use of short exposure glint images captured at relatively high frame rates can provide robust glint detection and tracking as the eye moves. In Frame #1, four example glints are shown. Frame #2 is a glint image taken a short time after Frame #1 (e.g., about 5 ms later at a 200 fps rate) and illustrates how the initial glint positions (labeled as #1) have moved to positions labeled by #2. Likewise, Frame #3 is another glint image taken a short time after Frame #2 (e.g., about 5 ms later at a 200 fps rate) and illustrates how the initial glint positions have continued move to positions labeled by #3. Note that in Frame #2 only glints at positions labeled #2 would appear in the image, glints at positions labeled #1 are shown for reference, and likewise for Frame #3. Accordingly, FIG. 12 schematically shows how an example constellation or pattern of glints moves from frame to frame.

Because the glint images can be captured at a relatively high frame rate, determination of glint positions at an earlier frame can assist determining the expected positions of the glints in subsequent frames, because the glints do not move appreciably between the frames when taken at a relatively high frame rate (see, e.g., the glint movements depicted in FIG. 12). Such glint imaging enables the eye-tracking system to limit the frame-by-frame search region to a small number of pixels (e.g., 2 to 10 pixels) around the previous glint positions, which advantageously may improve processing speed and efficiency. For example, as described above, only a portion of the glint image (e.g., a 5×5 group of pixels) may be stored in a temporary memory buffer 615 for processing by an associated CPU 612. Glints that are present in the image portion may be quickly and efficiently identified and their positions determined. The glint positions may be used for subsequent processing (e.g., with the longer exposure images) and the glint image deleted from memory.

A further advantage of such glint imaging can be that labeling of each of the glints is less likely to result in error (e.g., mislabeling the upper left hand glint as the upper right hand glint or the lower left hand glint), because the eye-tracking system can follow the small movements of the glints from frame to frame. For example, the "constellation" of four glints depicted in FIG. 12 may tend to move at a substantially common velocity from frame to frame as the eye moves. The common velocity may represent an average or mean velocity of the constellation. Thus, the system can check that all identified glints are moving at approximately the same velocity. If one (or more) of the glints in the "constellation" moves at a substantially different velocity (e.g., more than a threshold amount different from the common velocity), then that glint may have been misidentified or the glint may have reflected from a non-spherical portion of the cornea.

As such, it follows that small changes in glint position from frame-to-frame may be relied upon with a relatively high degree of confidence, for example, if all four glints exhibit comparable changes in position. As such, in some implementations, the eye tracking module 614 may be able to detect saccadic and microsaccadic movements with a relatively high degree of confidence on the basis of as few as two image frames. For example, in these implementations, the eye tracking module may be configured to determine whether a global change in glint position from one frame to the next exceeds a threshold value and, in response to determining that such a global change does indeed exceed the threshold value, determine that the user's eye is engaging in saccadic (or microsaccadic) movement. This may advantageously be utilized to perform depth plane switching, for example, as described in the above-incorporated U.S. Patent Application No. 62/660,180 filed Apr. 19, 2018 and U.S. Patent Application Publication No. 2019/0324276.

Figure 13A:
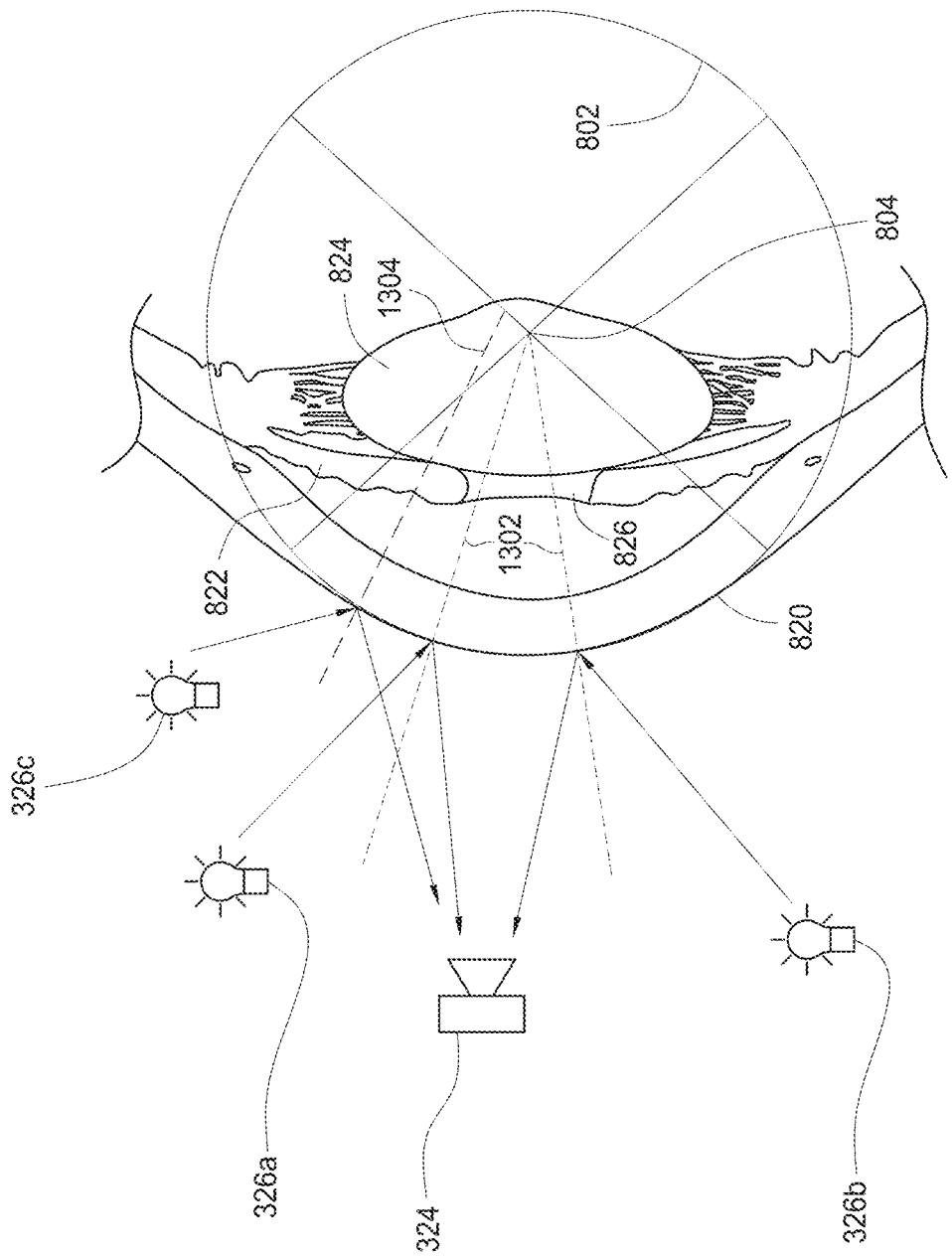
FIG. 13A is a schematic diagram of a cross-section of an eye showing the eye's corneal sphere. Optical sources illuminate the eye, and reflections of the optical sources from the cornea (glints) can be imaged by the cameras for eye tracking. Glints from reflections from two light sources can be used to accurately model the cornea modeled center. A glint from reflection from another light source is from a non-spherical portion of the cornea and its use in modeling the cornea center may lead to error.

FIG. 13A, which is generally similar to FIG. 8A, illustrates a situation where one of the glints is reflected from a non-spherical portion of the cornea. The eye-tracking system can determine the cornea modeled center of the corneal sphere 1402 from the glints from the light sources 326a and 326b. For example, the reflections from the light sources 326a, 326b can be projected (shown as dashed lines 1302) back to the cornea modeled center 804, where both dashed lines 1302 meet at a common point. However, if the system projects the glint from the light source 326c toward the center, dashed line 1304 does not meet at the cornea modeled center 804. If the eye-tracking system were to use the glint from the light source 326c to attempt to find the center 804 of the corneal sphere 802, error would be introduced to the center position (because the line 1304 does not intersect the center 804). Accordingly, by tracking glint positions in the glint images, the system can identify a situation where a glint is likely reflected from a non-spherical region of the cornea (e.g., because the glint velocity is different from the common velocity of the constellation) and remove the glint from the corneal sphere modeling calculation (or reduce a weight assigned to that glint). The glint speed of glints in non-spherical corneal regions is often much faster than the glint speed for spherical regions and this increase in speed can be used, at least partly, to identify when a glint is arising from a non-spherical corneal region.

Figure 13B:
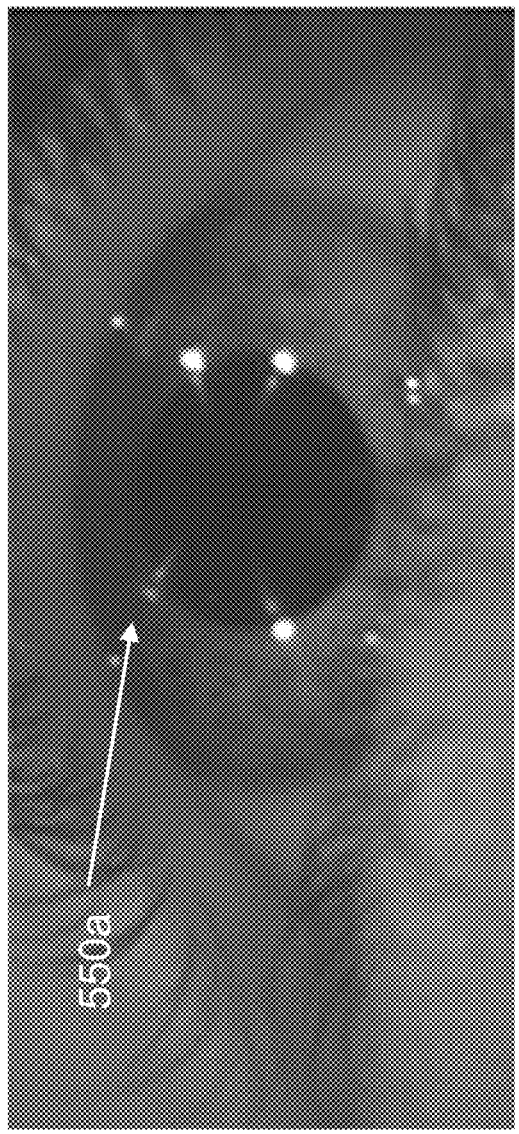
FIG. 13B is an image that shows an example of a glint where there is partial occlusion of the eye.

When the user blinks, the user's eyelid may at least partially cover a portion of the cornea where a light source would reflect from. The glint arising from this region may have a lower intensity or have an image shape that is substantially non-spherical (which can introduce error into determining its position). FIG. 13B is an image that shows an example of a glint 550a where there is partial occlusion. Glint imaging can also be used to identify when a glint becomes at least partially occluded by monitoring the intensities of the glints in the image. In the case of no occlusion, each glint may have approximately the same intensity from frame to frame, whereas if there is at least partial occlusion, the intensity of the glint will rapidly decrease. Thus, the eye-tracking system can monitor the glint intensity as a function of time (e.g., from frame to frame) to determine when partial or total occlusion occurs, and remove that glint from the eye-tracking analysis (or reduce a weight assigned to that glint). Further, the constellation of glints may have approximately similar intensities, so the system can monitor whether there is difference of a particular glint intensity from the common intensity of the constellation. In response to such a determination, the eye-tracking system can remove that glint from the eye-tracking analysis (or reduce a weight assigned to that glint). Alternatively, as described in further detail below with reference to FIG. 20, in some implementations, the eye-tracking system may estimate the location of a partially or totally occluded glint.

The glint detection and labeling module 714 described with reference to FIG. 7 thus can advantageously include a glint motion detector to monitor glint velocity or glint intensity from frame to frame in the glint imaging to provide a more robust determination of glint positions, which can provide a more robust determination of the center of the corneal sphere (e.g., determined by the 3D cornea center estimation module 716 of FIG. 7).

Example Glint-Pupil Motion Relationships

Figure 14A:
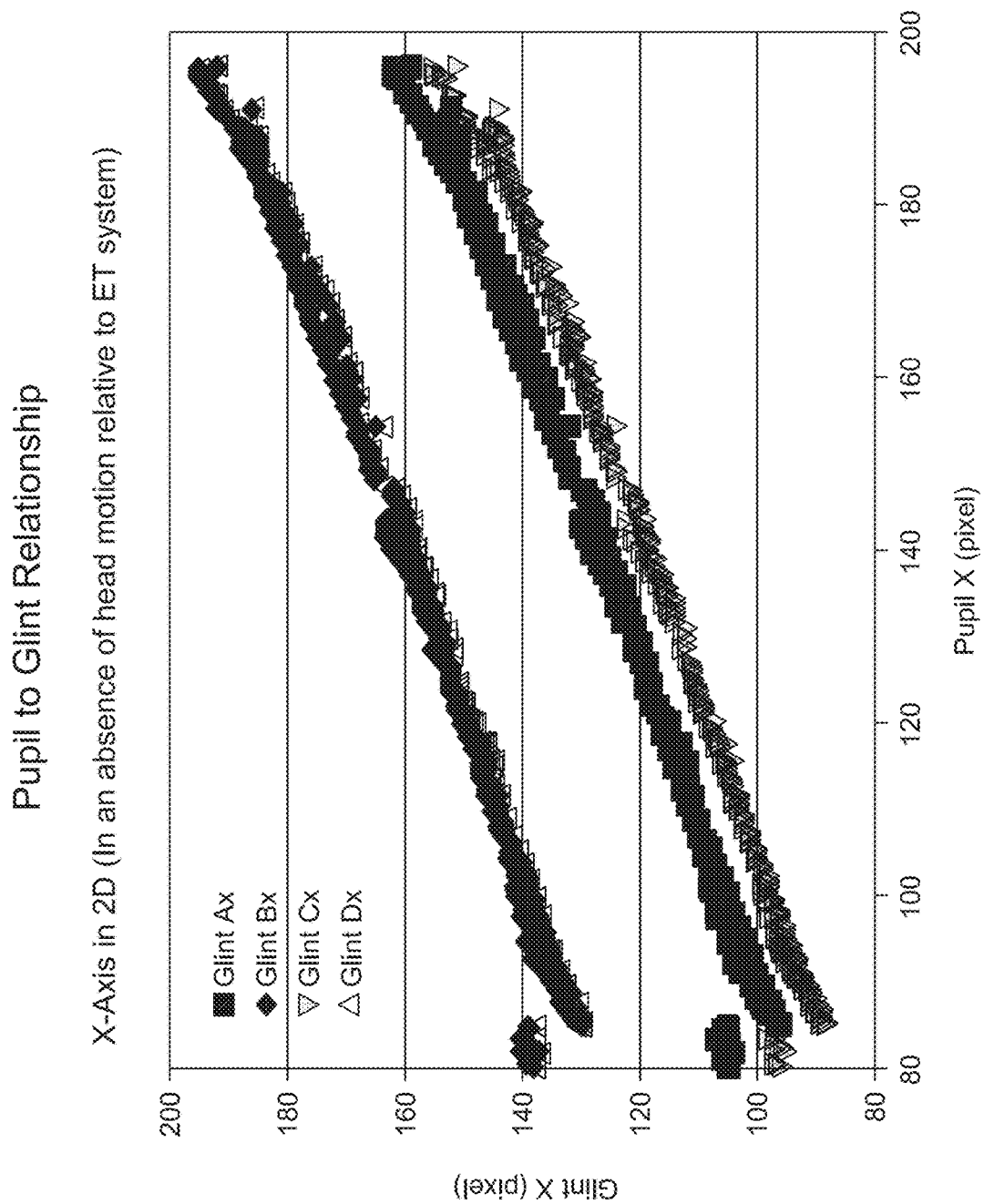
FIGS. 14A and 14B are graphs of examples of glint movement versus pupil movement in a Cartesian (x,y) coordinate system, with the x-axis being horizontal and the y-axis being vertical.
Figure 14B:
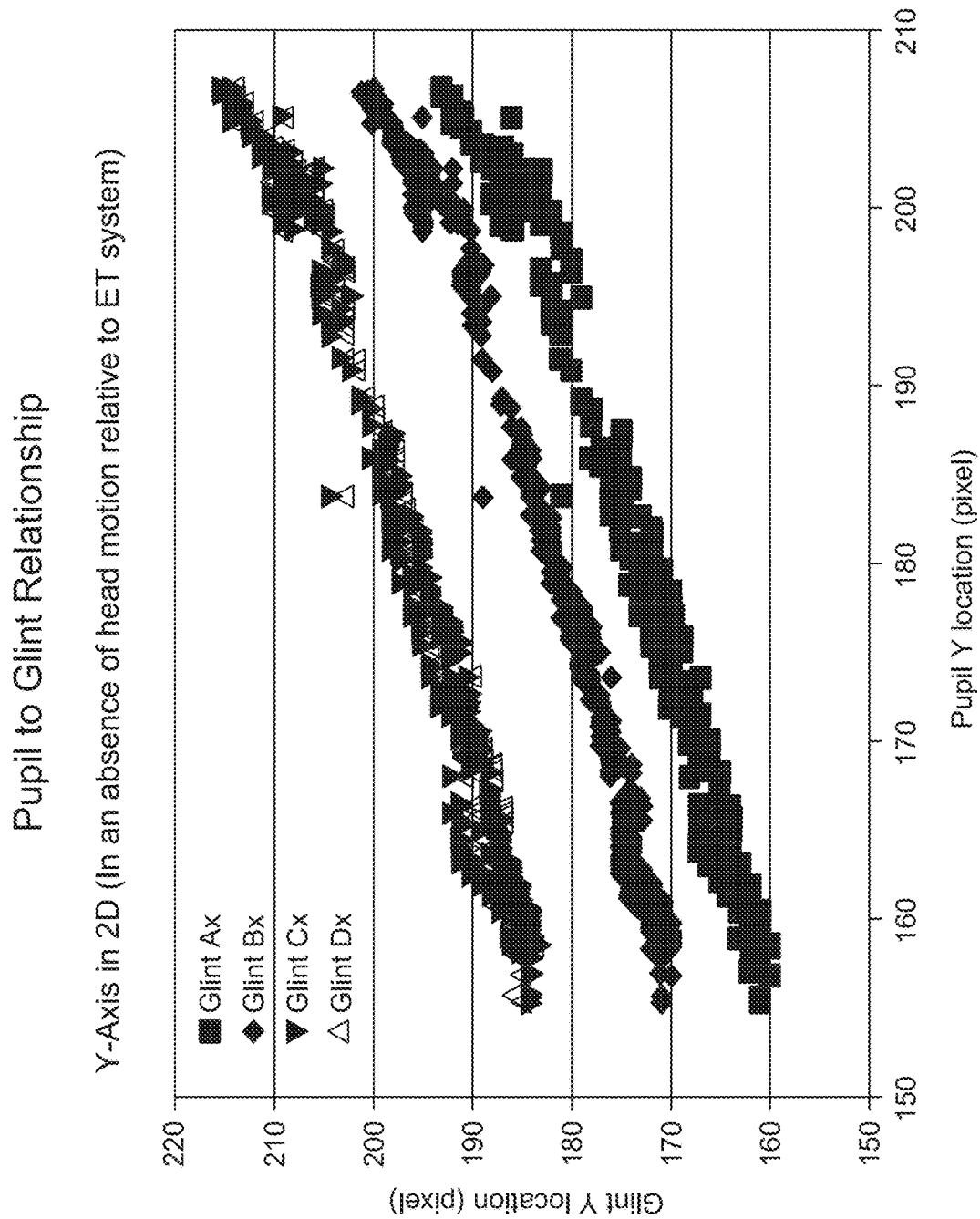

The applicant has determined that a relationship exists between movement of glints in eye images and movement of the pupil. FIGS. 14A and 14B are graphs of examples of glint movement versus pupil movement in a Cartesian (x,y) coordinate system, with the x-axis being horizontal and the y-axis being vertical. FIG. 14A shows the glint x-location (in pixels) versus the pupil x-location (in pixels); FIG. 14B shows the glint y-location (in pixels) versus the pupil y-location (in pixels). In these examples, four glints (A, B, C, and D) where tracked, and there was no movement of the user's head relative to the eye-tracking (ET) system during measurement. As can be seen from FIGS. 14A and 14B, there is a strong linear relationship between glint movement and pupil movement. For example, glint movement has about one-half the speed of pupil movement. The linear relationship and the particular values of the slopes in FIGS. 14A and 14B may be due to the geometry of the eye-tracking system used for the measurements, and it is expected that analogous relationships between glint movement and pupil movement will be present for other eye-tracking systems (and can be determined by analysis of eye-tracking images). As mentioned above, in some implementations, the eye-tracking system may estimate the location of a partially or totally occluded glint. In these implementations, which are described in further detail below with reference to FIG. 20, the eye-tracking system may leverage a probabilistic statistical model of such a glint-pupil relationship so as to estimate the locations of one or more partially or totally occluded glints.

The glint-pupil relationship together with the robustness of glint determination provided by the glint imaging can be used to provide robustness to the determination of the pupil center (or center of rotation, CoR). Furthermore, leveraging the glint-pupil relationship to determine pupil position may advantageously provide computational savings of the pupil identification and position determination techniques described above with reference to one or more of the modules of FIG. 7, such as module 712 or module 720. For example, glint positions can be robustly determined (e.g., to subpixel accuracy) from the glint images and an estimate of the position of the pupil center (or CoR) can be predicted based at least in part on the glint-pupil relationship (see, e.g., FIGS. 14A and 14B). Over the relatively short periods of time that the glint images are captured (e.g., every 2 to 10 ms), the pupil center (or CoR) does not change appreciably. Glint positions can be tracked and averaged over multiple glint frame captures (e.g., from 1 to 10 frames). Using the glint-pupil relationship, the average glint position provides the estimate for the pupil position (or CoR). In some embodiments, this estimate can then be used in analysis of the longer exposure images to more accurately and reliably determine the pupil center (or CoR). In other embodiments, this estimate, alone, may serve to inform the system of the pupil center. As such, in at least some of these embodiments, the eye tracking module need not rely upon longer exposure images to determine the pupil center (or CoR). Rather, in such embodiments, the eye tracking module may rely upon longer exposure images for other purposes or, in some examples, may forgo the capture of such longer exposure images altogether.

Gaze Prediction for Foveated Rendering

As described with reference to FIG. 6, the render controller 618 can use information from the eye tracking module 614 to adjust images displayed to the user by the render engine 622 (e.g., a render engine that may be a software module in the GPU 620 and that may provide images to the display 220 of the wearable system 200). As an example, the render controller 618 may adjust images displayed to the user based on the user's center of rotation or center of perspective.

In some systems, pixels in the display 220 are rendered near the gaze direction at a higher resolution or frame rate than in regions of the display 220 away from the gaze direction (which may not be rendered at all in some cases). This is sometimes referred to as foveated rendering and may provide substantial computational performance gains, because primarily substantially only pixels in the gaze direction may be rendered. Foveated rendering may provide an increase in rendering bandwidth and a decrease in power consumption by the system 200. Examples of wearable systems 200 that utilize foveated rendering are described in U.S. Patent Publication No. 2018/0275410, entitled "Depth Based Foveated Rendering for Display Systems," which is hereby incorporated by reference herein in its entirety.

FIG. 15 schematically illustrates an example of foveated rendering. A field of view (FoV) of a display (e.g., the display 220) with the original location of the gaze direction (also referred to as the fovea) shown as circle 1502. Arrow 1504 represents a fast saccade of the eye (e.g., at about 300 arcminute/sec). The dashed circle 1506 represents a region of uncertainty where the gaze direction might be in the case of a fast saccade. Pixels of the display in the region 1506 may be rendered whereas pixels of the display outside the region 1506 may not be rendered (or rendered at a lower frame rate or resolution). The area of the region 1506 increases approximately as the square of the time between when the gazes moves to a new direction and when images can be actually rendered by the render pipeline (sometimes referred to as the motion-to-photon timescale). In various embodiments of the wearable system 200, the motion-to-photon timescale is in a range from about 10 ms to 100 ms. Accordingly, it may be advantageous for the eye-tracking system to be able to predict a future gaze direction (out to about the motion-to-photon time for the display) so that the rendering pipeline can begin generating image data for display when the user's eyes move to the future gaze direction. Such prediction of the future gaze direction for foveated rendering can provide user benefits such as, e.g., increased apparent responsiveness of the display, reduced latency in image generation, and so forth.

Figure 16:
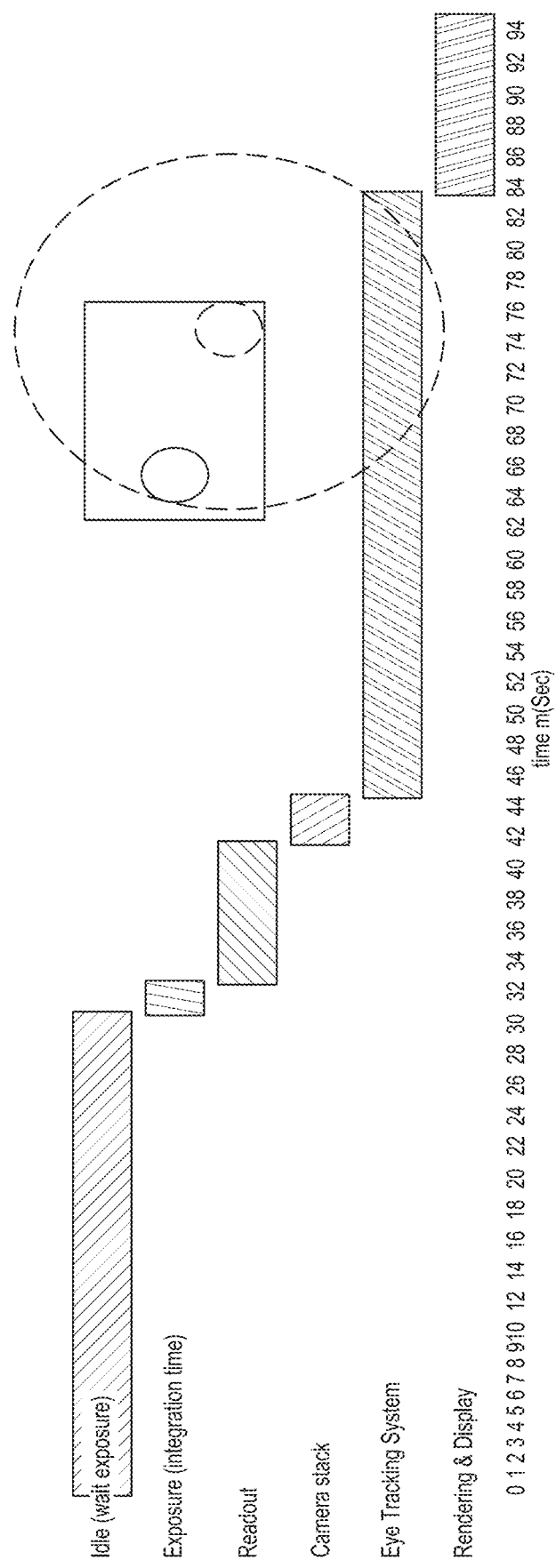
FIG. 16 schematically illustrates an example timing diagram for a rendering pipeline, which utilizes an embodiment of long and short exposure imaging for eye tracking.

FIG. 16 schematically illustrates an example timing diagram 1600 for a rendering pipeline, which utilizes an embodiment of multiple exposure time eye imaging for eye tracking. The rendering pipeline is initially idle 1602 (awaiting the next glint exposure) and then a glint exposure 1604 is captured (the exposure time may be less than 50 μs). The glint image is read out 1606 by a camera stack, and the readout time can be decreased by reading out only the peaks of the glint image. Glints and glint positions are extracted at 1608 and the eye-tracking system determines gaze at 1610. The renderer (e.g., render controller 618 and render engine 622) renders the images for display at 1612.

Figure 17:
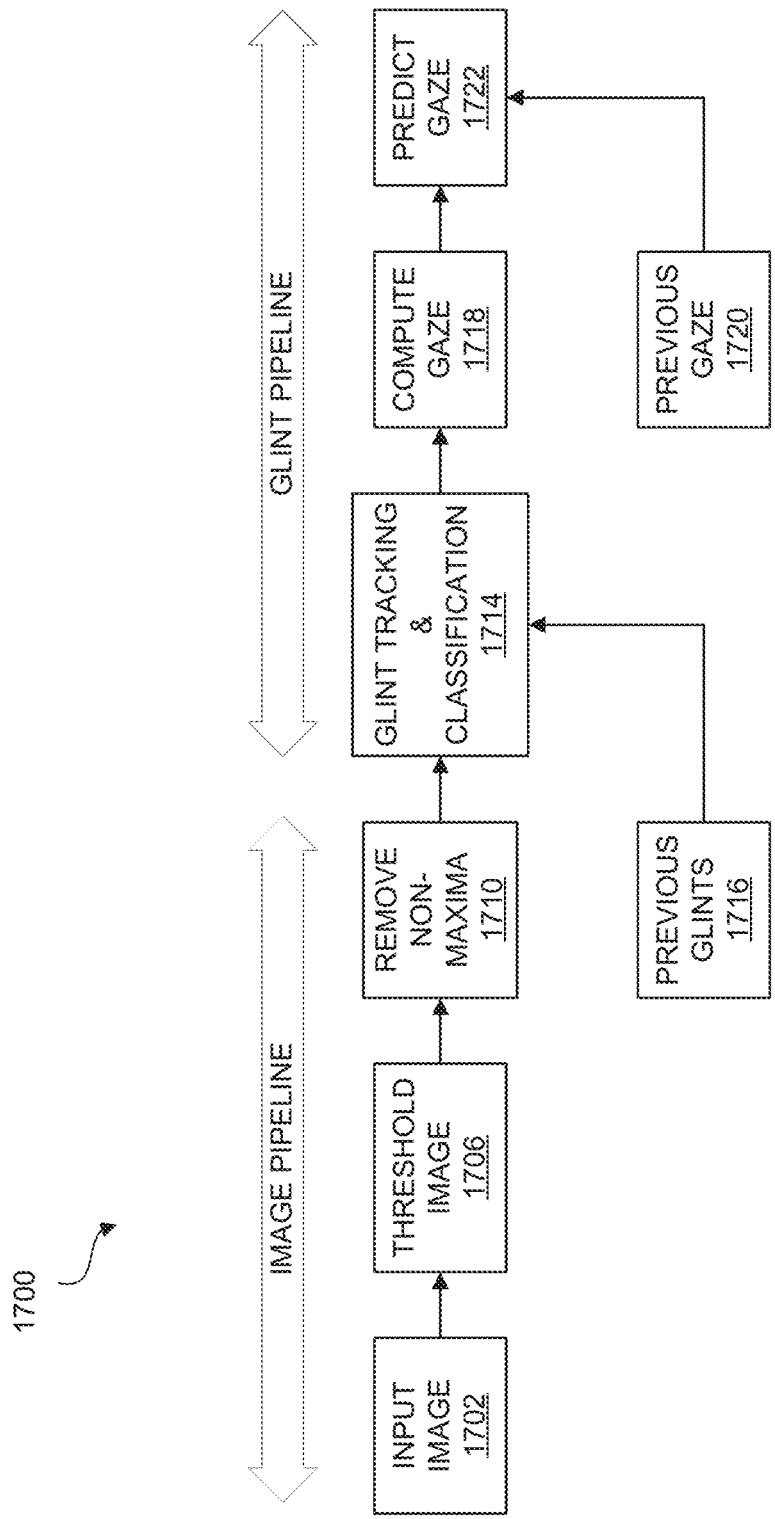
FIG. 17 is a block diagram of an example gaze prediction system for foveated rendering, which utilizes an embodiment of long and short imaging for eye tracking and prediction of future gaze direction.

FIG. 17 is a block diagram of an example gaze prediction system 1700 for foveated rendering. The system 1700 can be implemented, for example, as part of the system 600 described with reference to FIGS. 6 and 7. The system 1700 has two pipelines: an image pipeline for obtaining glint images and a glint pipeline for processing the glints and predicting a future gaze direction out to a gaze prediction time. As described above the gaze prediction time for foveated rendering may be comparable to the motion-to-photon time for the system 600 (e.g., from 10 ms to 100 ms in various implementations). For some rendering applications, the gaze prediction time is in a range from about 20 ms to 50 ms, e.g., about 25 ms to 30 ms. The blocks show in FIG. 17 are illustrative and in other embodiments, one or more of the blocks can be combined, reorganized, omitted or additional blocks added to the system 1700.

At block 1702, the system 1700 receives a glint image. An example of a glint image is the image 1004 shown in FIG. 10B, in which peaks of the glints are imaged. At block 1706, the system can threshold the image, e.g., set the intensity values of the lowest image pixel values to be a lower threshold (e.g., zero). At block 1710, non-maxima in the glint image are suppressed or removed, which can assist in finding just the glint peaks. For example, the system 1700 can scan across rows (or columns) of the image to find maxima. Continuing at block 1710, close maxima can be processed to remove the lesser maxima of a group of closely spaced maxima (e.g., maxima within a threshold pixel distance from each other, e.g., 2 to 20 pixels). For example, a user may wear a contact lens. Reflection of a light source 326 can occur at both the front of the contact lens and at the cornea, resulting in two closely-spaced glints. The non-maxima suppression at block 1710 can eliminate the lesser maxima so that only the primary or first specular reflection is kept for further processing.

The glint pipeline receives the processed glint image from the image pipeline. Glint tracking and classification (e.g., labeling) can be performed at block 1714. As described with reference to FIG. 12, information on previously identified glints (e.g., position, intensity, etc.) can be received from block 1716, and the block 1714 can use this information to identify a search region in the glint image where each of the glints is likely to be found (which may reduce search time and increase processing efficiency). The previous glint information from the block 1716 can also be useful in identifying if a glint has been at least partially occluded or the glint comes from a non-spherical portion of the cornea. Such glints may be removed from glint tracking at block 1714. Alternatively, as mentioned above with reference to FIGS. 13B and 14A-14B, in some implementations, the eye-tracking system may estimate the location of a partially or totally occluded glint. Additional details are provided below with reference to FIG. 20.

At block 1718, the system 1700 computes the current gaze (e.g., the eye optical axis or the gaze vector) from the glint information received from the block 1714. At block 1720, previous gaze information (e.g., determined from a previous glint image) is input to block 1722 where a future gaze direction is computed. For example, the system 1700 can extrapolate from the current gaze (block 1718) and one or more previous gazes (block 1720) to predict the gaze at the future gaze time (e.g., 10 ms to 100 ms in the future). The predicted gaze from the block 1722 can be provided to the rendering engine to enable foveated rendering.

In some embodiments, the pipelines in the system 1700 run at the glint imaging high frame rate (e.g., 100 fps to 400 fps).

Figure 18A:
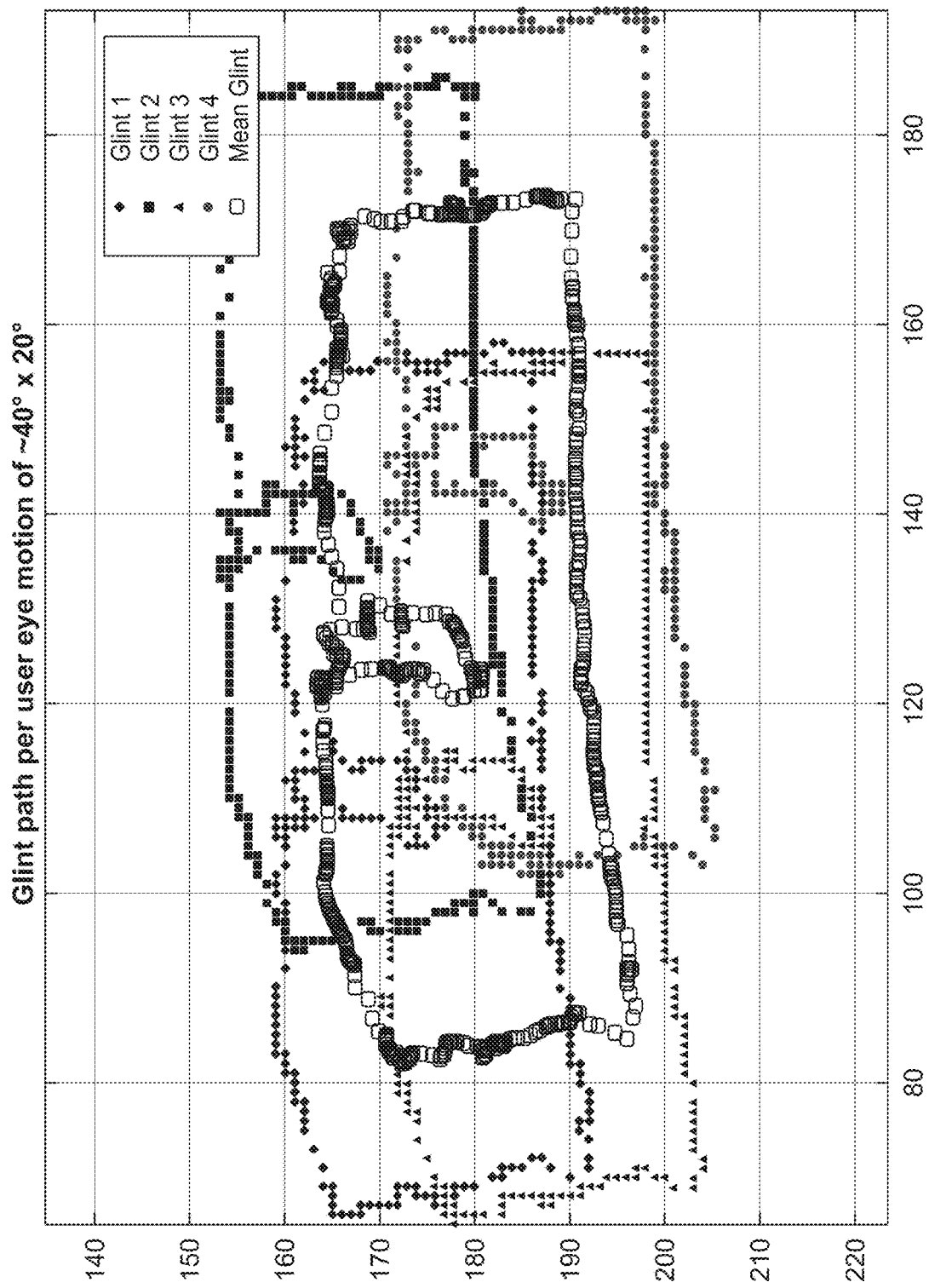
Figure 18B:
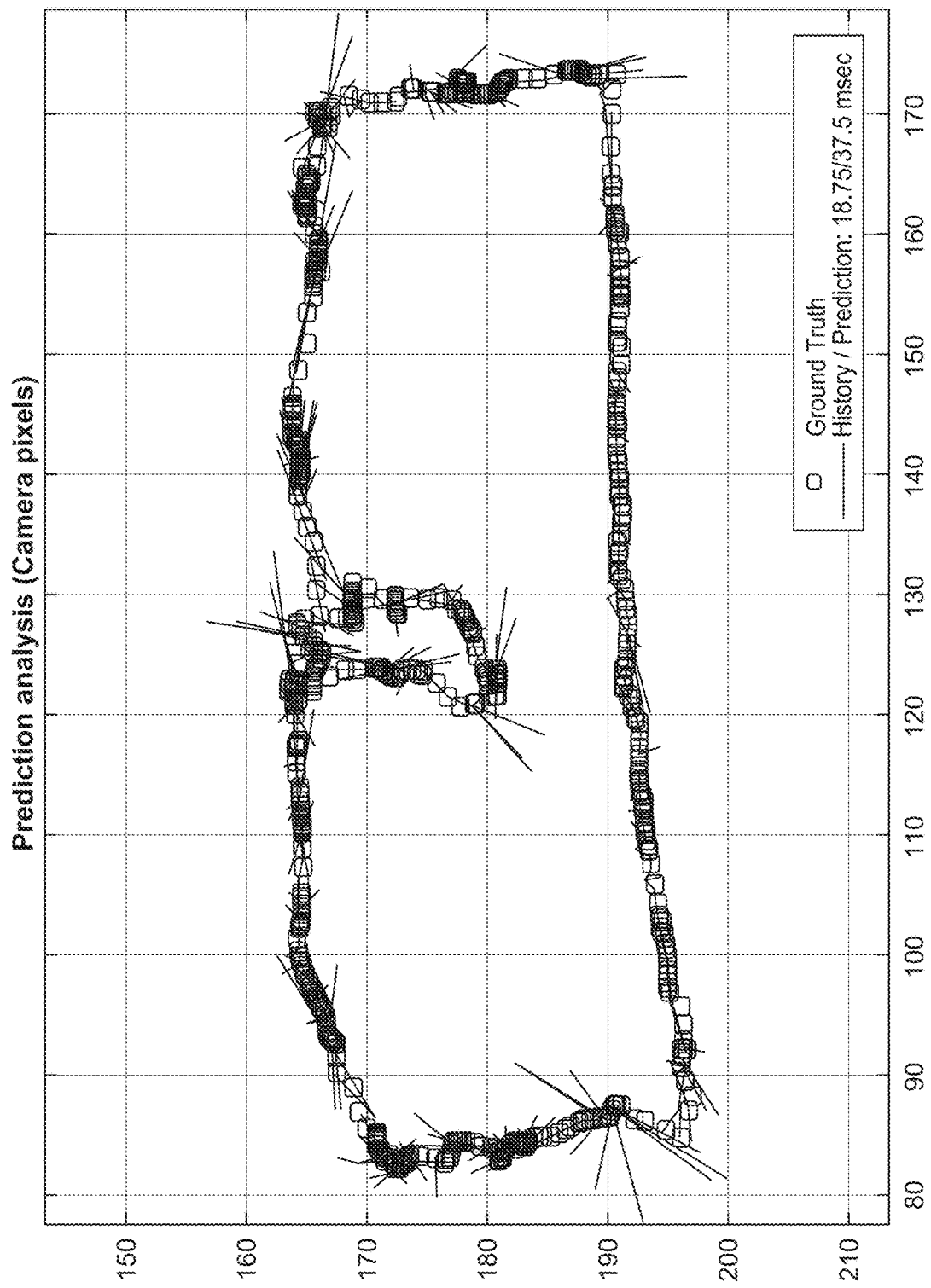

FIGS. 18A-18D illustrate results of an experiment to predict future gaze using an embodiment of the gaze prediction system 1700. In this example experiment, the glint image frame rate was 160 fps. FIG. 18A shows the glint path for each of four glints when the user's eye was moving over a field of view that was about 40 arcminutes by 20 arcminutes. The paths of the four glints are shown by different filled points, and the path of the mean value of these glints is shown by open squares. FIG. 18B shows a comparison of the gaze predictions (short solid lines) versus the path (in open squares) of the mean value of the glints (which is considered to be the ground truth for this experiment). The future prediction time is 37.5 ms and glints from up to 18.75 ms in the past were used for the prediction. As can be seen from FIG. 18B, many if not most of the predictions accurately track the mean path of the eye. FIG. 18C is a plot of eye angular velocity (in degrees per second) versus frames, with a velocity histogram 1820 on the left-hand-side of the figure. FIG. 18C shows that most of the eye movements occur at relatively low angular velocities (e.g., below about 25 deg/s) with persistent but somewhat sporadic or random movements up to about 200 deg/s. FIG. 18D is a receiver operating characteristic (ROC) plot showing prediction percentile versus error between the prediction and the ground truth (GT). The different lines are for different future prediction times from 6.25 ms up to 60 ms. The closer a line is to vertical (toward the left), the more accurate the prediction. For prediction times near 6.25 ms (which is the inverse of the frame rate for this experiment), the error is very small. The error increases as the prediction time gets longer, but even at a prediction time of 50 ms, over 90 percent of the gaze predictions have an error less than 5 pixels.

Example Method for Eye Tracking

Figure 19:
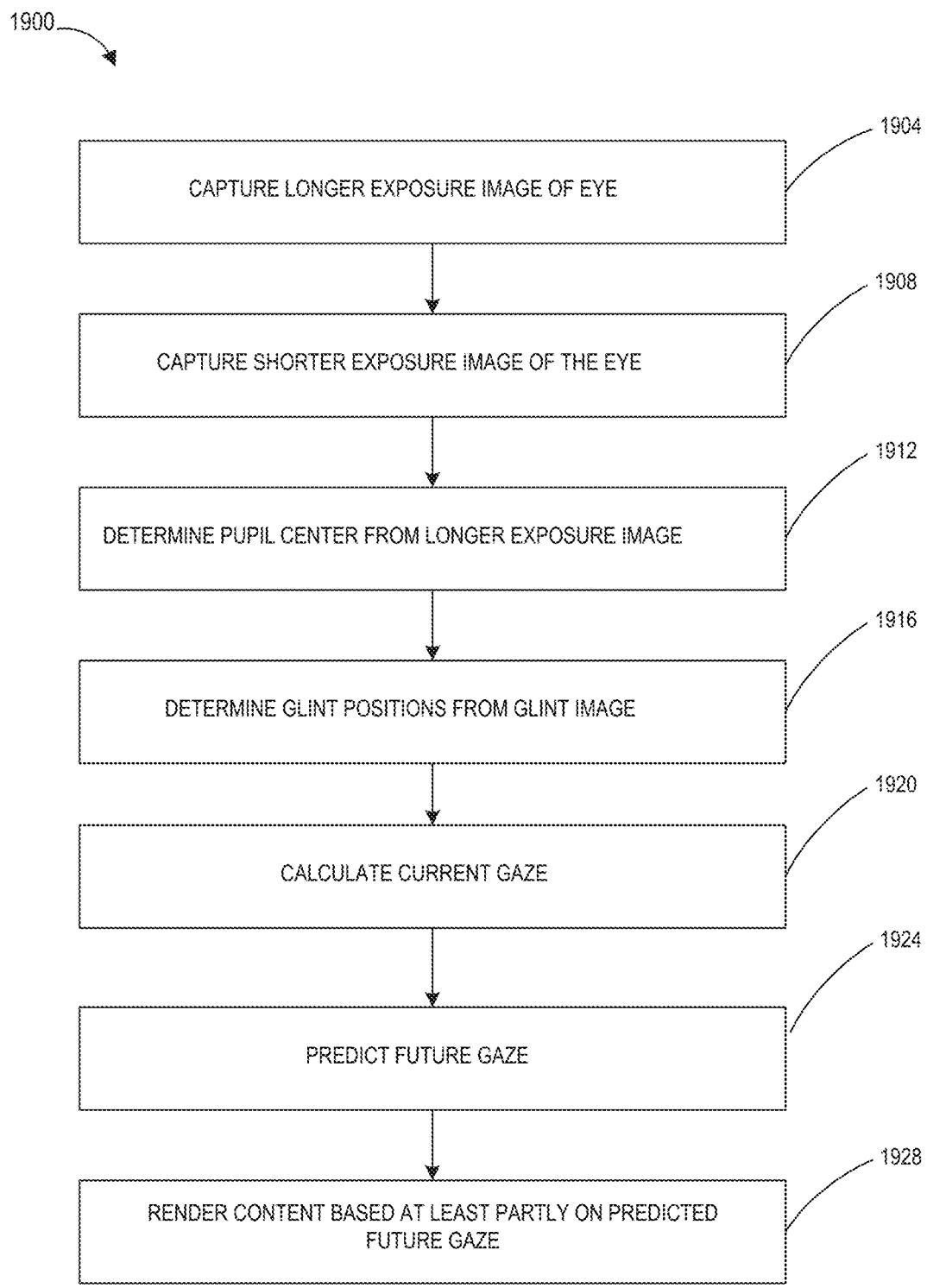
FIG. 19 is a flowchart that illustrates an example method for eye tracking.

FIG. 19 is a flowchart that illustrates an example method 1900 for eye tracking. The method 1900 can be performed by embodiments of the wearable display system 200, 400, or 600, for example, using the eye tracking system 601 described with reference to FIGS. 6 and 7. In various embodiments of the method 1900, the blocks described below can be performed in any suitable order or sequence, and blocks can be combined or rearranged, or other blocks can be added.

At block 1904, the method 1900 captures a longer exposure image of the eye, for example, using the eye-tracking camera 324. The exposure time of the longer exposure image may be in a range from 200 μs to 1200 μs, for example, about 700 μs. The exposure time for the longer exposure image can depend on the properties of the eye tracking camera 324 and can be different in other embodiments. The exposure time for the longer exposure image should have sufficient dynamic range to capture features of the pupil or iris. The longer exposure images can be taken at a frame rate in a range from 10 fps to 60 fps in various embodiments.

At block 1908, the method 1900 captures shorter exposure (glint) image of the eye, for example, using the eye-tracking camera 324. The exposure time of the glint image may be in a range from 5 μs to 100 μs, for example, less than about 40 μs. The exposure time for the shorter exposure, glint image may be less than the exposure time for the longer exposure image captured at block 1904. The exposure time for the glint image can depend on the properties of the eye tracking camera 324 and can be different in other embodiments. The exposure time for the glint image should be sufficient to image peaks of the glints from the light sources 326. The exposure time may be sufficient that the glints are not saturated and have a width of a few (e.g., 1 to 5) pixels, in order to enable subpixel location of the glint center. The ratio of the exposure time for the longer exposure image relative to the exposure time for the glint image can be in a range from 5 to 50, 10 to 20, or some other range. The glint images can be taken at a frame rate in a range from 100 fps to 1000 fps in various embodiments. The ratio of the frame rate for the glint images relative to the frame rate for the longer exposure images can be in a range from 1 to 100, 1 to 50, 2 to 20, 3 to 10, or some other ratio.

At block 1912, the method 1900 (e.g., using the CPU 612) can determine pupil center (or center of rotation, CoR) from the longer exposure image obtained at block 1904. The method 1900 can analyze the longer exposure images for other eye features (e.g., an iris code) for other biometric applications.

At block 1916, the method 1900 (e.g., using the CPU 612) can determine glint positions from the glint image obtained at block 1908. For example, the method 1900 can fit a 2-D Gaussian to the glint images to determine the glint position. Other functionality can be performed at block 1916. For example, as described with reference to FIG. 17, the method 1900 can threshold the glint image, remove non-maxima or close maxima from the glint image, and so forth. The method 1900 can track a "constellation" of glints and use the mean velocity of the constellation to assist in identifying estimated glint positions, whether a glint is reflected from a non-spherical region of the cornea, is experiencing at least partial occlusion, and so forth. At block 1916, the method 1900 can utilize previously determined positions of glints (e.g., in prior glint images) to assist locating or labeling glints in the current glint image.

At block 1920, the method 1900 (e.g., using the CPU 612) can determine a current gaze using the information determined from the longer exposure image and the shorter exposure, glint image. For example, the glint positions obtained from the glint image and the pupil center obtained from the longer exposure image can be used to determine the gaze direction. The gaze direction can be expressed as two angles, for example, θ (azimuthal deflection, determined from a fiducial azimuth) and φ (zenithal deflection, sometimes also referred to as a polar deflection) described with reference to FIG. 5A.

At block 1924, the method 1900 (e.g., using the CPU 612) can predict a future gaze from the current gaze and one or more previous gazes. As described with reference to FIGS. 15 to 17, future gaze can be advantageously used for foveated rendering. The future gaze can be predicted via extrapolation techniques. The block 1924 can predict the future gaze at a future gaze time (e.g., 10 ms to 100 ms after the time for which the current gaze is computed).

At block 1928, the method 1900 (e.g., using the render controller 618 or the render engine 622) can render virtual content for presentation to the user of the wearable display system. As described above, for foveated rendering, knowledge of the user's future gaze direction can be used to more efficiently begin preparing the virtual content for rendering when the user is looking in the future gaze direction, which may advantageously reduce latency and improve rendering performance.

In some embodiments, the wearable display system may not utilize foveated rendering techniques, and the method 1900 may not predict future gaze direction. In such embodiments, the block 1924 is optional.

As mentioned above with reference to FIGS. 13B, 14A-14B, and 17, in some situations, one or more glints may be partially or totally occluded by a user's eyelids, eyelashes, and the like. In some implementations, the eye-tracking system may estimate the location of a partially or totally occluded glint. In these implementations, which are described in further detail below with reference to FIG. 20, the eye-tracking system may leverage a probabilistic statistical model of a glint-pupil relationship so as to estimate the locations of one or more partially or totally occluded glints. Such a glint-pupil relationship may, in some examples, be similar to one or more of the glint-pupil relationships described above with reference to FIGS. 14A-14B. In some examples, the eye-tracking system may estimate the locations of one or more partially or totally occluded glints in response to determining that less than a predetermined minimum threshold quantity of glints (e.g., two glints) has been detected. In some implementations, the eye-tracking system may apply the detected glint locations, the determined pupil location, or both to a probabilistic statistical model of a glint-pupil relationship to identify regions in an image in which glints are expected to be shown and estimate locations in an image at which glints are expected to be shown. In some examples, the eye-tracking system may use the detected glint locations together with the estimated glint locations to determine eye pose and/or provide the estimated glint locations along with the detected glint locations for output to one or more downstream modules.

In some implementations, the probabilistic statistical model that is leveraged by the eye-tracking system for glint location estimation may be generated and/or adapted for each user. That is, in some implementations, the eye-tracking system may develop a model of glint location as a function of pupil location for a given user based on eye-tracking data obtained for that user (e.g., determined pupil locations and determined glint locations) over a period of time. As described above with reference to FIGS. 14A-14B, there is an approximately linear relationship between pupil and glint location. As such, the eye-tracking system may develop such a probabilistic statistical model of the glint-pupil relationship for a given user by performing linear regression on eye-tracking data obtained for that user. In some implementations, the eye-tracking system may recursively update a linear fit over time, for example, using a least-square approach as new eye-tracking data arrives. In some examples, the eye-tracking system may employ one or more Kalman filtering techniques to update the model over time.

Figure 20:
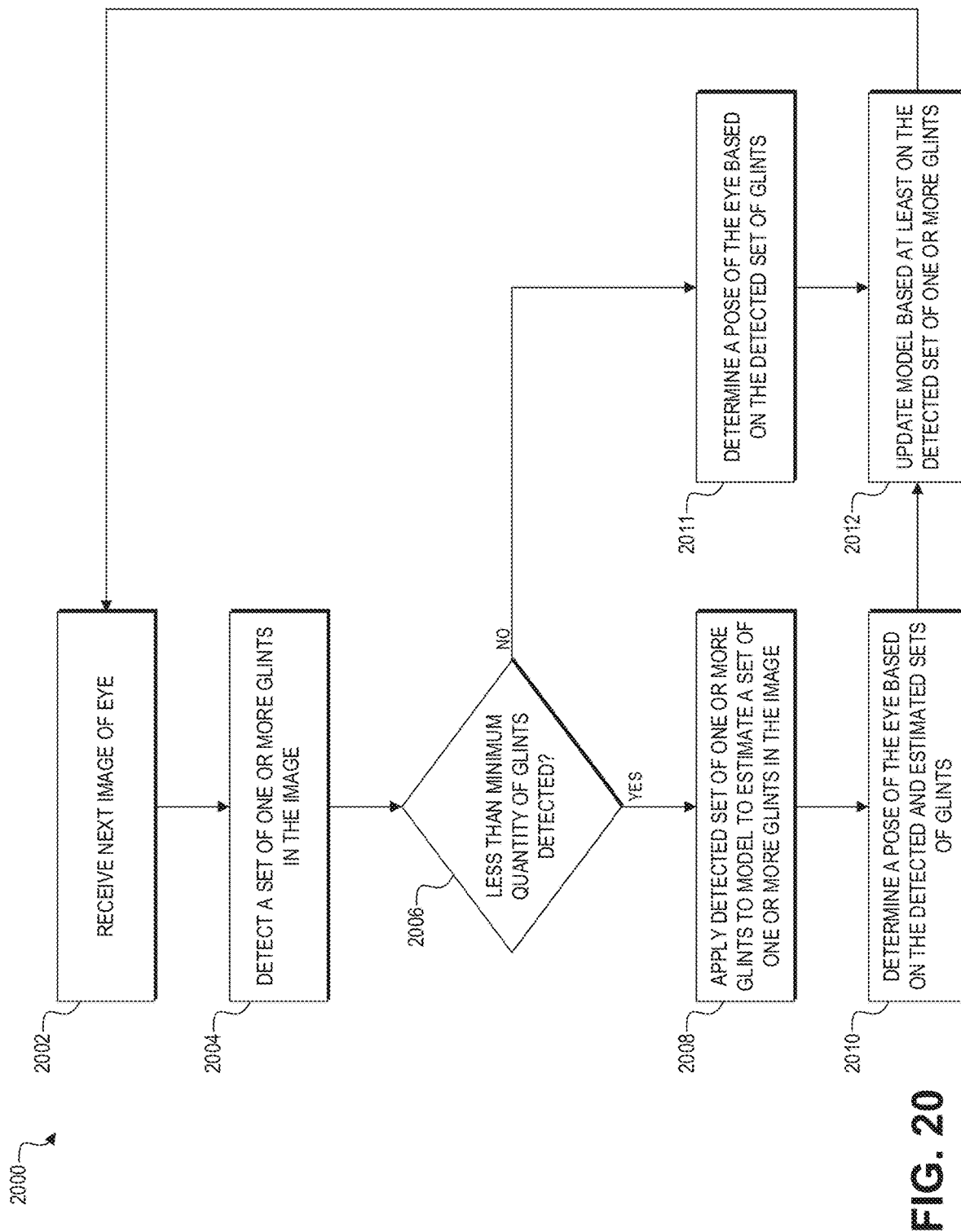
FIG. 20 is a flowchart that illustrates an example method for glint estimation.

FIG. 20 is a flowchart that illustrates an example method 2000 for glint estimation. The method 2000 can be performed by embodiments of the wearable display system 200, 400, or 600, for example, using the eye tracking system 601 described with reference to FIGS. 6 and 7. In various embodiments of the method 2000, the blocks described below can be performed in any suitable order or sequence, and blocks can be combined or rearranged, or other blocks can be added or removed or any combination thereof.

In some implementations, the method 2000 may be performed by a head-mounted system that includes one or more cameras that are configured to capture images of an eye of a user, multiple light sources (e.g., infrared light sources) that are configured to illuminate the eye of the user in a manner so as to produce glints in images of the eye of the user captured by the one or more cameras, and one or more processors coupled to the one or more cameras. In at least some of such implementations, some or all of the operations of method 2000 may be performed at least in part by the one or more processors of the system. In some examples, the multiple light sources may include three or more light sources.

At block 2002, the method 2000 may include receiving an image of an eye of a user. This may, for example, correspond to one or more processors receiving an image of from one or more cameras. At block 2004, the method 2000 may include detecting a set of one or more glints in the image. For example, at block 2004, one or more of the glint detection techniques described herein may be employed to detect locations in the image at which glints are shown.

At block 2006, the method 2000 may include determining whether the detected set of one or more glints includes less than a minimum quantity of glints. For example, this may include determining whether the detected set of one or more glints includes less than two glints.

In response to determining, at block 2006, that the detected set of one or more glints includes less than the minimum quantity of glints, operations associated with block 2008 may be performed. For instance, the detected set of one or more glints may include less than the minimum quantity of glints as a result of the partial or total occlusion of one or more glints. At block 2008, the method 2000 may include applying the detected set of one or more glints to a model to estimate a set of one or more glints in the image. For example, such a model may correspond to a probabilistic statistical model of the glint-pupil relationship. In some implementations, such a model may be generated and/or adapted for each user. For example, the estimated set of one or more glint locations may correspond to locations in the image at which one or more glints may be shown, had they not been partially or totally occluded.

At block 2010, the method 2000 may include determining a pose of the eye based on the detected set of one or more glints and the estimated set of one or more glints. Following block 2010, at block 2012, the method 2000 may include updating the model based at least in part on the detected set of one or more glints. For example, this may include updating a linear fit over time, for example, using a least-square approach.

In response to determining, at block 2006, that the detected set of one or more glints includes at least the minimum quantity of glints, operations associated with block 2011 may be performed. At block 2011, the method 2000 may include determining a pose of the eye based on the detected set of one or more glints. Following block 2011, at block 2012, the method 2000 may include updating the model based at least in part on the detected set of one or more glints.

In some implementations, the method 2000 may further include identifying a location in the image of the eye of the user at which a center of a pupil of the eye of the user is shown. In these implementations, at block 2008, the method 2000 may include applying the identified location of the center of the pupil and the detected set of one or more glints to a model to estimate a set of one or more glints in the image.

Following block 2012, at block 2002, the method 2000 may include receiving another image of the eye of the user. Following block 2004 and in response to determining, at block 2006, that the detected set of one or more glints includes less than the minimum quantity of glints, operations associated with block 2008 may be performed. However, at this juncture, such operations associated with block 2008 include applying the detected set of one or more glints to the model, as updated at block 2012, to estimate a set of one or more glints in the image. This recursion in method 2000 is demonstrative of how the probabilistic statistical model may possibly be updated for a given user over time.

Additionally, in at least some of these implementations, the method 2000 may further include applying the identified location of the center of the pupil of the eye of the user to the model to identify a plurality of regions in the image of the eye of the user at which a plurality of glints are expected to be shown, respectively. In some examples, such identified regions in the image may be similar to one or more of the "search" areas or regions described herein. In such implementations, at block 2004, the method 2000 may include detecting a set of one or more locations in one or more of the plurality of identified regions, respectively.

In some of these implementations, at block 2008, the method 2000 may include (i) applying the identified location of the center of the pupil of the eye of the user to the probabilistic statistical model to identify one or more regions in the image of the eye of the user at which one or more glints are expected to be shown, respectively, and (ii) applying the detected set of one or more glint locations to the probabilistic statistical model to estimate a set of one or more locations in the one or more identified regions of the image of the eye of the user at which one or more glints are shown, respectively.

In some of these implementations, at block 2012, the method 2000 may include updating the probabilistic statistical model based on the identified location of the center of the pupil of the eye of the user and the detected set of one or more glint locations.

In some examples, at 2010, the method 2000 may include determining a location of a center of a cornea of the eye of the user, a location of a center of rotation of the eye of the user, and/or a gaze direction of the eye of the user based at least in part on the detected set of one or more glint locations and the estimated set of one or more glint locations. Accordingly, in various examples, at 2010, the method 2000 may include determining one or more quantities associated with the eye or with the vision of the eye of the user (e.g., the center of perspective) based at least in part on the detected set of one or more glint locations and the estimated set of one or more glint locations.

Examples

Example 1. A head-mounted system comprising:
one or more cameras configured to capture images of an eye of a user;
a plurality of light sources configured to illuminate the eye of the user in a manner so as to produce glints in images of the eye of user captured by the one or more cameras, wherein a total quantity of light sources included in the plurality of light sources is greater than or equal to a particular value; and
one or more processors operatively coupled to the one or more cameras, the one or more processors configured to:
  receive an image of the eye of the user from the one or more cameras;
  detect a set of one or more locations in the image of the eye of the user at which one or more glints are shown, respectively;
  determine whether a total quantity of locations included in the detected set of one or more glint locations is less than the particular value;
  in response to a determination that the total quantity of locations included in the detected set of one or more glint locations is less than the particular value:
    apply the detected set of one or more glint locations to a probabilistic statistical model to estimate a set of one or more locations in the image of the eye of the user at which one or more glints are shown, respectively, the estimated set of one or more glint locations being different from the detected set of one or more glint locations; and
    determine a pose of the eye of the user based at least in part on the detected set of one or more glint locations and the estimated set of one or more glint locations.

Example 2. The system of Example 1, wherein the one or more processors are further configured to:
  identify a location in the image of the eye of the user at which a center of a pupil of the eye of the user is shown;
  wherein to apply the detected set of one or more glint locations to a probabilistic statistical model to estimate the set of one or more locations in the image of the eye of the user at which one or more glints are shown, respectively, the one or more processors are configured to:
    apply the identified location of the center of the pupil of the eye of the user and the detected set of one or more glint locations to the probabilistic statistical model to estimate the set of one or more locations in the image of the eye of the user at which one or more glints are shown, respectively.

Example 3. The system of Example 2, wherein the one or more processors are further configured to:
  apply the identified location of the center of the pupil of the eye of the user to the probabilistic statistical model to identify a plurality of regions in the image of the eye of the user at which a plurality of glints are expected to be shown, respectively, wherein a total quantity of regions included in the plurality of identified regions is greater than or equal to the particular value; and
  wherein to detect the set of one or more locations in the image of the eye of the user at which one or more glints are shown, respectively, the one or more processors are configured to:
    detect a set of one or more locations in one or more of the plurality of identified regions, respectively.

Example 4. The system of Example 2 or 3, wherein to apply the identified location of the center of the pupil of the eye of the user and the detected set of one or more glint locations to the probabilistic statistical model to estimate the set of one or more locations in the image of the eye of the user at which one or more glints are shown, respectively, the one or more processors are configured to:
  apply the identified location of the center of the pupil of the eye of the user to the probabilistic statistical model to identify one or more regions in the image of the eye of the user at which one or more glints are expected to be shown, respectively; and
  apply the detected set of one or more glint locations to the probabilistic statistical model to estimate a set of one or more locations in the one or more identified regions of the image of the eye of the user at which one or more glints are shown, respectively.

Example 5. The system of any of Examples 2-4, wherein the one or more processors are further configured to: update the probabilistic statistical model based on the identified location of the center of the pupil of the eye of the user and the detected set of one or more glint locations.

Example 6. The system of any of the Examples above, wherein the particular value corresponds to a value of two.

Example 7. The system of Example 6, wherein the total quantity of light sources included in the plurality of light sources is greater than or equal to a value of three.

Example 8. The system of any of the Examples above, wherein the plurality of light sources comprise a plurality of infrared light sources.

Example 9. The system of any of the Examples above, wherein to determine the pose of the eye of the user based at least in part on the detected set of one or more glint locations and the estimated set of one or more glint locations, the one or more processors are configured to:
  determine a location of a center of a cornea of the eye of the user based at least in part on the detected set of one or more glint locations and the estimated set of one or more glint locations.

Example 10. The system of any of the Examples above, wherein to determine the pose of the eye of the user based at least in part on the detected set of one or more glint locations and the estimated set of one or more glint locations, the one or more processors are configured to:
  determine a location of a center of rotation of the eye of the user based at least in part on the detected set of one or more glint locations and the estimated set of one or more glint locations.

Example 11. The system of any of the Examples above, wherein to determine the pose of the eye of the user based at least in part on the detected set of one or more glint locations and the estimated set of one or more glint locations, the one or more processors are configured to:
  determine a gaze direction of the eye of the user based at least in part on the detected set of one or more glint locations and the estimated set of one or more glint locations.

Example 12. The system of any of the Examples above, wherein the one or more processors are further configured to:

in response to a determination that the total quantity of locations included in the detected set of one or more glint locations is greater than the particular value:
determine a pose of the eye of the user based at least in part on the detected set of one or more glint locations.

Additional Examples

Example 1. A head-mounted system comprising:
one or more cameras configured to capture images of an eye of a user;
one or more light sources configured to illuminate the eye of the user in a manner so as to produce a plurality of glints in images of the eye of the user captured by the one or more cameras; and
one or more processors operatively coupled to the one or more cameras, the one or more processors configured to:
receive one or more images of the eye of the user from the one or more cameras;
detect one or more glints and determine respective locations associated with said one or more detected glints;
determine whether a total quantity of glints included in the one or more detected glints is less than an expected number of glints;
in response to a determination that the total quantity of glints in the one or more detected glint is less than the expected number of glints:
estimate one or more locations for one or more respective glints different than said one or more detected glints, the estimated one or more glint locations being different from the locations associated with the detected one or more glints; and
determine a pose of the eye of the user based at least in part on the locations associated with said one or more detected glints and the estimated one or more glint locations.

Example 2: The system of Example 1, wherein said one or more light sources comprises a plurality of light sources.

Example 3. The system of Example 2, wherein respective ones of said light sources form corresponding glints.

Example 4. The system of any of Examples 1-3, wherein the one or more light sources comprise one or more infrared light sources.

Example 5. The system of any of the Examples above, wherein determining the total quantity of glints included in said one or more detected glints comprises determining the total quantity of glint locations included in the one or more determined locations associated with said one or more detected glints.

Example 6. The system of any of the Examples above, wherein estimating one or more locations for one or more respective glints different than said one or more detected glints comprises applying the respective locations associated with the detected one or more glints to a probabilistic statistical model.

Example 7. The system of any of the Examples above, wherein the one or more processors are further configured to identify a location associated with a center of a pupil of the eye of the user.

Example 8. The system of Example 7, wherein said one or more processors are configured to use the identified location associated with the center of the pupil of the eye of the user and the respective glint locations associated with the one or more detected glints to provide said estimated one or more locations for one or more respective glints different than said one or more detected glints.

Example 9. The system of Example 7 or 8, wherein said one or more processors are configured to apply the identified location associated with the center of the pupil of the eye of the user and the respective glint locations associated with the one or more detected glints to a probabilistic statistical model to provide said estimated one or more locations for one or more respective glints different than said one or more detected glints.

Example 10. The system of any of the Examples above, wherein said one or more processors are further configured to identify a plurality of regions in the image of the eye of the user at which a plurality of respective glints are expected to be shown.

Example 11. The system of Example 10, wherein a total quantity of said regions included in the plurality of identified regions is greater than or equal to the expected number of glints.

Example 12. The system of Example 10 or 11, wherein to determine respective locations associated with said one or more detected glints, the one or more processors are configured to determine one or more respective locations in one or more of the plurality of identified regions.

Example 13. The system of Example 12, wherein to determine respective locations associated with said one or more detected glints, the one or more processors are configured to use the identified location of the center of the pupil of the eye.

Example 14. The system of Example 12, wherein to determine respective locations associated with said one or more detected glints, the one or more processors are configured to apply the identified location of the center of the pupil of the eye of the user to a probabilistic statistical model.

Example 15. The system of any of Examples 7-9, wherein using the identified location of the center of the pupil of the eye of the user and the respective locations associated with the one or more detected glints to estimate the one or more locations for one or more respective glints different than said one or more detected glints, the one or more processors are configured to use the identified location of the center of the pupil to identify one or more regions at which one or more respective glints are expected and to estimate one or more locations of the one or more respective glints different than said one or more detected glints in the one or more identified regions.

Example 16. The system of any of Examples 7-9 and 15, wherein the identified location of the center of the pupil of the eye of the user and the respective locations associated with the one or more detected glints are applied to the probabilistic statistical model to estimate the one or more locations for one or more respective glints different than said one or more detected glints, the one or more processors being configured to apply the identified location of the center of the pupil of the eye of the user to the probabilistic statistical model to identify one or more regions at which one or more respective glints are expected, and to apply the one or more respective locations associated with the one or more detected glints to the probabilistic statistical model to estimate one or more locations in the one or more identified respective regions.

Example 17. The system of any of the Examples 6, 9, 14, and 16, wherein the one or more processors are further configured to update the probabilistic statistical model based on the respective locations associated with the one or more detected glints.

Example 18. The system of any of the Examples 6, 9, 14, 16, and 17, wherein the one or more processors are further configured to update the probabilistic statistical model based on the identified location of the center of the pupil of the eye of the user.

Example 19. The system of any of the Examples above, wherein the total quantity of light sources included in the plurality of light sources comprises two.

Example 20. The system of any of the Examples above, wherein the total quantity of light sources included in the plurality of light sources is greater than or equal to a value of three.

Example 21. The system of any of the Examples above, wherein the detected number of glints is two.

Example 22. The system of any of the Examples above, wherein the expected number of glints is greater than or equal to a value of three.

Example 23. The system of any of the Examples above, wherein to determine the pose of the eye of the user based at least in part on the respective locations associated with the one or more detected glints and the estimated one or more locations for one or more respective glints different than said one or more detected glints, the one or more processors are configured to determine a location of a center of a cornea of the eye of the user based at least in part on the respective locations associated with the one or more detected glints and the estimated one or more glint locations.

Example 24. The system of any of the Examples above, wherein to determine the pose of the eye of the user based at least in part on the respective locations associated with the one or more detected glints and the estimated one or more locations for one or more respective glints different than said one or more detected glints, the one or more processors are configured to determine a location of a center of rotation of the eye of the user based at least in part on the respective locations associated with the one or more detected glints and the estimated one or more glint locations.

Example 25. The system of any of the Example above, wherein to determine the pose of the eye of the user based at least in part on the respective locations associated with the one or more detected glints and the estimated one or more locations for one or more respective glints different than said one or more detected glints, the one or more processors are configured to determine a gaze direction of the eye of the user based at least in part on the locations associated with the one or more detected glints and the estimated one or more glint locations.

Example 26. The system of any of the Examples above, wherein the one or more processors are further configured to, in response to a determination that the total quantity of glint locations included in the determined locations associated with said one or more detected glints is greater than a particular value, determine a pose of the eye of the user based at least in part on the determined locations associated with said one or more detected glints.

Example 27. The system of any of the Examples above, wherein determining respective locations associated of said one or more detected glints comprises determining one or more locations in the image of the eye of the user at which one or more respective glints are shown.

Example 28. The system of any of the Examples above, wherein estimating one or more locations for one or more respective glints comprises estimating one or more locations in the image of the eye of the user at which one or more respectively glints are shown.

Example 29. The system of any of the Examples above, wherein the determining respective locations associated of said one or more detected glints comprises determining a set of one or more locations in the image of the eye of the user at which one or more glints are shown, respectively.

Example 30. The system of any of the Examples above, wherein estimating one or more locations for one or more respective glints comprises estimating a set of one or more locations in the image of the eye of the user at which one or more glints are shown, respectively.

Example 31. The system of any of the Examples above, wherein identifying a location associated with a center of a pupil of the eye of the user comprises identifying a location in the image of the eye of the user at which a center of a pupil of the eye of the user is shown.

Example 32. The system of any of the Examples above, wherein to determine the pose of the eye of the user based at least in part on the respective locations associated with the one or more detected glints and the estimated one or more locations for one or more respective glints different than said one or more detected glints, the one or more processors are configured to determine a location of a center of perspective of the eye of the user based at least in part on respective locations associated with the one or more detected glints and the estimated one or more glint locations.

Example 33. The system of any of the Examples above, wherein the locations associated with said one or more detected glints comprise the locations of said one or more detected glints.

Example 34. The system of any of the Examples above, wherein the locations associated with said one or more detected glints comprise the locations of said one or more detected glints in one or more images of an eye of a user.

Example 35. The system of any of the Examples above, wherein the head-mounted system comprise a head-mounted display configured to present virtual content by outputting light to an eye of a wearer of the head-mounted display.

Example 36. The system of any of the Examples above, wherein the head-mounted system comprises an augmented reality head-mounted display.

Example 37. The system of any of the Examples above, wherein the expected number of glints corresponds to the number of light sources.

Examples Related to U.S. patent application Ser. No. 16/751,076

Example 1. A wearable display system comprising:
 a head-mounted display configured to present virtual content by outputting light to an eye of a wearer of the head-mounted display;
 a light source configured to direct light toward the eye of the wearer;
 an eye-tracking camera configured to capture:
  first images of the eye of the wearer captured at a first frame rate and a first exposure time; and
  second images of the eye of the wearer captured at a second frame rate greater than or equal to the first frame rate and at a second exposure time less than the first exposure time; and
 a hardware processor communicatively coupled to the head-mounted display and the eye-tracking camera, the hardware processor programmed to:
  analyze the first images to determine a center of a pupil of the eye;
  analyze the second images to determine a position of a reflection of the light source from the eye;
  determine, from the center of the pupil and the position of the reflection, a gaze direction of the eye;

estimate, from the gaze direction and previous gaze direction data, a future gaze direction of the eye at a future gaze time; and cause the head-mounted display to present the virtual content at the future gaze time based at least partly on the future gaze direction.

Example 2. The wearable display system of example 1, wherein the light source comprises an infrared light source.

Example 3. The wearable display system of example 1 or example 2, wherein the hardware processor is programmed to analyze the first images or the second images to determine a center of rotation or a center of perspective of the eye of the wearer.

Example 4. The wearable display system of any one of examples 1 to 3, wherein to analyze the second images, the hardware processor is programmed to: apply a threshold to the second images, identify non-maxima in the second images, or suppress or remove non-maxima in the second images.

Example 5. The wearable display system of any one of examples 1 to 4, wherein to analyze the second images, the hardware processor is programmed to identify a search region for the reflection of the light source in a current image from the second images based at least partly on a position of the reflection of the light source in a previous image from the second images.

Example 6. The wearable display system of any one of examples 1 to 5, wherein to analyze the second images, the hardware processor is programmed to:

determine a common velocity of a plurality of reflections of the light source; and determine whether a velocity of the reflection of the light source is different from the common velocity by more than a threshold amount.

Example 7. The wearable display system of any one of examples 1 to 6, wherein to analyze the second images, the hardware processor is programmed to determine whether the reflection of the light source is from a non-spherical portion of the cornea of the eye.

Example 8. The wearable display system of any one of examples 1 to 7, wherein to analyze the second images, the hardware processor is programmed to identify existence of at least partial occlusion of the reflection of the light source.

Example 9. The wearable display system of any one of examples 1 to 8, wherein the hardware processor is programmed to determine an estimated position of the center of the pupil based at least partly on the position of the reflection of the light source and a glint-pupil relationship.

Example 10. The wearable display system of example 9, wherein the glint-pupil relationship comprises a linear relationship between glint position and pupil center position.

Example 11. The wearable display system of any one of examples 1 to 10, wherein the first exposure time is in a range from 200 µs to 1200 µs.

Example 12. The wearable display system of any one of examples 1 to 11, wherein the first frame rate is in a range from 10 frames per second to 60 frames per second.

Example 13. The wearable display system of any one of examples 1 to 12, wherein the second exposure time is in a range from 5 µs to 100 µs.

Example 14. The wearable display system of any one of examples 1 to 13, wherein the second frame rate is in a range from 100 frames per second to 1000 frames per second.

Example 15. The wearable display system of any one of examples 1 to 14, wherein a ratio of the first exposure time to the second exposure time is in a range from 5 to 50.

Example 16. The wearable display system of any one of examples 1 to 15, wherein a ratio of the second frame rate to the first frame rate is in a range from 1 to 100.

Example 17. The wearable display system of any one of examples 1 to 16, wherein the future gaze time is in a range from 5 ms to 100 ms.

Example 18. The wearable display system of any one of examples 1 to 17, wherein the hardware processor comprises:

a first hardware processor disposed on a non-head-mounted component of the wearable display system; and a second hardware processor disposed in or on the head-mounted display, wherein the first hardware processor is utilized to analyze the first images, and wherein the second hardware processor is utilized to analyze the second images.

Example 19. The wearable display system of example 18, wherein the second hardware processor includes or is associated with a memory buffer configured to store at least a portion of each of the second images, and wherein the second hardware processor is programmed to delete the at least a portion of each of the second images after the determination of the position of the reflection of the light source from the eye.

Example 20. The wearable display system of any one of examples 1 to 19, wherein the hardware processor is programmed not to combine the first images with the second images.

Example 21. A method for eye tracking, the method comprising:

capturing, by an eye-tracking camera, first images of an eye at a first frame rate and a first exposure time;

capturing, by an eye-tracking camera, second images of the eye at a second frame rate greater than or equal to the first frame rate and at a second exposure time less than the first exposure time;

determining, at least from the first images, a center of a pupil of the eye;

determining, at least from the second images, a position of a reflection of a light source from the eye; and determining, from the center of the pupil and the position of the reflection, a gaze direction of the eye.

Example 22. The method of example 21, further comprising causing a display to render virtual content based at least partly on the gaze direction.

Example 23. The method of example 21 or example 22, further comprising estimating, based at least in part on the gaze direction and previous gaze direction data, a future gaze direction at a future gaze time.

Example 24. The method of example 23, further comprising causing a display to render virtual content based at least partly on the future gaze direction.

Example 25. The method of any one of examples 21 to 24, wherein the first exposure time is in a range from 200 µs to 1200 µs.

Example 26. The method of any one of examples 21 to 25, wherein the first frame rate is in a range from 10 frames per second to 60 frames per second.

Example 27. The method of any one of examples 21 to 26, wherein the second exposure time is in a range from 5 µs to 100 µs.

Example 28. The method of any one of examples 21 to 27, wherein the second frame rate is in a range from 100 frames per second to 1000 frames per second.

Example 29. The method of any one of examples 21 to 28, wherein a ratio of the first exposure time to the second exposure time is in a range from 5 to 50.

Example 30. The method of any one of examples 21 to 29, wherein a ratio of the second frame rate to the first frame rate is in a range from 1 to 100.

Example 31. A wearable display system comprising:
- a head-mounted display configured to present virtual content by outputting light to an eye of a wearer of the head-mounted display;
- a light source configured to direct light toward the eye of the wearer;
- an eye-tracking camera configured to capture images of the eye of the wearer, the eye tracking camera configured to alternatingly:
- capture first images at a first exposure time; and
- capture second images at a second exposure time less than the first exposure time; and
- a plurality of electronic hardware components, at least one of which comprises a hardware processor communicatively coupled to the head-mounted display, the eye-tracking camera, and at least one other electronic hardware component in the plurality of electronic hardware components, wherein the hardware processor programmed is to:
  - receive and relay each first image of the eye of the wearer captured by the eye-tracking camera at the first exposure time to the at least one other electronic hardware component;
  - receive and store pixels of each second image of the eye of the wearer captured by the eye-tracking camera at the second exposure time to a buffer;
  - analyze the pixels stored in the buffer to identify locations at which reflections of the light source are present in each second image of the eye of the wearer captured by the eye-tracking camera at the second exposure time; and
  - transmit location data indicating the locations to the at least one other electronic hardware component;
- wherein the at least one other electronic hardware component is configured to:
  - analyze each first image of the eye of the wearer captured by the eye-tracking camera at the first exposure time to identify a location of a center of a pupil of the eye; and
  - determine, from the location of the center of the pupil and the location data received from the hardware processor, a gaze direction of the eye of the wearer.

Example 32. The wearable display system of example 31, wherein the first exposure time is in a range from 200 µs to 1200 µs.

Example 33. The wearable display system of example 31 or example 32, wherein the second exposure time is in a range from 5 µs to 100 µs.

Example 34. The wearable display system of any one of example 31 to 33, wherein the eye-tracking camera is configured to capture the first images at a first frame rate that is in a range from 10 frames per second to 60 frames per second.

Example 35. The wearable display system of any one of examples 31 to 34, wherein the eye-tracking camera is configured to capture the second images at a second frame rate that is in a range from 100 frames per second to 1000 frames per second.

Example 36. The wearable display system of any one of examples 31 to 35, wherein a ratio of the first exposure time to the second exposure time is in a range from 5 to 50.

Example 37. The wearable display system of any one of examples 31 to 36, wherein the at least one other electronic hardware component is disposed in or on a non-head-mounted component of the wearable display system.

Example 38. The wearable display system of example 37, wherein the non-head-mounted component comprises a belt-pack.

Example 39. The wearable display system of any one of examples 31 to 38, wherein the pixels of each second image of the eye comprise fewer than all of the pixels of each second image.

Example 40. The wearable display system of any one of examples 31 to 39, wherein the pixels comprise an n×m array of pixels, wherein each of n and m is an integer in a range from 1 to 20.

Example 41. The wearable display system of any one of examples 31 to 40, wherein the plurality of electronic hardware components are further configured to:
- estimate, from the gaze direction and previous gaze direction data, a future gaze direction of the eye at a future gaze time; and
- cause the head-mounted display to present virtual content at the future gaze time based at least partly on the future gaze direction.

Example 42. The wearable display system of any one of examples 31 to 41, wherein the hardware processor is programmed to: apply a threshold to the pixels stored in the buffer, identify non-maxima in the pixels stored in the buffer, or suppress or remove non-maxima in the pixels stored in the buffer.

Example 43. The wearable display system of any one of examples 31 to 42, wherein the hardware processor is programmed to:
- determine a common velocity of the reflections of the light source; and
- determine whether a velocity of a reflection of the light source is different from the common velocity by more than a threshold amount.

Example 44. The wearable display system of any one of examples 31 to 43, wherein the hardware processor is programmed to determine whether the location of the reflection of the light source is from a non-spherical portion of the cornea of the eye.

Example 45. The wearable display system of any one of examples 31 to 44, wherein the hardware processor is programmed to identify existence of at least partial occlusion of the reflection of the light source.

Example 46. The wearable display system of any one of examples 31 to 45, wherein the at least one other electronic hardware component is programmed to identify the location of the center of the pupil based at least partly on the location of the reflection of the light source and a glint-pupil relationship.

Additional Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time. Additionally, real-time eye-tracking for an AR, MR, VR wearable device is computationally challenging, and the multiple exposure time eye tracking techniques may utilize efficient CPUs, GPUs, ASICs, or FPGAs.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A head-mounted system comprising:
   one or more cameras configured to capture images of an eye of a user;
   a plurality of light sources configured to illuminate the eye of the user in a manner so as to produce glints in images of the eye of the user captured by the one or more cameras, wherein a total quantity of light sources included in the plurality of light sources is greater than or equal to a particular value; and
   one or more processors operatively coupled to the one or more cameras, the one or more processors configured to:
      receive an image of the eye of the user from the one or more cameras;
      detect a set of one or more locations in the image of the eye of the user at which one or more glints are shown, respectively;
      determine whether a total quantity of locations included in the detected set of one or more glint locations is less than the particular value;
      in response to a determination that the total quantity of locations included in the detected set of one or more glint locations is less than the particular value:
         apply the detected set of one or more glint locations to a probabilistic statistical model to estimate a set of one or more locations in the image of the eye of the user at which one or more glints are shown, respectively, the estimated set of one or more glint locations being different from the detected set of one or more glint locations; and
         determine a pose of the eye of the user based at least in part on the detected set of one or more glint locations and the estimated set of one or more glint locations.

2. The system of claim 1, wherein the one or more processors are further configured to:
   identify a location in the image of the eye of the user at which a center of a pupil of the eye of the user is shown;
   wherein to apply the detected set of one or more glint locations to a probabilistic statistical model to estimate the set of one or more locations in the image of the eye of the user at which one or more glints are shown, respectively, the one or more processors are configured to:
      apply the identified location of the center of the pupil of the eye of the user and the detected set of one or more glint locations to the probabilistic statistical model to estimate the set of one or more locations in the image of the eye of the user at which one or more glints are shown, respectively.

3. The system of claim 2, wherein the one or more processors are further configured to:
   apply the identified location of the center of the pupil of the eye of the user to the probabilistic statistical model to identify a plurality of regions in the image of the eye of the user at which a plurality of glints are expected to be shown, respectively, wherein a total quantity of regions included in the plurality of identified regions is greater than or equal to the particular value; and
   wherein to detect the set of one or more locations in the image of the eye of the user at which one or more glints are shown, respectively, the one or more processors are configured to:
      detect a set of one or more locations in one or more of the plurality of identified regions, respectively.

4. The system of claim 2, wherein to apply the identified location of the center of the pupil of the eye of the user and the detected set of one or more glint locations to the probabilistic statistical model to estimate the set of one or more locations in the image of the eye of the user at which one or more glints are shown, respectively, the one or more processors are configured to:
   apply the identified location of the center of the pupil of the eye of the user to the probabilistic statistical model to identify one or more regions in the image of the eye of the user at which one or more glints are expected to be shown, respectively; and
   apply the detected set of one or more glint locations to the probabilistic statistical model to estimate a set of one or more locations in the one or more identified regions of the image of the eye of the user at which one or more glints are shown, respectively.

5. The system of claim 2, wherein the one or more processors are further configured to: update the probabilistic statistical model based on the identified location of the center of the pupil of the eye of the user and the detected set of one or more glint locations.

6. The system of claim 1, wherein the particular value corresponds to a value of two.

7. The system of claim 6, wherein the total quantity of light sources included in the plurality of light sources is greater than or equal to a value of three.

8. The system of claim 1, wherein the plurality of light sources comprise a plurality of infrared light sources.

9. The system of claim 1, wherein to determine the pose of the eye of the user based at least in part on the detected set of one or more glint locations and the estimated set of one or more glint locations, the one or more processors are configured to:
   determine a location of a center of a cornea of the eye of the user based at least in part on the detected set of one or more glint locations and the estimated set of one or more glint locations.

10. The system of claim 1, wherein to determine the pose of the eye of the user based at least in part on the detected set of one or more glint locations and the estimated set of one or more glint locations, the one or more processors are configured to:
  determine a location of a center of rotation of the eye of the user based at least in part on the detected set of one or more glint locations and the estimated set of one or more glint locations.

11. The system of claim 1, wherein to determine the pose of the eye of the user based at least in part on the detected set of one or more glint locations and the estimated set of one or more glint locations, the one or more processors are configured to:
  determine a gaze direction of the eye of the user based at least in part on the detected set of one or more glint locations and the estimated set of one or more glint locations.

12. The system of claim 1, wherein the one or more processors are further configured to:
  in response to a determination that the total quantity of locations included in the detected set of one or more glint locations is greater than the particular value:
    determine a pose of the eye of the user based at least in part on the detected set of one or more glint locations.

* * * * *